(12) United States Patent
Anand et al.

(10) Patent No.: US 12,153,556 B1
(45) Date of Patent: Nov. 26, 2024

(54) INDEXING CONSTITUENT DATA

(71) Applicant: ThoughtSpot, Inc., Mountain View, CA (US)

(72) Inventors: Ashok Anand, Bengaluru (IN); Yellamelli Bharath Mourya, Vijayawada (IN); Sujay Alur Narayana, Bengaluru (IN); Dhwani Kotecha, Woodinville, WA (US); Vibhav Sarraf, Jaipur (IN); Robert Hou, San Francisco, CA (US); Manish Agarwal, Bellevue, WA (US)

(73) Assignee: ThoughtSpot, Inc., Mountain View, CA (US)

( * ) Notice: Subject to any disclaimer, the term of this patent is extended or adjusted under 35 U.S.C. 154(b) by 0 days.

(21) Appl. No.: 18/338,556

(22) Filed: Jun. 21, 2023

(51) Int. Cl.
*G06F 16/20* (2019.01)
*G06F 16/22* (2019.01)
*G06F 16/2458* (2019.01)

(52) U.S. Cl.
CPC .......... *G06F 16/22* (2019.01); *G06F 16/2462* (2019.01)

(58) Field of Classification Search
CPC ............................. G06F 16/22; G06F 16/2462
See application file for complete search history.

(56) References Cited

U.S. PATENT DOCUMENTS

2015/0026153 A1* 1/2015 Gupta ................. G06F 16/38 707/711
2020/0250163 A1* 8/2020 Kuimelis ............ G06F 16/2255
2021/0109912 A1* 4/2021 Biswas ................ G06F 21/602
2021/0357398 A1* 11/2021 Balakavi ........... G06F 16/24578
2022/0309067 A1* 9/2022 Anand .............. G06F 16/24556

FOREIGN PATENT DOCUMENTS

CN          115269543 A  * 11/2022

OTHER PUBLICATIONS

Article entitled "How to use Pandas Sample to Select Rows and Columns", by Marsja, dated Nov. 12, 2018 (Year: 2018).*
Gawrych, Find recently modified tables in Snowflake, Snowflake Data Dictionary Query Toolbox, Dataedo, retrieved from https://dataedo.com/kb/query/snowflake/find-recently-modified-tables, 3 pages.
Snowflake, Changes, Snowflake Documentation, 2023, retrieved from https://docs.snowflake.com/en/sql-reference/constructs/changes, 7 pages.

* cited by examiner

*Primary Examiner* — Mahesh H Dwivedi
(74) *Attorney, Agent, or Firm* — Young Basile Hanlon & MacFarlane, P.C.

(57) ABSTRACT

Updating a constituent-data index includes determining whether sampling is currently contraindicated for the column, in response to determining that sampling is currently contraindicated for the column, omitting sampling the column, in response to determining that sampling is currently other than contraindicated for the column, sampling the column, determining whether updating the constituent-data index is currently contraindicated for the column, in response to determining that updating the constituent-data index is currently contraindicated for the column, omitting updating the constituent-data index with respect to the column, and in response to determining that updating is currently other than contraindicated for the column, updating the constituent-data index with respect to the column.

20 Claims, 17 Drawing Sheets

INDEXING CONSTITUENT DATA

BACKGROUND

Advances in computer storage and database technology have led to exponential growth of the amount of data being created. Businesses are overwhelmed by the volume of the data stored in their computer systems. Existing database analytic tools are inefficient, costly to utilize, and require substantial configuration and training.

SUMMARY

Disclosed herein are implementations of indexing constituent data in a data access and analysis system.

An aspect of the disclosure is method of indexing constituent data in a data access and analysis system. Indexing constituent data in a data access and analysis system includes obtaining, by an indexing unit of a data access and analysis system, a constituent-data index that includes previously indexed constituent data from a data source accessible by the data access and analysis system, wherein the previously indexed constituent data includes data obtained from a column of a table stored in the data source and updating the constituent-data index. Updating the constituent-data index includes determining whether sampling is currently contraindicated for the column, in response to determining that sampling is currently contraindicated for the column, omitting sampling the column, in response to determining that sampling is currently other than contraindicated for the column, sampling the column, determining whether updating the constituent-data index is currently contraindicated for the column, in response to determining that updating the constituent-data index is currently contraindicated for the column, omitting updating the constituent-data index with respect to the column, and in response to determining that updating is currently other than contraindicated for the column, updating the constituent-data index with respect to the column, obtaining, by the data access and analysis system, user input data including a request for data from the data access and analysis system, obtaining, by data access and analysis system, resolved request data representing the request for data, wherein obtaining the resolved request includes obtaining a token representing a portion of the request for data by traversing the constituent-data index, obtaining, by the data access and analysis system, a data query in accordance with the resolved request data, obtaining, by the data access and analysis system, results data responsive to the request for data generated by execution of the data query by the data source, and outputting the results data.

Another aspect of the disclosure is an apparatus for indexing constituent data in a data access and analysis system. The apparatus includes a non-transitory computer readable medium and a processor that executes instructions stored on the non-transitory computer readable medium to obtain, by an indexing unit of a data access and analysis system, a constituent-data index that includes previously indexed constituent data from a data source accessible by the data access and analysis system, wherein the previously indexed constituent data includes data obtained from a column of a table stored in the data source, update the constituent-data index, obtain, by the data access and analysis system, user input data including a request for data from the data access and analysis system, obtain, by data access and analysis system, resolved request data representing the request for data, wherein to obtain the resolved request the processor executes the instructions to obtain a token representing a portion of the request for data by traversing the constituent-data index, obtain, by the data access and analysis system, a data query in accordance with the resolved request data, obtain, by the data access and analysis system, results data responsive to the request for data generated by execution of the data query by the data source, and output the results data. To update the constituent-data index the processor executes the instructions to determine whether sampling is currently contraindicated for the column, in response to determining that sampling is currently contraindicated for the column, omit sampling the column, in response to determining that sampling is currently other than contraindicated for the column, sample the column, determine whether updating the constituent- data index is currently contraindicated for the column, in response to determining that updating the constituent-data index is currently contraindicated for the column, omit updating the constituent-data index with respect to the column, and in response to determining that sampling is currently other than contraindicated for the column, update the constituent-data index with respect to the column.

Another aspect of the disclosure is a non-transitory computer-readable storage medium, comprising executable instructions that, when executed by a processor, facilitate performance of indexing constituent data in a data access and analysis system. Indexing constituent data in a data access and analysis system includes obtaining, by an indexing unit of a data access and analysis system, a constituent-data index that includes previously indexed constituent data from a data source accessible by the data access and analysis system, wherein the previously indexed constituent data includes data obtained from a column of a table stored in the data source and updating the constituent-data index. Updating the constituent-data index includes determining whether sampling is currently contraindicated for the column, in response to determining that sampling is currently contraindicated for the column, omitting sampling the column, in response to determining that sampling is currently other than contraindicated for the column, sampling the column, determining whether updating the constituent-data index is currently contraindicated for the column, in response to determining that updating the constituent-data index is currently contraindicated for the column, omitting updating the constituent-data index with respect to the column, and in response to determining that updating is currently other than contraindicated for the column, updating the constituent-data index with respect to the column, obtaining, by the data access and analysis system, user input data including a request for data from the data access and analysis system, obtaining, by data access and analysis system, resolved request data representing the request for data, wherein obtaining the resolved request includes obtaining a token representing a portion of the request for data by traversing the constituent-data index, obtaining, by the data access and analysis system, a data query in accordance with the resolved request data, obtaining, by the data access and analysis system, results data responsive to the request for data generated by execution of the data query by the data source, and outputting the results data.

BRIEF DESCRIPTION OF THE DRAWINGS

The disclosure is best understood from the following detailed description when read in conjunction with the accompanying drawings. It is emphasized that, according to common practice, the various features of the drawings are

DETAILED DESCRIPTION

Figure 1:
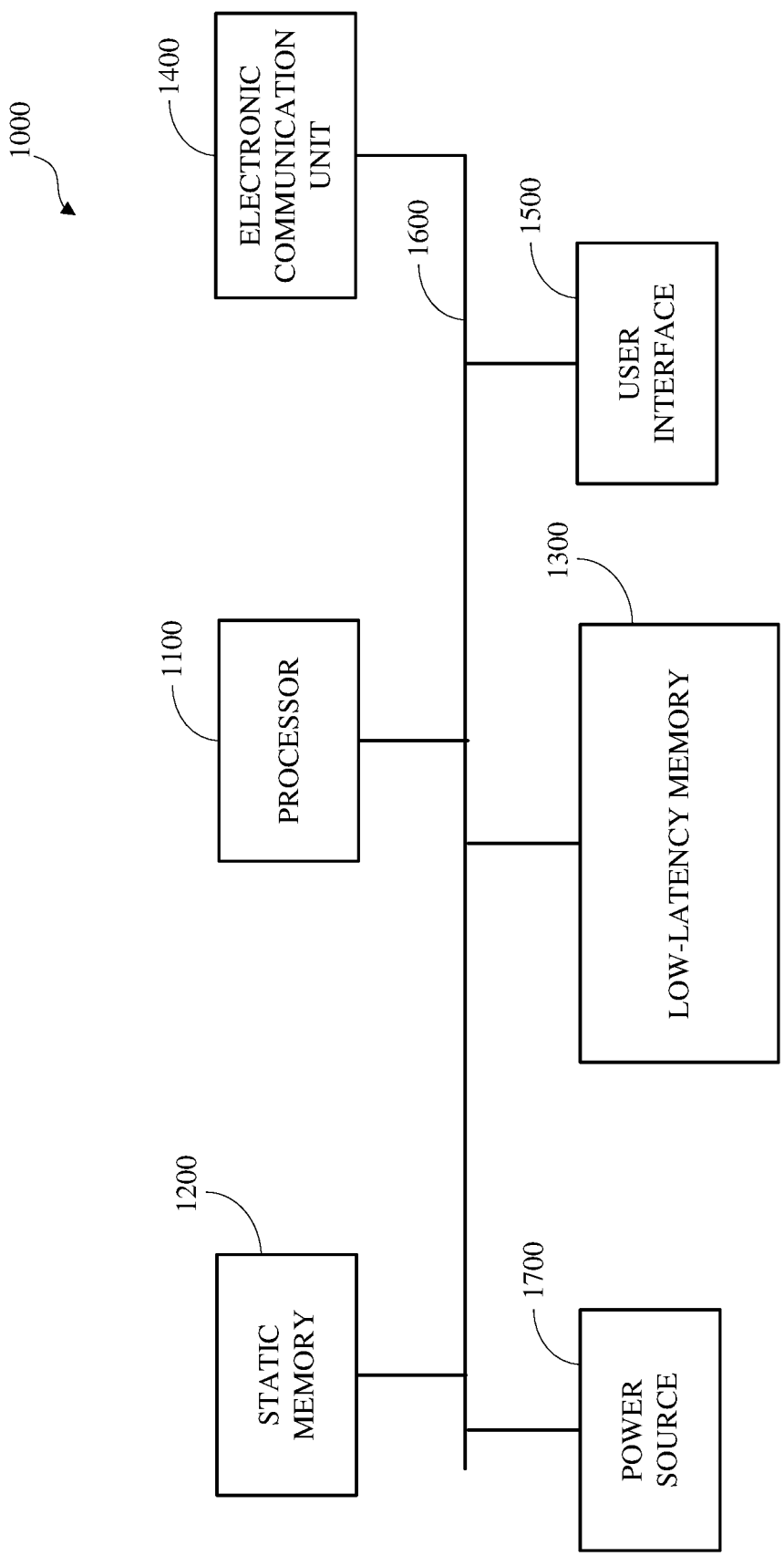
FIG. 1 is a block diagram of an example of a computing device.

Businesses and other organizations store large amounts of data, such as business records, transaction records, and the like, in data storage systems, such as relational database systems that store data as records, or rows, having values, or fields, corresponding to respective columns in tables that can be interrelated using key values. Databases structures are often normalized or otherwise organized to maximize data density and to maximize transactional data operations at the expense of increased complexity and reduced accessibility for analysis. Individual records and tables may have little or no utility without substantial correlation, interpretation, and analysis. The complexity of these data structures and the large volumes of data that can be stored therein limit the accessibility of the data and require substantial skilled human resources to code procedures and tools that allow business users to access useful data. The tools that are available for accessing these systems are limited to outputting data expressly requested by the users and lack the capability to identify and prioritize data other than the data expressly requested. Useful data, such as data aggregations, patterns, and statistical anomalies that would not be available in smaller data sets (e.g., 10,000 rows of data), and may not be apparent to human users, may be derivable using the large volume of data (e.g., millions or billions of rows) stored in complex data storage systems, such as relational database systems, and may be inaccessible due to the complexity and limitations of the data storage systems.

The data access and analysis system described herein improves, or minimizes, resource utilization, improves, or maximizes, accuracy, improves, or maximizes, responsiveness, improves, or maximizes data accessibility, or a combination thereof. For example, the data access and analysis system described herein improves, or minimizes, resource utilization, relative to other systems, by automatically resolving input data, such as user input data, such as string data, including a request for data from the data access and analysis system to obtain a resolved request that includes an ordered sequence of tokens representing the request for data, and using the resolved request to automatically generate a data query expressing the request for data in accordance with a defined structured query language implemented by a data source, which utilizes fewer resources than obtaining a manually, or human, defined data query via interactions with the system. To obtain the resolved request, the data access and analysis system described herein traverses one or more indexes, including a constituent-data index that indexes constituent data stored in a data source, such as an external database. The data access and analysis system described herein improves, or minimizes, resource utilization, relative to other systems, by minimizing the resource utilization associated with maintaining, or updating, the constituent-data index.

FIG. 1 is a block diagram of an example of a computing device 1000. One or more aspects of this disclosure may be implemented using the computing device 1000. The computing device 1000 includes a processor 1100, static memory 1200, low-latency memory 1300, an electronic communication unit 1400, a user interface 1500, a bus 1600, and a power source 1700. Although shown as a single unit, any one or more element of the computing device 1000 may be integrated into any number of separate physical units. For example, the low-latency memory 1300 and the processor 1100 may be integrated in a first physical unit and the user interface 1500 may be integrated in a second physical unit. Although not shown in FIG. 1, the computing device 1000 may include other aspects, such as an enclosure or one or more sensors.

The computing device 1000 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC.

The processor 1100 may include any device or combination of devices capable of manipulating or processing a signal or other information, including optical processors, quantum processors, molecular processors, or a combination thereof. The processor 1100 may be a central processing unit (CPU), such as a microprocessor, and may include one or more processing units, which may respectively include one or more processing cores. The processor 1100 may include multiple interconnected processors. For example, the multiple processors may be hardwired or networked, including wirelessly networked. In some implementations, the operations of the processor 1100 may be distributed across multiple physical devices or units that may be coupled directly or across a network. In some implementations, the processor 1100 may include a cache, or cache memory, for internal storage of operating data or instructions. The processor 1100 may include one or more special purpose processors, one or more digital signal processor (DSP), one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, firmware, one or more state machines, or any combination thereof.

The processor 1100 may be operatively coupled with the static memory 1200, the low-latency memory 1300, the electronic communication unit 1400, the user interface 1500, the bus 1600, the power source 1700, or any combination thereof. The processor may execute, which may include controlling, such as by sending electronic signals to, receiving electronic signals from, or both, the static memory 1200, the low-latency memory 1300, the electronic communication unit 1400, the user interface 1500, the bus 1600, the power source 1700, or any combination thereof to execute, instructions, programs, code, applications, or the like, which may include executing one or more aspects of an operating system, and which may include executing one or more instructions to perform one or more aspects described herein, alone or in combination with one or more other processors.

The static memory 1200 is coupled to the processor 1100 via the bus 1600 and may include non-volatile memory, such as a disk drive, or any form of non-volatile memory capable of persistent electronic information storage, such as in the absence of an active power supply. Although shown as a single block in FIG. 1, the static memory 1200 may be implemented as multiple logical or physical units.

The static memory 1200 may store executable instructions or data, such as application data, an operating system, or a combination thereof, for access by the processor 1100. The executable instructions may be organized into programmable modules or algorithms, functional programs, codes, code segments, or combinations thereof to perform one or more aspects, features, or elements described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer.

The low-latency memory 1300 is coupled to the processor 1100 via the bus 1600 and may include any storage medium with low-latency data access including, for example, DRAM modules such as DDR SDRAM, Phase-Change Memory (PCM), flash memory, or a solid-state drive. Although shown as a single block in FIG. 1, the low-latency memory 1300 may be implemented as multiple logical or physical units. Other configurations may be used. For example, low-latency memory 1300, or a portion thereof, and processor 1100 may be combined, such as by using a system on a chip design.

The low-latency memory 1300 may store executable instructions or data, such as application data for low-latency access by the processor 1100. The executable instructions may include, for example, one or more application programs, that may be executed by the processor 1100. The executable instructions may be organized into programmable modules or algorithms, functional programs, codes, code segments, and/or combinations thereof to perform various functions described herein.

The low-latency memory 1300 may be used to store data that is analyzed or processed using the systems or methods described herein. For example, storage of some or all data in low-latency memory 1300 instead of static memory 1200 may improve the execution speed of the systems and methods described herein by permitting access to data more quickly by an order of magnitude or greater (e.g., nanoseconds instead of microseconds).

The electronic communication unit 1400 is coupled to the processor 1100 via the bus 1600. The electronic communication unit 1400 may include one or more transceivers. The electronic communication unit 1400 may, for example, provide a connection or link to a network via a network interface. The network interface may be a wired network interface, such as Ethernet, or a wireless network interface. For example, the computing device 1000 may communicate with other devices via the electronic communication unit 1400 and the network interface using one or more network protocols, such as Ethernet, Transmission Control Protocol/Internet Protocol (TCP/IP), power line communication (PLC), Wi-Fi, infrared, ultra violet (UV), visible light, fiber optic, wire line, general packet radio service (GPRS), Global System for Mobile communications (GSM), code-division multiple access (CDMA), Long-Term Evolution (LTE), or other suitable protocols.

The user interface 1500 may include any unit capable of interfacing with a human user, such as a virtual or physical keypad, a touchpad, a display, a touch display, a speaker, a microphone, a video camera, a sensor, a printer, or any combination thereof. For example, a keypad can convert physical input of force applied to a key to an electrical signal that can be interpreted by computing device 1000. In another example, a display can convert electrical signals output by computing device 1000 to light. The purpose of such devices may be to permit interaction with a human user, for example by accepting input from the human user and providing output back to the human user. The user interface 1500 may include a display; a positional input device, such as a mouse, touchpad, touchscreen, or the like; a keyboard; or any other human and machine interface device. The user interface 1500 may be coupled to the processor 1100 via the bus 1600. In some implementations, the user interface 1500 can include a display, which can be a liquid crystal display (LCD), a cathode-ray tube (CRT), a light emitting diode (LED) display, an organic light emitting diode (OLED) display, an active-matrix organic light emitting diode (AMOLED), or other suitable display. In some implementations, the user interface 1500, or a portion thereof, may be part of another computing device (not shown). For example, a physical user interface, or a portion thereof, may be omitted from the computing device 1000 and a remote or virtual interface may be used, such as via the electronic communication unit 1400.

The bus 1600 is coupled to the static memory 1200, the low-latency memory 1300, the electronic communication unit 1400, the user interface 1500, and the power source 1700. Although a single bus is shown in FIG. 1, the bus 1600 may include multiple buses, which may be connected, such as via bridges, controllers, or adapters.

The power source 1700 provides energy to operate the computing device 1000. The power source 1700 may be a general-purpose alternating-current (AC) electric power supply, or power supply interface, such as an interface to a household power source. In some implementations, the power source 1700 may be a single use battery or a rechargeable battery to allow the computing device 1000 to operate independently of an external power distribution system. For example, the power source 1700 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device capable of powering the computing device 1000.

Figure 2:
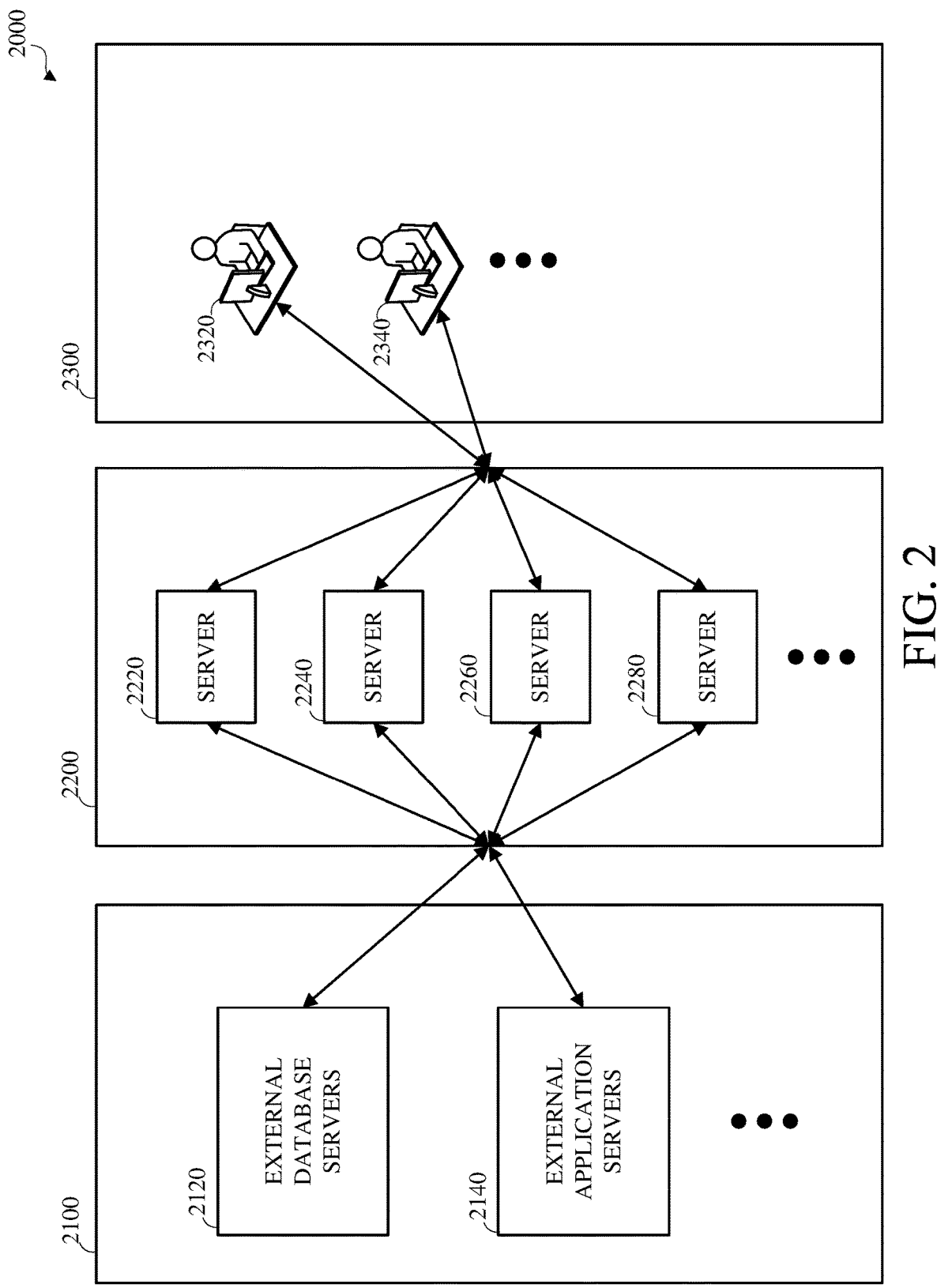
FIG. 2 is a block diagram of an example of a computing system.

FIG. 2 is a block diagram of an example of a computing system 2000. As shown, the computing system 2000 includes an external data source portion 2100, an internal database analysis portion 2200, and a system interface portion 2300. The computing system 2000 may include other elements not shown in FIG. 2, such as computer network elements.

The external data source portion 2100 may be associated with, such as controlled by, an external person, entity, or organization (second party). The internal database analysis portion 2200 may be associated with, such as created by or controlled by, a person, entity, or organization (first party). The system interface portion 2300 may be associated with, such as created by or controlled by, the first party and may be accessed by the first party, the second party, third parties, or a combination thereof, such as in accordance with access and authorization permissions and procedures.

The external data source portion 2100 is shown as including external database servers 2120 and external application servers 2140. The external data source portion 2100 may include other elements not shown in FIG. 2. The external data source portion 2100 may include external computing devices, such as the computing device 1000 shown in FIG. 1, which may be used by or accessible to the external person, entity, or organization (second party) associated with the external data source portion 2100, including but not limited to external database servers 2120 and external application servers 2140. The external computing devices may include data regarding the operation of the external person, entity, or organization (second party) associated with the external data source portion 2100.

The external database servers 2120 may be one or more computing devices configured to store data in a format and schema determined externally from the internal database analysis portion 2200, such as by a second party associated with the external data source portion 2100, or a third party. For example, the external database server 2120 may use a relational database and may include a database catalog with a schema. In some embodiments, the external database server 2120 may include a non-database data storage structure, such as a text-based data structure, such as a comma separated variable structure or an extensible markup language formatted structure or file. For example, the external database servers 2120 can include data regarding the production of materials by the external person, entity, or organization (second party) associated with the external data source portion 2100, communications between the external person, entity, or organization (second party) associated with the external data source portion 2100 and third parties, or a combination thereof. Other data may be included. The external database may be a structured database system, such as a relational database operating in a relational database management system (RDBMS), which may be an enterprise database. In some embodiments, the external database may be an unstructured data source. The external data may include data or content, such as sales data, revenue data, profit data, tax data, shipping data, safety data, sports data, health data, meteorological data, or the like, or any other data, or combination of data, that may be generated by or associated with a user, an organization, or an enterprise and stored in a database system. For simplicity and clarity, data stored in or received from the external data source portion 2100 may be referred to herein as enterprise data.

The external application server 2140 may include application software, such as application software used by the external person, entity, or organization (second party) associated with the external data source portion 2100. The external application server 2140 may include data or metadata relating to the application software.

The external database servers 2120, the external application servers 2140, or both, shown in FIG. 2 may represent logical units or devices that may be implemented on one or more physical units or devices, which may be controlled or operated by the first party, the second party, or a third party.

The external data source portion 2100, or aspects thereof, such as the external database servers 2120, the external application servers 2140, or both, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

The internal database analysis portion 2200 is shown as including servers 2220, 2240, 2260, and 2280. The servers 2220, 2240, 2260, and 2280 may be computing devices, such as the computing device 1000 shown in FIG. 1. Although four servers 2220, 2240, 2260, and 2280 are shown in FIG. 2, other numbers, or cardinalities, of servers may be used. For example, the number of computing devices may be determined based on the capability of individual computing devices, the amount of data to be processed, the complexity of the data to be processed, or a combination thereof. Other metrics may be used for determining the number of computing devices.

The internal database analysis portion 2200 may store data, process data, or store and process data. The internal database analysis portion 2200 may include a distributed cluster (not expressly shown) which may include two or more of the servers 2220, 2240, 2260, and 2280. The operation of the distributed cluster, such as the operation of the servers 2220, 2240, 2260, and 2280 individually, in combination, or both, may be managed by a distributed cluster manager. For example, the server 2220 may be the distributed cluster manager. In another example, the distributed cluster manager may be implemented on another computing device (not shown). The data and processing of the distributed cluster may be distributed among the servers 2220, 2240, 2260, and 2280, such as by the distributed cluster manager.

Enterprise data from the external data source portion 2100, such as from the external database server 2120, the external application server 2140, or both may be imported into the internal database analysis portion 2200. The external database server 2120, the external application server 2140, or both may be one or more computing devices and may communicate with the internal database analysis portion 2200 via electronic communication. The imported data may be distributed among, processed by, stored on, or a combination thereof, one or more of the servers 2220, 2240, 2260, and 2280. Importing the enterprise data may include importing or accessing the data structures of the enterprise data. Importing the enterprise data may include generating internal data, internal data structures, or both, based on the enterprise data. The internal data, internal data structures, or both may accurately represent and may differ from the enterprise data, the data structures of the enterprise data, or both. In some implementations, enterprise data from multiple external data sources may be imported into the internal database analysis portion 2200. For simplicity and clarity, data stored or used in the internal database analysis portion 2200 may be referred to herein as internal data. For example, the internal data, or a portion thereof, may represent, and may be distinct from, enterprise data imported into or accessed by the internal database analysis portion 2200.

The system interface portion 2300 may include one or more client devices 2320, 2340. The client devices 2320, 2340 may be computing devices, such as the computing device 1000 shown in FIG. 1. For example, one of the client devices 2320, 2340 may be a desktop or laptop computer and the other of the client devices 2320, 2340 may be a mobile device, smartphone, or tablet. One or more of the client devices 2320, 2340 may access the internal database analysis portion 2200. For example, the internal database analysis portion 2200 may provide one or more services, application interfaces, or other electronic computer communication interfaces, such as a web site, and the client devices 2320, 2340 may access the interfaces provided by the internal database analysis portion 2200, which may include accessing the internal data stored in the internal database analysis portion 2200.

In an example, one or more of the client devices 2320, 2340 may send a message or signal indicating a request for data, which may include a request for data analysis, to the internal database analysis portion 2200. The internal database analysis portion 2200 may receive and process the request, which may include distributing the processing among one or more of the servers 2220, 2240, 2260, and 2280, may generate a response to the request, which may include generating or modifying internal data, internal data structures, or both, and may output the response to the client device 2320, 2340 that sent the request. Processing the request may include accessing one or more internal data indexes, an internal database, or a combination thereof. The client device 2320, 2340 may receive the response, including the response data or a portion thereof, and may store, output, or both, the response, or a representation thereof, such as a representation of the response data, or a portion thereof, which may include presenting the representation via a user interface on a presentation device of the client device 2320, 2340, such as to a user of the client device 2320, 2340.

The system interface portion 2300, or aspects thereof, such as one or more of the client devices 2320, 2340, may communicate with the internal database analysis portion 2200, or an aspect thereof, such as one or more of the servers 2220, 2240, 2260, and 2280, via an electronic communication medium, which may be a wired or wireless electronic communication medium. For example, the electronic communication medium may include a local area network (LAN), a wide area network (WAN), a fiber channel network, the Internet, or a combination thereof.

Figure 3:
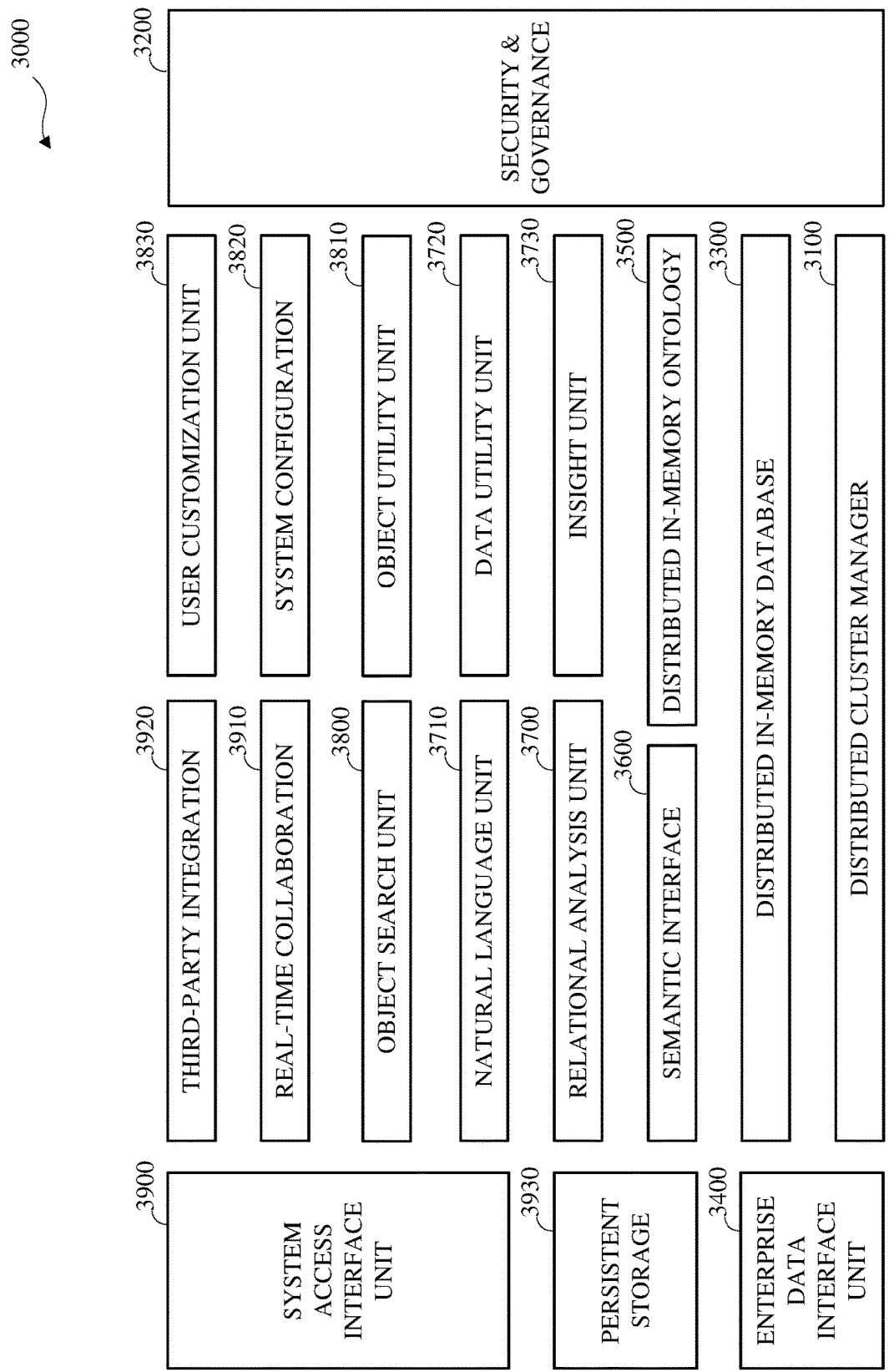
FIG. 3 is a block diagram of an example of a low-latency data access and analysis system.

FIG. 3 is a block diagram of an example of a data access and analysis system 3000. The data access and analysis system 3000, or aspects thereof, may be similar to the internal database analysis portion 2200 shown in FIG. 2, except as described herein or otherwise clear from context. The data access and analysis system 3000, or aspects thereof, may be implemented on one or more computing devices, such as servers 2220, 2240, 2260, and 2280 shown in FIG. 2, which may be in a clustered or distributed computing configuration. As used herein, the terms "data access and analysis system," "data analysis system," and "database analysis system" indicate a computer implemented system, such as the data access and analysis system 3000 shown in FIG. 3, that obtains, stores, organizes, processes, automatically analyzes, and outputs data and visualizations thereof.

The data access and analysis system 3000, which may be a database analysis system, may store and maintain the internal data, or a portion thereof, such as low-latency data, in a low-latency memory device, such as the low-latency memory 1300 shown in FIG. 1, or any other type of data storage medium or combination of data storage devices with relatively fast (low-latency) data access, organized in a low-latency data structure. In some embodiments, the data access and analysis system 3000 may be implemented as one or more logical devices in a cloud-based configuration optimized for automatic database analysis.

As shown, the data access and analysis system 3000 includes a distributed cluster manager 3100, a security and governance unit 3200, a distributed in-memory database 3300, an enterprise data interface unit 3400, a distributed in-memory ontology unit 3500, a semantic interface unit 3600, a relational analysis unit 3700, a natural language processing unit 3710, a data utility unit 3720, an insight unit 3730, an object search unit 3800, an object utility unit 3810, a system configuration unit 3820, a user customization unit 3830, a system access interface unit 3900, a real-time collaboration unit 3910, a third-party integration unit 3920, and a persistent storage unit 3930, which may be collectively referred to as the components of the data access and analysis system 3000.

Although not expressly shown in FIG. 3, one or more of the components of the data access and analysis system 3000 may be implemented on one or more operatively connected physical or logical computing devices, such as in a distributed cluster computing configuration, such as the internal database analysis portion 2200 shown in FIG. 2. Although shown separately in FIG. 3, one or more of the components of the data access and analysis system 3000, or respective aspects thereof, may be combined or otherwise organized.

The data access and analysis system 3000 may include different, fewer, or additional components not shown in FIG. 3. The aspects or components implemented in an instance of the data access and analysis system 3000 may be configurable. For example, the insight unit 3730 may be omitted or disabled. One or more of the components of the data access and analysis system 3000 may be implemented in a manner such that aspects thereof are divided or combined into various executable modules or libraries in a manner which may differ from that described herein.

The data access and analysis system 3000 may implement an application programming interface (API), which may monitor, receive, or both, input signals or messages from external devices and systems, client systems, process received signals or messages, transmit corresponding signals or messages to one or more of the components of the data access and analysis system 3000, and output, such as transmit or send, output messages or signals to respective external devices or systems. The data access and analysis system 3000 may be implemented in a distributed computing configuration.

The distributed cluster manager 3100 manages the operative configuration of the data access and analysis system 3000. Managing the operative configuration of the data access and analysis system 3000 may include controlling the implementation of and distribution of processing and storage across one or more logical devices operating on one or more physical devices, such as the servers 2220, 2240, 2260, and 2280 shown in FIG. 2. The distributed cluster manager 3100 may generate and maintain configuration data for the data access and analysis system 3000, such as in one or more tables, identifying the operative configuration of the data access and analysis system 3000. For example, the distributed cluster manager 3100 may automatically update the data access and analysis system configuration data in response to an operative configuration event, such as a change in availability or performance for a physical or logical unit of the data access and analysis system 3000. One or more of the component units of data access and analysis system 3000 may access the data analysis system configuration data, such as to identify intercommunication parameters or paths.

The security and governance unit 3200 may describe, implement, enforce, or a combination thereof, rules and procedures for controlling access to aspects of the data access and analysis system 3000, such as the internal data of the data access and analysis system 3000 and the features and interfaces of the data access and analysis system 3000. The security and governance unit 3200 may apply security at an ontological level to control or limit access to the internal data of the data access and analysis system 3000, such as to columns, tables, rows, or fields, which may include using row-level security.

Although shown as a single unit in FIG. 3, the distributed in-memory database 3300 may be implemented in a distributed configuration, such as distributed among the servers 2220, 2240, 2260, and 2280 shown in FIG. 2, which may include multiple in-memory database instances. Each in-memory database instance may utilize one or more distinct resources, such as processing or low-latency memory resources, that differ from the resources utilized by the other in-memory database instances. In some embodiments, the in-memory database instances may utilize one or more shared resources, such as resources utilized by two or more in-memory database instances.

The distributed in-memory database 3300 may generate, maintain, or both, a low-latency data structure and data stored or maintained therein (low-latency data). The low-latency data may include principal data, which may represent enterprise data, such as enterprise data imported from an external enterprise data source, such as the external data source portion 2100 shown in FIG. 2. In some implementations, the distributed in-memory database 3300 may include system internal data representing one or more aspects, features, or configurations of the data access and analysis system 3000. The distributed in-memory database 3300 and the low-latency data stored therein, or a portion thereof, may be accessed using commands, messages, or signals in accordance with a defined structured query language associated with, such as implemented by, the distributed in-memory database 3300.

The low-latency data, or a portion thereof, may be organized as tables in the distributed in-memory database 3300. A table may be a data structure to organize or group the data or a portion thereof, such as related or similar data. A table may have a defined structure. For example, each table may define or describe a respective set of one or more columns.

A column may define or describe the characteristics of a discrete aspect of the data in the table. For example, the definition or description of a column may include an identifier, such as a name, for the column within the table, and one or more constraints, such as a data type, for the data corresponding to the column in the table. The definition or description of a column may include other information, such as a description of the column. The data in a table may be accessible or partitionable on a per-column basis. The set of tables, including the column definitions therein, and information describing relationships between elements, such as tables and columns, of the database may be defined or described by a database schema or design. The cardinality of columns of a table, and the definition and organization of the columns, may be defined by the database schema or design. Adding, deleting, or modifying a table, a column, the definition thereof, or a relationship or constraint thereon, may be a modification of the database design, schema, model, or structure.

The low-latency data, or a portion thereof, may be stored in the database as one or more rows or records in respective tables. Each record or row of a table may include a respective field or cell corresponding to each column of the table. A field may store a discrete data value. The cardinality of rows of a table, and the values stored therein, may be variable based on the data. Adding, deleting, or modifying rows, or the data stored therein may omit modification of the database design, schema, or structure. The data stored in respective columns may be identified or defined as a measure data, attribute data, or enterprise ontology data (e.g., metadata).

Measure data, or measure values, may include quantifiable or additive numeric values, such as integer or floating-point values, which may include numeric values indicating sizes, amounts, degrees, or the like. A column defined as representing measure values may be referred to herein as a measure or fact. A measure may be a property on which quantitative operations (e.g., sum, count, average, minimum, maximum) may be performed to calculate or determine a result or output.

Attribute data, or attribute values, may include non-quantifiable values, such as text or image data, which may indicate names and descriptions, quantifiable values designated, defined, or identified as attribute data, such as numeric unit identifiers, or a combination thereof. A column defined as including attribute values may be referred to herein as an attribute or dimension. For example, attributes may include text, identifiers, timestamps, or the like.

Enterprise ontology data may include data that defines or describes one or more aspects of the database, such as data that describes one or more aspects of the attributes, measures, rows, columns, tables, relationships, or other aspects of the data or database schema. For example, a portion of the database design, model, or schema may be represented as enterprise ontology data in one or more tables in the database.

Distinctly identifiable data in the low-latency data may be referred to herein as a data portion. For example, the low-latency data stored in the distributed in-memory database 3300 may be referred to herein as a data portion, a table from the low-latency data may be referred to herein as a data portion, a column from the low-latency data may be referred to herein as a data portion, a row or record from the low-latency data may be referred to herein as a data portion, a value from the low-latency data may be referred to herein as a data portion, a relationship defined in the low-latency data may be referred to herein as a data portion, enterprise ontology data describing the low-latency data may be referred to herein as a data portion, or any other distinctly identifiable data, or combination thereof, from the low-latency data may be referred to herein as a data portion.

The distributed in-memory database 3300 may create or add one or more data portions, such as a table, may read from or access one or more data portions, may update or modify one or more data portions, may remove or delete one or more data portions, or a combination thereof. Adding, modifying, or removing data portions may include changes to the data model of the low-latency data. Changing the data model of the low-latency data may include notifying one or more other components of the data access and analysis system 3000, such as by sending, or otherwise making available, a message or signal indicating the change. For example, the distributed in-memory database 3300 may create or add a table to the low-latency data and may transmit or send a message or signal indicating the change to the semantic interface unit 3600.

In some implementations, a portion of the low-latency data may represent a data model of an external enterprise database and may omit the data stored in the external enterprise database, or a portion thereof. For example, prioritized data may be cached in the distributed in-memory database 3300 and the other data may be omitted from storage in the distributed in-memory database 3300, which may be stored in the external enterprise database. In some implementations, requesting data from the distributed in-memory database 3300 may include requesting the data, or a portion thereof, from the external enterprise database.

The distributed in-memory database 3300 may receive one or more messages or signals indicating respective data-queries for the low-latency data, or a portion thereof, which may include data-queries for modified, generated, or aggregated data generated based on the low-latency data, or a portion thereof. For example, the distributed in-memory database 3300 may receive a data-query from the semantic interface unit 3600, such as in accordance with a request for data. The data-queries received by the distributed in-memory database 3300 may be agnostic to the distributed configuration of the distributed in-memory database 3300. A data-query, or a portion thereof, may be expressed in accordance with the defined structured query language implemented by the distributed in-memory database 3300. In some implementations, a data-query, or a portion thereof, may be expressed in accordance with a defined structured query language implemented by a defined database other than the distributed in-memory database 3300, such as an external database. In some implementations, a data-query may be included, such as stored or communicated, in a data-query data structure or container.

The distributed in-memory database 3300 may execute or perform one or more queries to generate or obtain response data responsive to the data-query based on the low-latency data. Unless expressly described, or otherwise clear from context, descriptions herein of a table in the context of performing, processing, or executing a data-query that include accessing, such as reading, writing, or otherwise using, a table, or data from a table, may refer to a table stored, or otherwise maintained, in the distributed in-memory database independently of the data-query or may refer to tabular data obtained, such as generated, in accordance with the data-query.

The distributed in-memory database 3300 may interpret, evaluate, or otherwise process a data-query to generate one or more distributed-queries, which may be expressed in accordance with the defined structured query language. For example, an in-memory database instance of the distributed in-memory database 3300 may be identified as a query coordinator. The query coordinator may generate a query plan, which may include generating one or more distributed-queries, based on the received data-query. The query plan may include query execution instructions for executing one or more queries, or one or more portions thereof, based on the received data-query by the one or more of the in-memory database instances. Generating the query plan may include optimizing the query plan. The query coordinator may distribute, or otherwise make available, the respective portions of the query plan, as query execution instructions, to the corresponding in-memory database instances.

The respective in-memory database instances may receive the corresponding query execution instructions from the query coordinator. The respective in-memory database instances may execute the corresponding query execution instructions to obtain, process, or both, data (intermediate results data) from the low-latency data. The respective in-memory database instances may output, or otherwise make available, the intermediate results data, such as to the query coordinator.

The query coordinator may execute a respective portion of query execution instructions (allocated to the query coordinator) to obtain, process, or both, data (intermediate results data) from the low-latency data. The query coordinator may receive, or otherwise access, the intermediate results data from the respective in-memory database instances. The query coordinator may combine, aggregate, or otherwise process, the intermediate results data to obtain results data.

In some embodiments, obtaining the intermediate results data by one or more of the in-memory database instances may include outputting the intermediate results data to, or obtaining intermediate results data from, one or more other in-memory database instances, in addition to, or instead of, obtaining the intermediate results data from the low-latency data.

The distributed in-memory database 3300 may output, or otherwise make available, the results data to the semantic interface unit 3600.

The enterprise data interface unit 3400 may interface with, or communicate with, an external enterprise data system. For example, the enterprise data interface unit 3400 may receive or access enterprise data from or in an external system, such as an external database. The enterprise data interface unit 3400 may import, evaluate, or otherwise process the enterprise data to populate, create, or modify data stored in the data access and analysis system 3000. The enterprise data interface unit 3400 may receive, or otherwise access, the enterprise data from one or more external data sources, such as the external data source portion 2100 shown in FIG. 2, and may represent the enterprise data in the data access and analysis system 3000 by importing, loading, or populating the enterprise data as principal data in the distributed in-memory database 3300, such as in one or more low-latency data structures. The enterprise data interface unit 3400 may implement one or more data connectors, which may transfer data between, for example, the external data source and the distributed in-memory database 3300, which may include altering, formatting, evaluating, or manipulating the data.

The enterprise data interface unit 3400 may receive, access, or generate metadata that identifies one or more parameters or relationships for the principal data, such as based on the enterprise data, and may include the generated metadata in the low-latency data stored in the distributed in-memory database 3300. For example, the enterprise data interface unit 3400 may identify characteristics of the principal data such as, attributes, measures, values, unique identifiers, tags, links, keys, or the like, and may include metadata representing the identified characteristics in the low-latency data stored in the distributed in-memory database 3300. The characteristics of the data can be automatically determined by receiving, accessing, processing, evaluating, or interpreting the schema in which the enterprise data is stored, which may include automatically identifying links or relationships between columns, classifying columns (e.g., using column names), and analyzing or evaluating the data.

Although not shown separately in FIG. 3, the data access and analysis system 3000 implements a canonical, or system-defined, chronometry. The system-defined chronometry defines the measurement, storage, processing, organization, scale, expression, and representation of time and temporal data in the database analysis system 3000. For example, the system-defined chronometry may correspond with a Gregorian calendar, or a defined variant thereof. The system-defined chronometry defines one or more chronometric units, which may be nominal, or named, representations of respective temporal intervals. A reference chronometric unit, such as a 'second' chronometric unit, may represent a minimal temporal interval in the database analysis system. One or more aspects of the system-defined chronometry may be defined by the operating environment of the database analysis system, such as by a hardware component, an operating system, or a combination thereof. For example, a hardware component, such as a system clock (clock circuit) may define the temporal interval of the reference chronometric unit and an operating system may define one or more other chronometric units with reference to the reference chronometric unit.

The database analysis system 3000 may define or describe one or more chronometric unit types, such as a 'minute' chronometric unit type, an 'hour' chronometric unit type, a 'day' chronometric unit type, a 'week' chronometric unit type, a 'month' chronometric unit type, a 'quarter' chronometric unit type, a 'year' chronometric unit type, or any other type of chronometric unit. A temporal point may be represented, such as stored or processed, in the database analysis system as an epoch value, which may be an integer value, such that each temporal point from the contiguous sequence of temporal points that comprises the temporal continuum corresponds with a respective epoch value. A temporal location may be represented in the database analysis system as an epoch value and may be expressed in the database analysis system using one or more chronometric units, or respective values thereof. The system-defined chronometry defines respective descriptors, such as a day-of-week-name, month-name, and the like. Data defining or describing the system-defined chronometry may be stored in the data access and analysis system as a chronometric dataset. In some implementations, the data access and analysis system may define or describe a domain-specific chronometry that differs from the system-defined chronometry. The chronometric units defined or described by the domain-specific chronometry, except for the reference chronometric unit, may differ from the chronometric units defined or described by the system-defined chronometry. Data defining or describing the domain-specific chronometry may be stored in the data access and analysis system as a chronometric dataset.

Distinctly identifiable operative data units or structures representing one or more data portions, one or more entities, users, groups, or organizations represented in the internal data, or one or more aggregations, collections, relations, analytical results, visualizations, or groupings thereof, may be represented in the data access and analysis system 3000 as objects. An object may include a unique identifier for the object, such as a fully qualified name. An object may include a name, such as a displayable value, for the object.

For example, an object may represent a user, a group, an entity, an organization, a privilege, a role, a table, a column, a data relationship, a worksheet, a view, an access context, an answer, an insight, a pinboard, a tag, a comment, a trigger, a defined variable, a data source, an object-level security rule, a row-level security rule, or any other data capable of being distinctly identified and stored or otherwise obtained in the data access and analysis system 3000. An object may represent or correspond with a logical entity. Data describing an object may include data operatively or uniquely identifying data corresponding to, or represented by, the object in the data access and analysis system. For example, a column in a table in a database in the data access and analysis system may be represented in the data access and analysis system as an object and the data describing or defining the object may include data operatively or uniquely identifying the column.

A worksheet (worksheet object), or worksheet table, may be a logical table, or a definition thereof, which may be a collection, a sub-set (such as a subset of columns from one or more tables), or both, of data from one or more data sources, such as columns in one or more tables, such as in the distributed in-memory database 3300. A worksheet, or a definition thereof, may include one or more data organization or manipulation definitions, such as join paths or worksheet-column definitions, which may be user defined. A worksheet may be a data structure that may contain one or more rules or definitions that may define or describe how a respective tabular set of data may be obtained, which may include defining one or more sources of data, such as one or more columns from the distributed in-memory database 3300. A worksheet may be a data source. For example, a worksheet may include references to one or more data sources, such as columns in one or more tables, such as in the distributed in-memory database 3300, and a request for data referencing the worksheet may access the data from the data sources referenced in the worksheet. In some implementations, a worksheet may omit aggregations of the data from the data sources referenced in the worksheet.

An answer (answer object), or report, may represent a defined, such as previously generated, request for data, such as a resolved request. An answer may include information describing a visualization of data responsive to the request for data.

A visualization (visualization object) may be a defined representation or expression of data, such as a visual representation of the data, for presentation to a user or human observer, such as via a user interface. Although described as a visual representation, in some implementations, a visualization may include non-visual aspects, such as auditory or haptic presentation aspects. A visualization may be generated to represent a defined set of data in accordance with a defined visualization type or template (visualization template object), such as in a chart, graph, or tabular form. Example visualization types may include, and are not limited to, chloropleths, cartograms, dot distribution maps, proportional symbol maps, contour/isopleth/isarithmic maps, daysymetric map, self-organizing map, timeline, time series, connected scatter plots, Gantt charts, steam graph/theme river, arc diagrams, polar area/rose/circumplex charts, Sankey diagrams, alluvial diagrams, pie charts, histograms, tag clouds, bubble charts, bubble clouds, bar charts, radial bar charts, tree maps, scatter plots, line charts, step charts, area charts, stacked graphs, heat maps, parallel coordinates, spider charts, box and whisker plots, mosaic displays, waterfall charts, funnel charts, or radial tree maps. A visualization template may define or describe one or more visualization parameters, such as one or more color parameters. Visualization data for a visualization may include values of one or more of the visualization parameters of the corresponding visualization template.

A view (view object) may be a logical table, or a definition thereof, which may be a collection, a sub-set, or both, of data from one or more data sources, such as columns in one or more tables, such as in the distributed in-memory database 3300. For example, a view may be generated based on an answer, such as by storing the answer as a view. A view may define or describe a data aggregation. A view may be a data source. For example, a view may include references to one or more data sources, such as columns in one or more tables, such as in the distributed in-memory database 3300, which may include a definition or description of an aggregation of the data from a respective data source, and a request for data referencing the view may access the aggregated data, the data from the unaggregated data sources referenced in the worksheet, or a combination thereof. The unaggregated data from data sources referenced in the view defined or described as aggregated data in the view may be unavailable based on the view. A view may be a materialized view or an unmaterialized view. A request for data referencing a materialized view may obtain data from a set of data previously obtained (view-materialization) in accordance with the definition of the view and the request for data. A request for data referencing an unmaterialized view may obtain data from a set of data currently obtained in accordance with the definition of the view and the request for data.

A pinboard (pinboard object), or dashboard, may be a defined collection or grouping of objects, such as visualizations, answers, or insights. Pinboard data for a pinboard may include information associated with the pinboard, which may be associated with respective objects included in the pinboard.

An access context (access-context object) may be a set or collection of data associated with, such as including, data expressing usage intent, such as a request for data, data responsive to data expressing usage intent, or a discretely related sequence or series of requests for data or other interactions with the data access and analysis system 3000, and a corresponding data structure for containing such data. For example, data expressing usage intent may be generated by the data access and analysis system 3000, or a component thereof, such as the system access interface unit 3900, such as in response to input, such as user input, obtained by the data access and analysis system 3000. In another example, data expressing usage intent may be obtained, received, or otherwise accessed, by the data access and analysis system 3000, or a component thereof, from an external device or system.

A definition may be a set of data describing the structure or organization of a data portion. For example, in the distributed in-memory database 3300, a column definition may define one or more aspects of a column in a table, such as a name of the column, a description of the column, a datatype for the column, or any other information about the column that may be represented as discrete data.

A data source object may represent a source or repository of data accessible by the data access and analysis system 3000. A data source object may include data indicating an electronic communication location, such as an address, of a data source, connection information, such as protocol information, authentication information, or a combination thereof, or any other information about the data source that may be represented as discrete data. For example, a data source object may represent a table in the distributed in-memory database 3300 and include data for accessing the table from the database, such as information identifying the database, information identifying a schema within the database, and information identifying the table within the schema within the database. A data source object (external data source object) may represent an external data source. For example, an external data source object may include data indicating an electronic communication location, such as an address, of an external data source, connection information, such as protocol information, authentication information, or a combination thereof, or any other information about the external data source that may be represented as discrete data.

A sticker (sticker object) may be a description of a classification, category, tag, subject area, or other information that may be associated with one or more other objects such that objects associated with a sticker may be grouped, sorted, filtered, or otherwise identified based on the sticker. In the distributed in-memory database 3300 a tag may be a discrete data portion that may be associated with other data portions, such that data portions associated with a tag may be grouped, sorted, filtered, or otherwise identified based on the tag.

The distributed in-memory ontology unit 3500 generates, maintains, or both, information (ontological data) defining or describing the operative ontological structure of the objects represented in the data access and analysis system 3000, such as in the low-latency data stored in the distributed in-memory database 3300, which may include describing attributes, properties, states, or other information about respective objects and may include describing relationships among respective objects.

Objects may be referred to herein as primary objects, secondary objects, or tertiary objects. Other types of objects may be used.

Primary objects may include objects representing distinctly identifiable operative data units or structures representing one or more data portions in the distributed in-memory database 3300, or another data source in the data access and analysis system 3000. For example, primary objects may be data source objects, table objects, column objects, relationship objects, or the like. Primary objects may include worksheets, views, filters, such as row-level-security filters and table filters, variables, or the like. Primary objects may be referred to herein as data-objects or queryable-objects.

Secondary objects may be objects representing distinctly identifiable operative data units or structures representing analytical data aggregations, collections, analytical results, visualizations, or groupings thereof, such as pinboard objects, answer objects, insights, visualization objects, resolved-request objects, and the like. Secondary objects may be referred to herein as analytical-objects.

Tertiary objects may be objects representing distinctly identifiable operative data units or structures representing operational aspects of the data access and analysis system 3000, such as one or more entities, users, groups, or organizations represented in the internal data, such as user objects, user-group objects, role objects, sticker objects, and the like.

The distributed in-memory ontology unit 3500 may represent the ontological structure, which may include the objects therein, as a graph having nodes and edges. A node may be a representation of an object in the graph structure of the distributed in-memory ontology unit 3500. A node, representing an object, can include one or more components.

The components of a node may be versioned, such as on a per-component basis. For example, a node can include a header component, a content component, or both. A header component may include information about the node. A content component may include the content of the node. An edge may represent a relationship between nodes, which may be directional.

In some implementations, the distributed in-memory ontology unit 3500 graph may include one or more nodes, edges, or both, representing one or more objects, relationships or both, corresponding to a respective internal representation of enterprise data stored in an external enterprise data storage unit, wherein a portion of the data stored in the external enterprise data storage unit represented in the distributed in-memory ontology unit 3500 graph is omitted from the distributed in-memory database 3300.

In some embodiments, the distributed in-memory ontology unit 3500 may generate, modify, or remove a portion of the ontology graph in response to one or more messages, signals, or notifications from one or more of the components of the data access and analysis system 3000. For example, the distributed in-memory ontology unit 3500 may generate, modify, or remove a portion of the ontology graph in response to receiving one or more messages, signals, or notifications from the distributed in-memory database 3300 indicating a change to the low-latency data structure. In another example, the distributed in-memory database 3300 may send one or more messages, signals, or notifications indicating a change to the low-latency data structure to the semantic interface unit 3600 and the semantic interface unit 3600 may send one or more messages, signals, or notifications indicating the change to the low-latency data structure to the distributed in-memory ontology unit 3500.

The distributed in-memory ontology unit 3500 may be distributed, in-memory, multi-versioned, transactional, consistent, durable, or a combination thereof. The distributed in-memory ontology unit 3500 is transactional, which may include implementing atomic concurrent, or substantially concurrent, updating of multiple objects. The distributed in-memory ontology unit 3500 is durable, which may include implementing a robust storage that prevents data loss subsequent to or as a result of the completion of an atomic operation. The distributed in-memory ontology unit 3500 is consistent, which may include performing operations associated with a request for data with reference to or using a discrete data set, which may mitigate or eliminate the risk of inconsistent results.

The distributed in-memory ontology unit 3500 may generate, output, or both, one or more event notifications. For example, the distributed in-memory ontology unit 3500 may generate, output, or both, a notification, or notifications, in response to a change of the distributed in-memory ontology. The distributed in-memory ontology unit 3500 may identify a portion of the distributed in-memory ontology (graph) associated with a change of the distributed in-memory ontology, such as one or more nodes depending from a changed node, and may generate, output, or both, a notification, or notifications indicating the identified relevant portion of the distributed in-memory ontology (graph). One or more aspects of the data access and analysis system 3000 may cache object data and may receive the notifications from the distributed in-memory ontology unit 3500, which may reduce latency and network traffic relative to systems that omit caching object data or omit notifications relevant to changes to portions of the distributed in-memory ontology (graph).

The distributed in-memory ontology unit 3500 may implement prefetching. For example, the distributed in-memory ontology unit 3500 may predictively, such as based on determined probabilistic utility, fetch one or more nodes, such as in response to access to a related node by a component of the data access and analysis system 3000.

The distributed in-memory ontology unit 3500 may implement a multi-version concurrency control graph data storage unit. Each node, object, or both, may be versioned. Changes to the distributed in-memory ontology may be reversible. For example, the distributed in-memory ontology may have a first state prior to a change to the distributed in-memory ontology, the distributed in-memory ontology may have a second state subsequent to the change, and the state of the distributed in-memory ontology may be reverted to the first state subsequent to the change, such as in response to the identification of an error or failure associated with the second state.

In some implementations, reverting a node, or a set of nodes, may omit reverting one or more other nodes. In some implementations, the distributed in-memory ontology unit 3500 may maintain a change log indicating a sequential record of changes to the distributed in-memory ontology (graph), such that a change to a node or a set of nodes may be reverted and one or more other changes subsequent to the reverted change may be reverted for consistency.

The distributed in-memory ontology unit 3500 may implement optimistic locking to reduce lock contention times. The use of optimistic locking permits improved throughput of data through the distributed in-memory ontology unit 3500.

The semantic interface unit 3600 may implement procedures and functions to provide a semantic interface between the distributed in-memory database 3300 and one or more of the other components of the data access and analysis system 3000.

The semantic interface unit 3600 may implement ontological data management, data-query generation, authentication and access control, object statistical data collection, or a combination thereof.

Ontological data management may include object lifecycle management, object data persistence, ontological modifications, or the like. Object lifecycle management may include creating one or more objects, reading or otherwise accessing one or more objects, updating or modifying one or more objects, deleting or removing one or more objects, or a combination thereof. For example, the semantic interface unit 3600 may interface or communicate with the distributed in-memory ontology unit 3500, which may store the ontological data, object data, or both, to perform object lifecycle management, object data persistence, ontological modifications, or the like.

For example, the semantic interface unit 3600 may receive, or otherwise access, a message, signal, or notification, such as from the distributed in-memory database 3300, indicating the creation or addition of a data portion, such as a table, in the low-latency data stored in the distributed in-memory database 3300, and the semantic interface unit 3600 may communicate with the distributed in-memory ontology unit 3500 to create an object in the ontology representing the added data portion. The semantic interface unit 3600 may transmit, send, or otherwise make available, a notification, message, or signal to the relational analysis unit 3700 indicating that the ontology has changed.

The semantic interface unit 3600 may receive, or otherwise access, a request message or signal, such as from the relational analysis unit 3700, indicating a request for information describing changes to the ontology (ontological updates request). The semantic interface unit 3600 may generate and send, or otherwise make available, a response message or signal to the relational analysis unit 3700 indicating the changes to the ontology (ontological updates response). The semantic interface unit 3600 may identify one or more data portions for indexing based on the changes to the ontology. For example, the changes to the ontology may include adding a table to the ontology, the table including multiple rows, and the semantic interface unit 3600 may identify each row as a data portion for indexing. The semantic interface unit 3600 may include information describing the ontological changes in the ontological updates response. The semantic interface unit 3600 may include one or more data-query definitions, such as data-query definitions for indexing data-queries, for each data portion identified for indexing in the ontological updates response. For example, the data-query definitions may include a sampling data-query, which may be used to query the distributed in-memory database 3300 for sample data from the added data portion, an indexing data-query, which may be used to query the distributed in-memory database 3300 for data from the added data portion, or both.

The semantic interface unit 3600 may receive, or otherwise access, internal signals or messages including data expressing usage intent, such as data indicating requests to access or modify the low-latency data stored in the distributed in-memory database 3300 (e.g., a request for data). The request to access or modify the low-latency data received by the semantic interface unit 3600 may include a resolved request (resolved-request data), such as in a resolved-request object, such as a resolved-request object generated by the relational analysis unit 3700. The resolved request data, which may be database and visualization agnostic, may be expressed or communicated as an ordered sequence of tokens, which may represent semantic data.

The resolved-request data may include tokenization binding data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used.

The resolved-request data may include phrasing data indicating phrasing with respect to the sequence of tokens in the resolved request, wherein tokens, such as one or more sequential tokens, are included in a respective phrase. The phrasing data may include phrase type data for respective phrases. For some tokens, or sequences of tokens, the phrasing data may indicate that the sequence of tokens corresponds with a value stored in a data source, such as in a column in a table, wherein the phrasing data includes data uniquely identifying the data source, such as a column identifier.

A token is a unit of data in the data access and analysis system 3000 that represents, in accordance with one or more defined grammars implemented by the data access and analysis system 3000, a data portion accessed by or stored in the data access and analysis system 3000, an operation of the data access and analysis system 3000, an object represented in the data access and analysis system 3000, or a class or type of data portion, operation, or object in the data access and analysis system 3000. A token may be a value (token value), such as a string value, which may be a word, a character, a sequence of characters, a symbol, a combination of symbols, or the like. In some implementations, the token value may express a data pattern that defines or describes values, operations, or objects that the token represents. For example, the data pattern expressed by the token value may identify a data type, such as positive integer, such that positive integer values, or string values that may be represented as positive integer values, may be identified as matching the token. A token may be a defined data structure (token data structure) that includes a token value. A token data structure may include data other than the token value, such as token type data.

The defined grammars implemented by the data access and analysis system 3000 may define or describe the tokens. The defined grammars implemented by the data access and analysis system 3000 may define or describe token types or classes, such as ontological tokens, control-word tokens, pattern tokens, literal tokens, chronometric tokens, and a skip-token. Other token types may be used.

An ontological token may represent a data portion in the data access and analysis system, such as an object represented in the data access and analysis system 3000, or a portion thereof, a table stored in the distributed in-memory database or stored in an external database, a column of a table stored in the distributed in-memory database or stored in an external database, or a value (constituent data) stored in a row and column of a table stored in the distributed in-memory database or stored in an external database. In some grammars implemented by the data access and analysis system 3000 the ontological tokens may include measure tokens representing measure data portions (measure columns), attribute tokens representing attribute data portions (attribute columns), and value tokens representing the respective values stored in the corresponding measure columns or attribute columns. For example, a worksheet object (analytical-object) represented in the data access and analysis system 3000 may include a column that includes values generated based on values stored in one or more tables in the distributed in-memory database, and an ontological token may represent the column of the worksheet object.

A control-word token may be a character, a symbol, a word, or a defined ordered sequence of characters or symbols, defined or described in one or more grammars of the data access and analysis system 3000 as having one or more defined grammatical functions, which may be contextual. For example, the control-word token "sum" may be defined or described in one or more grammars of the data access and analysis system 3000 as indicating an additive aggregation. In another example, the control-word token "top" may be defined or described in one or more grammars of the data access and analysis system 3000 as indicating a maximal value from an ordered set. In another example, the control-word token "table" may be defined or described in one or more grammars of the data access and analysis system 3000 as indicating a table stored in the data access and analysis system 3000 or stored externally and accessed by the data access and analysis system 3000. The control-word tokens may include operator tokens, such as the equality operator token ("="), delimiter tokens, which may be paired, such as opening and closing brackets ("[", "]"). The control-word tokens may include stop-word tokens, such as "the" or "an".

A pattern token may be a definition or a description of units of data in the data access and analysis system, which may be expressed as a data type, such as positive integer, defined or described in one or more grammars of the data access and analysis system 3000.

A literal, or constant, token may include a literal, or constant, value such as "100" or the Boolean value TRUE. The literal, or constant, tokens may include number-word tokens (numerals or named numbers), such as number-word tokens for the positive integers between zero and one million, inclusive, or for the numerator, denominator, or both of fractional values, or combinations thereof. For example, "one hundred twenty-eight and three-fifths".

A chronometric token may represent a chronometric unit, such as a chronometric unit from the system-defined chronometry or a chronometric unit from a domain-specific chronometry defined or described in the data access and analysis system 3000. The chronometric tokens are automatically generated based on the respective chronometric datasets. For example, chronometric tokens corresponding to the chronometric units for the system-defined chronometry, such as "date", "day", "days", "daily", "week", "weeks", "weekly", "month", "months", "monthly", "quarter", "quarters", "quarterly", "year", "years", "yearly", and the like, may be automatically generated based on the chronometric dataset for the system-defined chronometry.

The skip-token may represent discrete data portions, such as respective portions of a string that are unresolvable in accordance with the other tokens defined or described in a respective grammar of the data access and analysis system 3000.

The relational analysis unit 3700 may automatically generate respective tokens representing the attributes, the measures, the tables, the columns, the values, unique identifiers, tags, links, keys, or any other data portion, or combination of data portions, or a portion thereof.

For example, the relational analysis unit 3700 may tokenize, identify semantics, or both, based on input data, such as input data representing user input, to generate the resolved request. The resolved request may include an ordered sequence of tokens that represent the request for data corresponding to the input data, and may transmit, send, or otherwise make accessible, the resolved request to the semantic interface unit 3600. The semantic interface unit 3600 may process or respond to a received resolved request.

The semantic interface unit 3600 may process or transform the received resolved request, which may be, at least in part, incompatible with the distributed in-memory database 3300, to generate one or more corresponding data-queries that are compatible with the distributed in-memory database 3300, which may include generating a proto-query representing the resolved request, generating a pseudo-query representing the proto-query, and generating the data-query representing the pseudo-query.

The semantic interface unit 3600 may generate an analytical-object, such as an answer object, representing the resolved request, which may include representing the data expressing usage intent, such as by representing the request for data indicated by the data expressing usage intent.

The semantic interface unit 3600 may generate a proto-query based on the resolved request. A proto-query, which may be database agnostic, may be structured or formatted in a form, language, or protocol that differs from the defined structured query language of the distributed in-memory database 3300. Generating the proto-query may include identifying visualization identification data, such as an indication of a type of visualization, associated with the request for data, and generating the proto-query based on the resolved request and the visualization identification data.

The semantic interface unit 3600 may transform the proto-query to generate a pseudo-query. The pseudo-query, which may be database agnostic, may be structured or formatted in a form, language, or protocol that differs from the defined structured query language of the distributed in-memory database 3300. Generating a pseudo-query may include applying a defined transformation, or an ordered sequence of transformations. Generating a pseudo-query may include incorporating row-level security filters in the pseudo-query.

The semantic interface unit 3600 may generate a data-query based on the pseudo-query, such as by serializing the pseudo-query. The data-query, or a portion thereof, may be structured or formatted using the defined structured query language of the distributed in-memory database 3300. In some implementations, a data-query may be structured or formatted using a defined structured query language of another database, which may differ from the defined structured query language of the distributed in-memory database 3300. Generating the data-query may include using one or more defined rules for expressing respective the structure and content of a pseudo-query in the respective defined structured query language.

The semantic interface unit 3600 may communicate, or issue, the data-query to the distributed in-memory database 3300. In some implementations, processing or responding to a resolved request may include generating and issuing multiple data-queries to the distributed in-memory database 3300.

The semantic interface unit 3600 may receive results data from the distributed in-memory database 3300 responsive to one or more resolved requests. The semantic interface unit 3600 may process, format, or transform the results data to obtain visualization data. For example, the semantic interface unit 3600 may identify a visualization for representing or presenting the results data, or a portion thereof, such as based on the results data or a portion thereof. For example, the semantic interface unit 3600 may identifying a bar chart visualization for results data including one measure and attribute.

Although not shown separately in FIG. 3, the semantic interface unit 3600 may include a data visualization unit. In some embodiments, the data visualization unit may be a distinct unit, separate from the semantic interface unit 3600. In some embodiments, the data visualization unit may be included in the system access interface unit 3900. The data visualization unit, the system access interface unit 3900, or a combination thereof, may generate a user interface, or one or more portions thereof. For example, data visualization unit, the system access interface unit 3900, or a combination thereof, may obtain the results data, such as the visualization data, and may generate user interface elements (visualizations) representing the results data.

The semantic interface unit 3600 may implement object-level security, row-level security, or a combination thereof. In some implementations, the security and governance unit 3200 may implement, or partially implement, the object-level security, row-level security, or a combination thereof, in combination with the semantic interface unit 3600. Object-level security may include security associated with an object, such as a table, a column, a worksheet, an answer, or a pinboard. The object-level security may include column-level security, which include user-based or group-based access control of columns of data in the low-latency data, the indexes, or both. Row-level security may include user-based or group-based access control of rows of data in the low-latency data, the indexes, or both. The semantic interface unit 3600 may implement one or more authentication procedures, access control procedures, or a combination thereof. The object-level security, row-level security, column-level security, a combination thereof, or a portion thereof, may be represented, expressed, defined, or described as access-control data. The semantic interface unit 3600, or one or more other components of the data access and analysis system 3000, may control, such as grant, restrict, or prevent, access to one or more features, functions, units of data, or combinations thereof, in accordance with the access-control data. For example, in response to a request for data that includes a user identifier, the semantic interface unit 3600, or one or more other components of the data access and analysis system 3000, may obtain access-control data for the user identifier and may obtain results data in accordance with the access-control data such that a unit of data, such as a row or a column, that is identified in the access-control data as accessible to the user identifier and is responsive to the request for data is included in the results data and such that a unit of data, such as a row or a column, that is identified in the access-control data as inaccessible to the user identifier, or for which the access-control data omits or excludes corresponding data indicating that the unit of data is accessible to the user identifier, is omitted or excluded from the results data.

The semantic interface unit 3600 may implement one or more user-data integration features. For example, the semantic interface unit 3600 may generate and output a user interface, or a portion thereof, for inputting, uploading, or importing user data, may receive user data, and may import the user data. For example, the user data may be enterprise data.

The semantic interface unit 3600 may implement object statistical data collection. Object statistical data may include, for respective objects, temporal access information, access frequency information, access recency information, access requester information, or the like. For example, the semantic interface unit 3600 may obtain object statistical data as described with respect to the data utility unit 3720, the object utility unit 3810, or both. The semantic interface unit 3600 may send, transmit, or otherwise make available, the object statistical data for data-objects to the data utility unit 3720. The semantic interface unit 3600 may send, transmit, or otherwise make available, the object statistical data for analytical-objects to the object utility unit 3810.

The semantic interface unit 3600 may implement or expose one or more services or application programming interfaces. For example, the semantic interface unit 3600 may implement one or more services for access by the system access interface unit 3900. In some implementations, one or more services or application programming interfaces may be exposed to one or more external devices or systems.

The semantic interface unit 3600 may generate and transmit, send, or otherwise communicate, one or more external communications, such as e-mail messages, such as periodically, in response to one or more events, or both. For example, the semantic interface unit 3600 may generate and transmit, send, or otherwise communicate, one or more external communications including a portable representation, such as a portable document format representation of one or more pinboards in accordance with a defined schedule, period, or interval. In another example, the semantic interface unit 3600 may generate and transmit, send, or otherwise communicate, one or more external communications in response to input data indicating an express request for a communication. In another example, the semantic interface unit 3600 may generate and transmit, send, or otherwise communicate, one or more external communications in response to one or more defined events, such as the expiration of a recency of access period for a user.

Although shown as a single unit in FIG. 3, the relational analysis unit 3700 may be implemented in a distributed configuration, which may include a primary relational analysis unit instance and one or more secondary relational analysis unit instances.

The relational analysis unit 3700 may generate, maintain, operate, or a combination thereof, one or more indexes, such as one or more of an ontological index, a constituent-data index, a control-word index, a numeral index, or a constant index, based on the low-latency data stored in the distributed in-memory database 3300, the data access and analysis system 3000, or both. An index may be a defined data structure, or combination of data structures, for storing tokens, terms, or string keys, representing a set of data from one or more defined data sources in a form optimized for searching. For example, an index may be a collection of index shards. In some implementations, an index may be segmented into index segments and the index segments may be sharded into index shards. In some implementations, an index may be partitioned into index partitions, the index partitions may be segmented into index segments and the index segments may be sharded into index shards.

Generating, or building, an index may be performed to create or populate a previously unavailable index, which may be referred to as indexing the corresponding data, and may include regenerating, rebuilding, or reindexing to update or modify a previously available index, such as in response to a change in the indexed data (constituent data).

The ontological index may be an index of data (ontological data) describing the ontological structure or schema of the data access and analysis system 3000, the low-latency data stored in the distributed in-memory database 3300, or a combination thereof. For example, the ontological index may include data representing the table and column structure of the distributed in-memory database 3300. The relational analysis unit 3700 may generate, maintain, or both, the ontological index by communicating with, such as requesting ontological data from, the distributed in-memory ontology unit 3500, the semantic interface unit 3600, or both. Each record in the ontological index may correspond to a respective ontological token, such as a token that identifies a column by name.

The control-word index may be an index of a defined set of control-word tokens. For example, the control-word index may include the control-word token "sum", which may be identified in one or more grammars of the data access and analysis system 3000 as indicating an additive aggregation. The constant index may be an index of constant, or literal, tokens such as "100" or "true". The numeral index may be an index of number word tokens (or named numbers), such as number word tokens for the positive integers between zero and one million, inclusive.

The constituent-data index may be an index of the constituent data values stored in the data access and analysis system 3000, such as in the distributed in-memory database 3300. The constituent-data index is separate and distinct from the data source of the constituent data, including from indexing performed in or by the data source.

The relational analysis unit 3700 may generate, maintain, or both, the constituent-data index by communicating with, such as requesting data from, the distributed in-memory database 3300 or from an external data source. For example, the relational analysis unit 3700 may send, or otherwise communicate, a message or signal to the distributed in-memory database 3300, or an external data source, indicating a request to perform an indexing data-query, the relational analysis unit 3700 may receive response data from the distributed in-memory database 3300, or the external data source, in response to the requested indexing data-query, and the relational analysis unit 3700 may generate the constituent-data index, or a portion thereof, based on the response data. For example, the constituent-data index may index data-objects.

The constituent-data index may include one or more constituent-data index component indexes, such as a constituent-data prefix index, a constituent-data substring index, a constituent-data suffix index, and a constituent-data token index. A prefix index may be traversed for prefix match searching. A suffix index may be traversed for suffix match searching. A substring index may be traversed for substring match searching. A token index may be traversed for token match, such as exact, complete, or whole token match, searching. An index, such as the constituent-data index may be implemented as a trie, or a variation of a trie, such as a patricia trie or a prefix tree, a directed acyclic word graph (DAWG), a deterministic acyclic finite state automation, a caroline word graph, a HAT trie, a ternary search tree, a CritBit trie, a Burst trie, or the like. For example, the constituent-data prefix index, the constituent-data suffix index, and the constituent-data token index may be implemented as respective tries and the constituent-data substring index may be implemented as a directed acyclic word graph.

An index shard may be used for token searching, such as exact match searching, prefix match searching, substring match searching, or suffix match searching. Exact match searching may include identifying tokens in the index shard that matches a defined target value. Prefix match searching may include identifying tokens in the index shard that include a prefix, or begin with a value, such as a character or string, that matches a defined target value. Substring match searching may include identifying tokens in the index shard that include a value, such as a character or string, that matches a defined target value. Suffix match searching may include identifying tokens in the index shard that include a suffix, or end with a value, such as a character or string, that matches a defined target value. In some implementations, an index shard may include multiple distinct index data structures. For example, an index shard may include a first index data structure optimized for exact match searching, prefix match searching, and suffix match searching, and a second index data structure optimized for substring match searching. Traversing, or otherwise accessing, managing, or using, an index may include identifying one or more of the index shards of the index and traversing the respective index shards. In some implementations, one or more indexes, or index shards, may be distributed, such as replicated on multiple relational analysis unit instances. For example, the ontological index may be replicated on each relational analysis unit instance.

The relational analysis unit 3700 may receive a request for data from the data access and analysis system 3000. For example, the relational analysis unit 3700 may receive data expressing usage intent indicating the request for data in response to input, such as user input, obtained via a user interface, such as a user interface generated, or partially generated, by the system access interface unit 3900, which may be a user interface operated on an external device, such as one of the client devices 2320, 2340 shown in FIG. 2. In some implementations, the relational analysis unit 3700 may receive the data expressing usage intent from the system access interface unit 3900 or from the semantic interface unit 3600. For example, the relational analysis unit 3700 may receive or access the data expressing usage intent in a request for data message or signal.

The relational analysis unit 3700 may process, parse, identify semantics, tokenize, or a combination thereof, the request for data to generate a resolved request, which may include identifying a database and visualization agnostic ordered sequence of tokens based on the data expressing usage intent. The data expressing usage intent, or request for data, may include request data, such as resolved-request data, unresolved request data, or a combination of resolved-request data and unresolved request data. The relational analysis unit 3700 may identify the resolved-request data. The relational analysis unit 3700 may identify the unresolved request data and may tokenize the unresolved request data.

Resolved-request data may be request data identified in the data expressing usage intent as resolved-request data. Each resolved-request data portion may correspond with a respective token in the data access and analysis system 3000. The data expressing usage intent may include information identifying one or more portions of the request data as resolved-request data.

Unresolved request data may be request data identified in the data expressing usage intent as unresolved request data, or request data for which the data expressing usage intent omits information identifying the request data as resolved-request data. Unresolved request data may include text or string data, which may include a character, sequence of characters, symbol, combination of symbols, word, sequence of words, phrase, or the like, for which information, such as tokenization binding data, identifying the text or string data as resolved-request data is absent or omitted from the request data. The data expressing usage intent may include information identifying one or more portions of the request data as unresolved request data. The data expressing usage intent may omit information identifying whether one or more portions of the request data are resolved-request data. The relational analysis unit 3700 may identify one or more portions of the request data for which the data expressing usage intent omits information identifying whether the one or more portions of the request data are resolved-request data as unresolved request data.

For example, the data expressing usage intent may include a request string and one or more indications that one or more portions of the request string are resolved-request data. One or more portions of the request string that are not identified as resolved-request data in the data expressing usage intent may be identified as unresolved request data. For example, the data expressing usage intent may include the request string "example text"; the data expressing usage intent may include information indicating that the first portion of the request string, "example", is resolved-request data; and the data expressing usage intent may omit information indicating that the second portion of the request string, "text", is resolved-request data.

The information identifying one or more portions of the request data as resolved-request data may include tokenization binding data indicating a previously identified token corresponding to the respective portion of the request data. The tokenization binding data corresponding to a respective token may include, for example, one or more of a column identifier indicating a column corresponding to the respective token, a data type identifier corresponding to the respective token, a table identifier indicating a table corresponding to the respective token, an indication of an aggregation corresponding to the respective token, or an indication of a join path associated with the respective token. Other tokenization binding data may be used. In some implementations, the data expressing usage intent may omit the tokenization binding data and may include an identifier that identifies the tokenization binding data.

The relational analysis unit 3700 may implement or access one or more grammar-specific tokenizers, such as a tokenizer for a defined data-analytics grammar or a tokenizer for a natural-language grammar. For example, the relational analysis unit 3700 may implement one or more of a formula tokenizer, a row-level-security tokenizer, a data-analytics tokenizer, or a natural language tokenizer. Other tokenizers may be used. In some implementations, the relational analysis unit 3700 may implement one or more of the grammar-specific tokenizers, or a portion thereof, by accessing another component of the data access and analysis system 3000 that implements the respective grammar-specific tokenizer, or a portion thereof. For example, the natural language processing unit 3710 may implement the natural language tokenizer and the relational analysis unit 3700 may access the natural language processing unit 3710 to implement natural language tokenization. In another example, the semantic interface 3600, the distributed in-memory database, or both, may implement a tokenizer for a grammar for the defined structured query language compatible with or implemented by the distributed in-memory database. In some implementations, the data access and analysis system 3000, such as the semantic interface 3600, may implement a tokenizer for a grammar for a defined structured query language compatible with or implemented by an external database.

A tokenizer, such as the data-analytics tokenizer, may parse text or string data (request string), such as string data included in a data expressing usage intent, in a defined read order, such as from left to right, such as on a character-by-character or symbol-by-symbol basis. For example, a request string may include a single character, symbol, or letter, and tokenization may include identifying one or more tokens matching, or partially matching, the input character.

Tokenization may include parsing the request string to identify one or more words or phrases. For example, the request string may include a sequence of characters, symbols, or letters, and tokenization may include parsing the sequence of characters in a defined order, such as from left to right, to identify distinct words or terms and identifying one or more tokens matching the respective words. In some implementations, word or phrase parsing may be based on one or more of a set of defined delimiters, such as a whitespace character, a punctuation character, or a mathematical operator.

The relational analysis unit 3700 may traverse one or more of the indexes to identify one or more tokens corresponding to a character, word, or phrase identified in the request string. Tokenization may include identifying multiple candidate tokens matching a character, word, or phrase identified in the request string. Candidate tokens may be ranked or ordered, such as based on probabilistic utility.

Tokenization may include match-length maximization. Match-length maximization may include ranking or ordering candidate matching tokens in descending magnitude order. For example, the longest candidate token, having the largest cardinality of characters or symbols, matching the request string, or a portion thereof, may be the highest ranked candidate token. For example, the request string may include a sequence of words or a semantic phrase, and tokenization may include identifying one or more tokens matching the input semantic phrase. In another example, the request string may include a sequence of phrases, and tokenization may include identifying one or more tokens matching the input word sequence. In some implementations, tokenization may include identifying the highest ranked candidate token for a portion of the request string as a resolved token for the portion of the request string.

The relational analysis unit 3700 may implement one or more finite state machines. For example, tokenization may include using one or more finite state machines. A finite state machine may model or represent a defined set of states and a defined set of transitions between the states. A state may represent a condition of the system represented by the finite state machine at a defined temporal point. A finite state machine may transition from a state (current state) to a subsequent state in response to input (e.g., input to the finite state machine). A transition may define one or more actions or operations that the relational analysis unit 3700 may implement. One or more of the finite state machines may be non-deterministic, such that the finite state machine may transition from a state to zero or more subsequent states.

The relational analysis unit 3700 may generate, instantiate, or operate a tokenization finite state machine, which may represent the respective tokenization grammar. Generating, instantiating, or operating a finite state machine may include operating a finite state machine traverser for traversing the finite state machine. Instantiating the tokenization finite state machine may include entering an empty state, indicating the absence of received input. The relational analysis unit 3700 may initiate or execute an operation, such as an entry operation, corresponding to the empty state in response to entering the empty state. Subsequently, the relational analysis unit 3700 may receive input data, and the tokenization finite state machine may transition from the empty state to a state corresponding to the received input data. In some embodiments, the relational analysis unit 3700 may initiate one or more data-queries in response to transitioning to or from a respective state of a finite state machine. In the tokenization finite state machine, a state may represent a possible next token in the request string. The tokenization finite state machine may transition between states based on one or more defined transition weights, which may indicate a probability of transiting from a state to a subsequent state.

The tokenization finite state machine may determine tokenization based on probabilistic path utility. Probabilistic path utility may rank or order multiple candidate traversal paths for traversing the tokenization finite state machine based on the request string. The candidate paths may be ranked or ordered based on one or more defined probabilistic path utility metrics, which may be evaluated in a defined sequence. For example, the tokenization finite state machine may determine probabilistic path utility by evaluating the weights of the respective candidate transition paths, the lengths of the respective candidate transition paths, or a combination thereof. In some implementations, the weights of the respective candidate transition paths may be evaluated with high priority relative to the lengths of the respective candidate transition paths.

In some implementations, one or more transition paths evaluated by the tokenization finite state machine may include a bound state such that the candidate tokens available for tokenization of a portion of the request string may be limited based on the tokenization of a previously tokenized portion of the request string.

Tokenization may include matching a portion of the request string to one or more token types, such as a constant token type, a column name token type, a value token type, a control-word token type, a date value token type, a string value token type, or any other token type defined by the data access and analysis system 3000. A constant token type may be a fixed, or invariant, token type, such as a numeric value. A column name token type may correspond with a name of a column in the data model. A value token type may correspond with an indexed data value. A control-word token type may correspond with a defined set of control-words. A date value token type may be similar to a control-word token type and may correspond with a defined set of control-words for describing temporal information. A string value token type may correspond with an unindexed value.

Token matching may include ordering or weighting candidate token matches based on one or more token matching metrics. Token matching metrics may include whether a candidate match is within a defined data scope, such as a defined set of tables, wherein a candidate match outside the defined data scope (out-of-scope) may be ordered or weighted lower than a candidate match within the defined data scope (in-scope). Token matching metrics may include whether, or the degree to which, a candidate match increases query complexity, such as by spanning multiple roots, wherein a candidate match that increases complexity may be ordered or weighted lower than a candidate match that does not increase complexity or increases complexity to a lesser extent. Token matching metrics may include whether the candidate match is an exact match or a partial match, wherein a candidate match that is a partial may be ordered or weighted lower than a candidate match that is an exact match. In some implementations, the cardinality of the set of partial matches may be limited to a defined value.

Token matching metrics may include a token score (TokenScore), wherein a candidate match with a relatively low token score may be ordered or weighted lower than a candidate match with a relatively high token score. The token score for a candidate match may be determined based on one or more token scoring metrics. The token scoring metrics may include a finite state machine transition weight metric (FSMScore), wherein a weight of transitioning from a current state of the tokenization finite state machine to a state indicating a candidate matching token is the finite state machine transition weight metric. The token scoring metrics may include a cardinality penalty metric (CardinalityScore), wherein a cardinality of values (e.g., unique values) corresponding to the candidate matching token is used as a penalty metric (inverse cardinality), which may reduce the token score. The token scoring metrics may include an index utility metric (IndexScore), wherein a defined utility value, such as one, associated with an object, such as a column wherein the matching token represents the column or a value from the column, is the index utility metric. In some implementations, the defined utility values may be configured, such as in response to user input, on a per object (e.g., per column) basis. The token scoring metrics may include a usage metric (UBRScore). The usage metric may be determined based on a usage based ranking index, one or more usage ranking metrics, or a combination thereof. Determining the usage metric (UBRScore) may include determining a usage boost value (UBRBoost). The token score may be determined based on a defined combination of token scoring metrics. For example, determining the token score may be expressed as the following:

TokenScore=FSMScore*(IndexScore+
UBRScore*UBRBoost)+Min (CardinalityScore,
1).

Token matching may include grouping candidate token matches by match type, ranking or ordering on a per-match type basis based on token score, and ranking or ordering the match types. For example, the match types may include a first match type for exact matches (having the highest match type priority order), a second match type for prefix matches on ontological data (having a match type priority order lower than the first match type), a third match type for substring matches on ontological data and prefix matches on data values (having a match type priority order lower than the second match type), a fourth match type for substring matches on data values (having a match type priority order lower than the third match type), and a fifth match type for matches omitted from the first through fourth match types (having a match type priority order lower than the fourth match type). Other match types and match type orders may be used.

Tokenization may include ambiguity resolution. Ambiguity resolution may include token ambiguity resolution, join-path ambiguity resolution, or both. In some implementations, ambiguity resolution may cease tokenization in response to the identification of an automatic ambiguity resolution error or failure.

Token ambiguity may correspond with identifying two or more exactly matching candidate matching tokens. Token ambiguity resolution may be based on one or more token ambiguity resolution metrics. The token ambiguity resolution metrics may include using available previously resolved token matching or binding data and token ambiguity may be resolved in favor of available previously resolved token matching or binding data, other relevant tokens resolved from the request string, or both. The token ambiguity resolution may include resolving token ambiguity in favor of integer constants. The token ambiguity resolution may include resolving token ambiguity in favor of control-words, such as for tokens at the end of a request for data, such as last, that are not being edited.

Join-path ambiguity may correspond with identifying matching tokens having two or more candidate join paths. Join-path ambiguity resolution may be based on one or more join-path ambiguity resolution metrics. The join-path ambiguity resolution metrics may include using available previously resolved join-path binding data and join-path ambiguity may be resolved in favor of available previously resolved join-paths. The join-path ambiguity resolution may include favoring join paths that include in-scope objects over join paths that include out-of-scope objects. The join-path ambiguity resolution metrics may include a complexity minimization metric, which may favor a join path that omits or avoids increasing complexity over join paths that increase complexity, such as a join path that may introduce a chasm trap.

The relational analysis unit 3700 may identify a resolved request based on the request string. The resolved request, which may be database and visualization agnostic, may be expressed or communicated as an ordered sequence of tokens representing the request for data indicated by the request string. The relational analysis unit 3700 may instantiate, or generate, one or more resolved-request objects. For example, the relational analysis unit 3700 may create or store a resolved-request object corresponding to the resolved request in the distributed in-memory ontology unit 3500. The relational analysis unit 3700 may transmit, send, or otherwise make available, the resolved request to the semantic interface unit 3600.

In some implementations, the relational analysis unit 3700 may transmit, send, or otherwise make available, one or more resolved requests, or portions thereof, to the semantic interface unit 3600 in response to finite state machine transitions. For example, the relational analysis unit 3700 may instantiate a data-analysis object in response to a first transition of a finite state machine. The relational analysis unit 3700 may include a first data-analysis object instruction in the data-analysis object in response to a second transition of the finite state machine. The relational analysis unit 3700 may send the data-analysis object including the first data-analysis object instruction to the semantic interface unit 3600 in response to the second transition of the finite state machine. The relational analysis unit 3700 may include a second data-analysis object instruction in the data-analysis object in response to a third transition of the finite state machine. The relational analysis unit 3700 may send the data-analysis object including the data-analysis object instruction, or a combination of the first data-analysis object instruction and the second data-analysis object instruction, to the semantic interface unit 3600 in response to the third transition of the finite state machine. The data-analysis object instructions may be represented using any annotation, instruction, text, message, list, pseudo-code, comment, or the like, or any combination thereof that may be converted, transcoded, or translated into structured data-analysis instructions for accessing, retrieving, analyzing, or a combination thereof, data from the low-latency data, which may include generating data based on the low-latency data.

The relational analysis unit 3700 may provide an interface to permit the creation of user-defined syntax. For example, a user may associate a string with one or more tokens. Accordingly, when the string is entered, the pre-associated tokens are returned in lieu of searching for tokens to match the input.

The relational analysis unit 3700 may include a localization unit (not expressly shown). The localization, globalization, regionalization, or internationalization, unit may obtain source data expressed in accordance with a source expressive-form and may output destination data representing the source data, or a portion thereof, and expressed using a destination expressive-form. The data expressive-forms, such as the source expressive-form and the destination expressive-form, may include regional or customary forms of expression, such as numeric expression, temporal expression, currency expression, alphabets, natural-language elements, measurements, or the like. For example, the source expressive-form may be expressed using a canonical-form, which may include using a natural-language, which may be based on English, and the destination expressive-form may be expressed using a locale-specific form, which may include using another natural-language, which may be a natural-language that differs from the canonical-language. In another example, the destination expressive-form and the source expressive-form may be locale-specific expressive-forms and outputting the destination expressive-form representation of the source expressive-form data may include obtaining a canonical-form representation of the source expressive-form data and obtaining the destination expressive-form representation based on the canonical-form representation. Although, for simplicity and clarity, the grammars described herein, such as the data-analytics grammar and the natural language search grammar, are described with relation to the canonical expressive-form, the implementation of the respective grammars, or portions thereof, described herein may implement locale-specific expressive-forms. For example, the data-analytics tokenizer may include multiple locale-specific data-analytics tokenizers.

The natural language processing unit 3710 may receive input data including a natural language string, such as a natural language string generated in accordance with user input. The natural language string may represent a data request expressed in an unrestricted natural language form, for which data identified or obtained prior to, or in conjunction with, receiving the natural language string by the natural language processing unit 3710 indicating the semantic structure, correlation to the data access and analysis system 3000, or both, for at least a portion of the natural language string is unavailable or incomplete. Although not shown separately in FIG. 3, in some implementations, the natural language string may be generated or determined based on processing an analog signal, or a digital representation thereof, such as an audio stream or recording or a video stream or recording, which may include using speech-to-text conversion.

The natural language processing unit 3710 may analyze, process, or evaluate the natural language string, or a portion thereof, to generate or determine the semantic structure, correlation to the data access and analysis system 3000, or both, for at least a portion of the natural language string. For example, the natural language processing unit 3710 may identify one or more words or terms in the natural language string and may correlate the identified words to tokens defined in the data access and analysis system 3000. In another example, the natural language processing unit 3710 may identify a semantic structure for the natural language string, or a portion thereof. In another example, the natural language processing unit 3710 may identify a probabilistic intent for the natural language string, or a portion thereof, which may correspond to an operative feature of the data access and analysis system 3000, such as retrieving data from the internal data, analyzing data the internal data, or modifying the internal data.

The natural language processing unit 3710 may send, transmit, or otherwise communicate request data indicating the tokens, relationships, semantic data, probabilistic intent, or a combination thereof or one or more portions thereof, identified based on a natural language string to the relational analysis unit 3700.

The data utility unit 3720 may receive, process, and maintain user-agnostic utility data, such as system configuration data, user-specific utility data, such as utilization data, or both user-agnostic and user-specific utility data. The utility data may indicate whether a data portion, such as a column, a record, a token, an object, an insight, or any other data portion, has high utility or low utility within the system, such as among the users of the system. For example, the utility data may indicate that a defined column is a high-utility column or a low-utility column. The data utility unit 3720 may store the utility data, such as using the low-latency data structure. For example, in response to a user using, or accessing, a data portion, data utility unit 3720 may store utility data indicating the usage, or access, event for the data portion, which may include incrementing a usage event counter associated with the data portion. In some embodiments, the data utility unit 3720 may receive the information indicating the usage, or access, event for the data portion from the insight unit 3730, and the usage, or access, event for the data portion may indicate that the usage is associated with an insight. The utility data may include temporal data indicating a temporal location associated with the usage, or access, event for the data portion.

As used herein, the term "utility" refers to a computer accessible data value, or values, representative of the usefulness of an aspect of the data access and analysis system, such as a data portion, an object, or a component of the data access and analysis system with respect to improving the efficiency, accuracy, or both, of the data access and analysis system. Unless otherwise expressly indicated, or otherwise clear from context, utility is relative within a defined data-domain or scope. For example, the utility of an object with respect to a user may be high relative to the utility of other objects with respect to the user. Express utility indicates expressly specified, defined, or configured utility, such as user or system defined utility. Probabilistic utility indicates utility calculated or determined using utility data and expresses a statistical probability of usefulness for a respective aspect of the data access and analysis system. Unless otherwise expressly indicated, or otherwise clear from context, utility is access context specific. For example, the utility of an object with respect to the access context of a user may be high relative to the utility of the object with respect to the respective access contexts of other users.

The data utility unit 3720 may receive a signal, message, or other communication, indicating a request for utility information. The request for utility information may indicate an object or data portion. The data utility unit 3720 may determine, identify, or obtain utility data associated with the identified object or data portion. The data utility unit 3720 may generate and send utility response data responsive to the request that may indicate the utility data associated with the identified object or data portion.

The data utility unit 3720 may generate, maintain, operate, or a combination thereof, one or more indexes, such as one or more of a usage (or utility) index, a resolved-request index, or a phrase index, based on the low-latency data stored in the distributed in-memory database 3300, the data access and analysis system 3000, or both.

The insight unit 3730 may automatically identify one or more insights, which may be data other than data expressly requested by a user, and which may be identified and prioritized, or both, based on probabilistic utility.

The object search unit 3800 may generate, maintain, operate, or a combination thereof, one or more object-indexes, which may be based on the analytical-objects represented in the data access and analysis system 3000, or a portion thereof, such as pinboards, answers, and worksheets. An object-index may be a defined data structure, or combination of data structures, for storing analytical-object data in a form optimized for searching. Although shown as a single unit in FIG. 3, the object search unit 3800 may interface with a distinct, separate, object indexing unit (not expressly shown).

The object search unit 3800 may include an object-index population interface, an object-index search interface, or both. The object-index population interface may obtain and store, load, or populate analytical-object data, or a portion thereof, in the object-indexes. The object-index search interface may efficiently access or retrieve analytical-object data from the object-indexes such as by searching or traversing the object-indexes, or one or more portions thereof. In some implementations, the object-index population interface, or a portion thereof, may be a distinct, independent unit.

The object-index population interface may populate, update, or both the object-indexes, such as periodically, such as in accordance with a defined temporal period, such as thirty minutes. Populating, or updating, the object-indexes may include obtaining object indexing data for indexing the analytical-objects represented in the data access and analysis system 3000. For example, the object-index population interface may obtain the analytical-object indexing data, such as from the distributed in-memory ontology unit 3500. Populating, or updating, the object-indexes may include generating or creating an indexing data structure representing an object. The indexing data structure for representing an object may differ from the data structure used for representing the object in other components of the data access and analysis system 3000, such as in the distributed in-memory ontology unit 3500.

The object indexing data for an analytical-object may be a subset of the object data for the analytical-object. The object indexing data for an analytical-object may include an object identifier for the analytical-object uniquely identifying the analytical-object in the data access and analysis system 3000, or in a defined data-domain within the data access and analysis system 3000. The data access and analysis system 3000 may uniquely, unambiguously, distinguish an object from other objects based on the object identifier associated with the object. The object indexing data for an analytical object may include data non-uniquely identifying the object. The data access and analysis system 3000 may identify one or more analytical objects based on the non-uniquely identifying data associated with the respective objects, or one or more portions thereof. In some implementations, an object identifier may be an ordered combination of non-uniquely identifying object data that, as expressed in the ordered combination, is uniquely identifying. The data access and analysis system 3000 may enforce the uniqueness of the object identifiers.

Populating, or updating, the object-indexes may include indexing the analytical-object by including or storing the object indexing data in the object-indexes. For example, the object indexing data may include data for an analytical-object, the object-indexes may omit data for the analytical-object, and the object-index population interface may include or store the object indexing data in an object-index. In another example, the object indexing data may include data for an analytical-object, the object-indexes may include data for the analytical-object, and the object-index population interface may update the object indexing data for the analytical-object in the object-indexes in accordance with the object indexing data.

Populating, or updating, the object-indexes may include obtaining object utility data for the analytical-objects represented in the data access and analysis system 3000. For example, the object-index population interface may obtain the object utility data, such as from the object utility unit 3810. The object-index population interface may include the object utility data in the object-indexes in association with the corresponding objects.

In some implementations, the object-index population interface may receive, obtain, or otherwise access the object utility data from a distinct, independent, object utility data population unit, which may read, obtain, or otherwise access object utility data from the object utility unit 3810 and may send, transmit, or otherwise provide, the object utility data to the object search unit 3800. The object utility data population unit may send, transmit, or otherwise provide, the object utility data to the object search unit 3800 periodically, such as in accordance with a defined temporal period, such as thirty minutes.

The object-index search interface may receive, access, or otherwise obtain data expressing usage intent with respect to the data access and analysis system 3000, which may represent a request to access data in the data access and analysis system 3000, which may represent a request to access one or more analytical-objects represented in the data access and analysis system 3000. The object-index search interface may generate one or more object-index queries based on the data expressing usage intent. The object-index search interface may send, transmit, or otherwise make available the object-index queries to one or more of the object-indexes.

The object-index search interface may receive, obtain, or otherwise access object search results data indicating one or more analytical-objects identified by searching or traversing the object-indexes in accordance with the object-index queries. The object-index search interface may sort or rank the object search results data based on probabilistic utility in accordance with the object utility data for the analytical-objects in the object search results data. In some implementations, the object-index search interface may include one or more object search ranking metrics with the object-index queries and may receive the object search results data sorted or ranked based on probabilistic utility in accordance with the object utility data for the objects in the object search results data and in accordance with the object search ranking metrics.

For example, the data expressing usage intent may include a user identifier, and the object search results data may include object search results data sorted or ranked based on probabilistic utility for the user. In another example, the data expressing usage intent may include a user identifier and one or more search terms, and the object search results data may include object search results data sorted or ranked based on probabilistic utility for the user identified by searching or traversing the object-indexes in accordance with the search terms.

The object-index search interface may generate and send, transmit, or otherwise make available the sorted or ranked object search results data to another component of the data access and analysis system 3000, such as for further processing and display to the user.

The object utility unit 3810 may receive, process, and maintain user-specific object utility data for objects represented in the data access and analysis system 3000. The user-specific object utility data may indicate whether an object has high utility or low utility for the user.

The object utility unit 3810 may store the user-specific object utility data, such as on a per-object basis, a per-activity basis, or both. For example, in response to data indicating an object access activity, such as a user using, viewing, or otherwise accessing, an object, the object utility unit 3810 may store user-specific object utility data indicating the object access activity for the object, which may include incrementing an object access activity counter associated with the object, which may be a user-specific object access activity counter. In another example, in response to data indicating an object storage activity, such as a user storing an object, the object utility unit 3810 may store user-specific object utility data indicating the object storage activity for the object, which may include incrementing a storage activity counter associated with the object, which may be a user-specific object storage activity counter. The user-specific object utility data may include temporal information, such as a temporal location identifier associated with the object activity. Other information associated with the object activity may be included in the object utility data.

The object utility unit 3810 may receive a signal, message, or other communication, indicating a request for object utility information. The request for object utility information may indicate one or more objects, one or more users, one or more activities, temporal information, or a combination thereof. The request for object utility information may indicate a request for object utility data, object utility counter data, or both.

The object utility unit 3810 may determine, identify, or obtain object utility data in accordance with the request for object utility information. The object utility unit 3810 may generate and send object utility response data responsive to the request that may indicate the object utility data, or a portion thereof, in accordance with the request for object utility information.

For example, a request for object utility information may indicate a user, an object, temporal information, such as information indicating a temporal span, and an object activity, such as the object access activity. The request for object utility information may indicate a request for object utility counter data. The object utility unit 3810 may determine, identify, or obtain object utility counter data associated with the user, the object, and the object activity having a temporal location within the temporal span, and the object utility unit 3810 may generate and send object utility response data including the identified object utility counter data.

In some implementations, a request for object utility information may indicate multiple users, or may omit indicating a user, and the object utility unit 3810 may identify user-agnostic object utility data aggregating the user-specific object utility data. In some implementations, a request for object utility information may indicate multiple objects, may omit indicating an object, or may indicate an object type, such as answer, pinboard, or worksheet, and the object utility unit 3810 may identify the object utility data by aggregating the object utility data for multiple objects in accordance with the request. Other object utility aggregations may be used.

The system configuration unit 3820 implement or apply one or more data access and analysis system configurations to enable, disable, or configure one or more operative features of the data access and analysis system 3000. The system configuration unit 3820 may store data representing or defining the one or more data access and analysis system configurations. The system configuration unit 3820 may receive signals or messages indicating input data, such as input data generated via a system access interface, such as a user interface, for accessing or modifying the data access and analysis system configurations. The system configuration unit 3820 may generate, modify, delete, or otherwise maintain the data access and analysis system configurations, such as in response to the input data. The system configuration unit 3820 may generate or determine output data, and may output the output data, for a system access interface, or a portion or portions thereof, for the data access and analysis system configurations, such as for presenting a user interface for the data access and analysis system configurations. Although not shown in FIG. 3, the system configuration unit 3820 may communicate with a repository, such as an external centralized repository, of data access and analysis system configurations; the system configuration unit 3820 may receive one or more data access and analysis system configurations from the repository, and may control or configure one or more operative features of the data access and analysis system 3000 in response to receiving one or more data access and analysis system configurations from the repository.

The user customization unit 3830 may receive, process, and maintain user-specific utility data, user defined configuration data, user defined preference data, or a combination thereof. The user-specific utility data may indicate whether a data portion, such as a column, a record, autonomous-analysis (autoanalysis) data, or any other data portion or object, has high utility or low utility to an identified user. For example, the user-specific utility data may indicate that a defined column is a high-utility column or a low-utility column. The user customization unit 3830 may store the user-specific utility data, such as using the low-latency data structure. The user-specific utility data may include, feedback data, such as feedback indicating user input expressly describing or representing the utility of a data portion or object in response to utilization of the data portion or object, such as positive feedback indicating high utility or negative feedback indicating low utility. The user customization unit 3830 may store the feedback in association with a user identifier. The user customization unit 3830 may store the feedback in association with the access context in which feedback was obtained. The user customization data, or a portion thereof, may be stored in an in-memory storage unit of the data access and analysis system. In some implementations, the user customization data, or a portion thereof, may be stored in the persistent storage unit 3930.

The system access interface unit 3900 may interface with, or communicate with, a system access unit (not shown in FIG. 3), which may be a client device, a user device, or another external device or system, or a combination thereof, to provide access to the internal data, features of the data access and analysis system 3000, or a combination thereof. For example, the system access interface unit 3900 may receive signals, message, or other communications representing interactions with the internal data, such as data expressing usage intent and may output response messages, signals, or other communications responsive to the received requests.

The system access interface unit 3900 may generate data for presenting a user interface, or one or more portions thereof, for the data access and analysis system 3000. For example, the system access interface unit 3900 may generate instructions for rendering, or otherwise presenting, the user interface, or one or more portions thereof and may transmit, or otherwise make available, the instructions for rendering, or otherwise presenting, the user interface, or one or more portions thereof to the system access unit, for presentation to a user of the system access unit. For example, the system access unit may present the user interface via a web browser or a web application and the instructions may be in the form of HTML, JavaScript, or the like.

In an example, the system access interface unit 3900 may include a data-analytics field user interface element in the user interface. The data-analytics field user interface element may be an unstructured string user input element or field. The system access unit may display the unstructured string user input element. The system access unit may receive input data, such as user input data, corresponding to the unstructured string user input element. The system access unit may transmit, or otherwise make available, the unstructured string user input to the system access interface unit 3900. The user interface may include other user interface elements and the system access unit may transmit, or otherwise make available, other user input data to the system access interface unit 3900.

The system access interface unit 3900 may obtain the user input data, such as the unstructured string, from the system access unit. The system access interface unit 3900 may transmit, or otherwise make available, the user input data to one or more of the other components of the data access and analysis system 3000.

In some embodiments, the system access interface unit 3900 may obtain the unstructured string user input as a sequence of individual characters or symbols, and the system access interface unit 3900 may sequentially transmit, or otherwise make available, individual or groups of characters or symbols of the user input data to one or more of the other components of the data access and analysis system 3000.

In some embodiments, system access interface unit 3900 may obtain the unstructured string user input as a sequence of individual characters or symbols, the system access interface unit 3900 may aggregate the sequence of individual characters or symbols, and may sequentially transmit, or otherwise make available, a current aggregation of the received user input data to one or more of the other components of the data access and analysis system 3000, in response to receiving respective characters or symbols from the sequence, such as on a per-character or per-symbol basis.

The real-time collaboration unit 3910 may receive signals or messages representing input received in accordance with multiple users, or multiple system access devices, associated with a collaboration context or session, may output data, such as visualizations, generated or determined by the data access and analysis system 3000 to multiple users associated with the collaboration context or session, or both. The real-time collaboration unit 3910 may receive signals or messages representing input received in accordance with one or more users indicating a request to establish a collaboration context or session, and may generate, maintain, or modify collaboration data representing the collaboration context or session, such as a collaboration session identifier. The real-time collaboration unit 3910 may receive signals or messages representing input received in accordance with one or more users indicating a request to participate in, or otherwise associate with, a currently active collaboration context or session, and may associate the one or more users with the currently active collaboration context or session. In some implementations, the input, output, or both, of the real-time collaboration unit 3910 may include synchronization data, such as temporal data, that may be used to maintain synchronization, with respect to the collaboration context or session, among the data access and analysis system 3000 and one or more system access devices associated with, or otherwise accessing, the collaboration context or session.

The third-party integration unit 3920 may include an electronic communication interface, such as an application programming interface (API), for interfacing or communicating between an external, such as third party, application or system, and the data access and analysis system 3000. For example, the third-party integration unit 3920 may include an electronic communication interface to transfer data between the data access and analysis system 3000 and one or more external applications or systems, such as by importing data into the data access and analysis system 3000 from the external applications or systems or exporting data from the data access and analysis system 3000 to the external applications or systems. For example, the third-party integration unit 3920 may include an electronic communication interface for electronic communication with an external exchange, transfer, load (ETL) system, which may import data into the data access and analysis system 3000 from an external data source or may export data from the data access and analysis system 3000 to an external data repository. In another example, the third-party integration unit 3920 may include an electronic communication interface for electronic communication with external machine learning analysis software, which may export data from the data access and analysis system 3000 to the external machine learning analysis software and may import data into the data access and analysis system 3000 from the external machine learning analysis software. The third-party integration unit 3920 may transfer data independent of, or in conjunction with, the system access interface unit 3900, the enterprise data interface unit 3400, or both.

The persistent storage unit 3930 may include an interface for storing data on, accessing data from, or both, one or more persistent data storage devices or systems. For example, the persistent storage unit 3930 may include one or more persistent data storage devices, such as the static memory 1200 shown in FIG. 1. Although shown as a single unit in FIG. 3, the persistent storage unit 3930 may include multiple components, such as in a distributed or clustered configuration. The persistent storage unit 3930 may include one or more internal interfaces, such as electronic communication or application programming interfaces, for receiving data from, sending data to, or both other components of the data access and analysis system 3000. The persistent storage unit 3930 may include one or more external interfaces, such as electronic communication or application programming interfaces, for receiving data from, sending data to, or both, one or more external systems or devices, such as an external persistent storage system. For example, the persistent storage unit 3930 may include an internal interface for obtaining key-value tuple data from other components of the data access and analysis system 3000, an external interface for sending the key-value tuple data to, or storing the key-value tuple data on, an external persistent storage system, an external interface for obtaining, or otherwise accessing, the key-value tuple data from the external persistent storage system, and an internal key-value tuple data for sending, or otherwise making available, the key-value tuple data to other components of the data access and analysis system 3000. In another example, the persistent storage unit 3930 may include a first external interface for storing data on, or obtaining data from, a first external persistent storage system, and a second external interface for storing data on, or obtaining data from, a second external persistent storage system.

Figure 4:
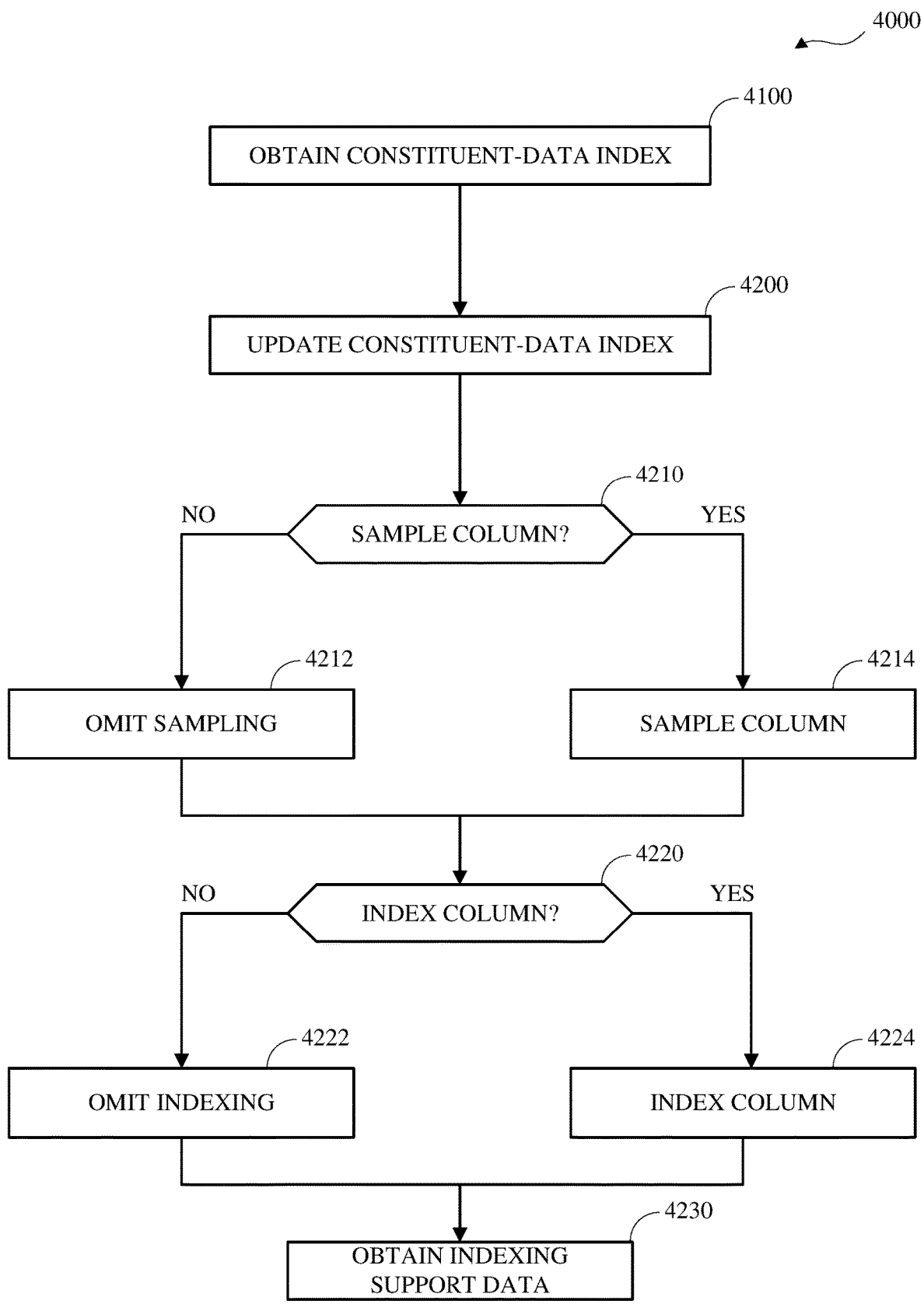
FIG. 4 is a flow diagram of an example of indexing constituent data in a data access and analysis system.

FIG. 4 is a flow diagram of an example of indexing constituent data 4000 in a data access and analysis system. Indexing constituent data 4000 (or constituent data indexing), or one or more portions thereof, may be implemented by a data access and analysis system, such as the data access and analysis system 3000 shown in FIG. 3, or one or more components thereof. Although the description herein of indexing constituent data 4000 includes one or more descriptions of indexing constituent data from a column from a table from a data source for simplicity, indexing constituent data 4000 includes indexing constituent data from any number of columns from any number of tables from any number of data sources.

Indexing constituent data 4000 includes obtaining a constituent-data index (at 4100) and updating the constituent-data index (at 4200). Indexing constituent data 4000 may include other aspects not shown in FIG. 4.

Obtaining the constituent-data index (at 4100) includes receiving, reading, obtaining, or otherwise accessing, constituent data from a data source, such as an internal distributed in-memory database, such as the distributed in-memory database 3300 shown in FIG. 3, or an external database, such as an extern database accessed via an external database server, such as the external database servers 2120 shown in FIG. 2, or via the enterprise data interface unit 3400 shown in FIG. 3. Obtaining the constituent-data index (at 4100) may be similar to updating the constituent-data index (at 4200), except as is described herein or as is otherwise clear from context. The data source may include, or store, data in one or more tables respectively having one or more columns and one or more rows.

Obtaining the constituent-data index (at 4100) includes identifying, or selecting, one or more columns, from one or more tables, from the data source for indexing, which may include omitting or excluding one or more columns or tables from the indexing. Obtaining the constituent-data index (at 4100) may include obtaining schema data, or other data defining or describing the structure, or organization, of the data included, or stored, in the data source, which may include data describing tables, columns thereof, data types, relationships, such as foreign key relationships, among tables, or columns, or other data defining or describing the structure, or organization, of the data included, or stored, in the data source.

Obtaining the constituent-data index (at 4100) includes obtaining the constituent data from the data source. Obtaining the constituent data from the data source utilizes resources, such as memory resources, processing resources, communications bandwidth resources, or other computing system resources. In some implementations, the constituent data may be obtained in accordance with a defined worksheet in the data access and analysis system (worksheet object). The worksheet may identify, indicate, or reference, one or more columns stored in a database, and the constituent data may be obtained from the columns stored in the database. One or more columns defined or described in a worksheet may indicate that the column is populated based on a defined, non-aggregation, formula and indexing the constituent data based therein includes obtaining the constituent data for the respective column in accordance with the defined formula. A non-aggregation formula may generate data based on data other than data stored in the database, or based on a non-aggregation combination, such as via concatenation, of data stored in the database and other data stored in the database or with data other than data stored in the database.

Obtaining the constituent-data index (at 4100) includes indexing the constituent data, or constituent data values, in the constituent-data index. Obtaining the constituent-data index (at 4100) may be implemented by one or more components of the data access and analysis system. For example, a relational analysis unit of the data access and analysis system, such as the relational analysis unit 3700 shown in FIG. 3, may implement obtaining the constituent-data index (at 4100), or one or more portions thereof. The relational analysis unit may include an indexing, constituent-data indexing, or token indexing, unit. The relational analysis unit may include one or more other, distinct, indexing units, such as an object indexing unit, a phrase indexing unit, or both. Subsequent to obtaining the constituent-data index (at 4100), the constituent data indexed therein is previously indexed constituent data.

Obtaining the constituent-data index (at 4100) includes obtaining data indicating one or more of the tables, or columns, from the data source to index, such as a defined, such as manually defined, list of tables, columns, or both, to index. Obtaining the constituent-data index (at 4100) includes indexing constituent data obtained from the one or more of the tables, or columns, from the data source to index. The data source may include one or more tables, or columns, absent, omitted, or excluded, from the data indicating one or more of the tables, or columns, from the data source to index. Obtaining the constituent-data index (at 4100) may omit, or exclude, indexing constituent data from the one or more tables, or columns, absent, omitted, or excluded, from the data indicating one or more of the tables, or columns, from the data source to index.

Obtaining the constituent-data index (at 4100) may include ontological data for the tables, columns, or both, indexed, or to be indexed, in the constituent-data index. For example, the data access and analysis system, or a component thereof, such as the constituent-data indexing unit, may send, transmit, or otherwise make available, an ontological-data data query, which may be an automatically generated ontological-data data query, to the data source for execution by the data source, and may obtain the ontological data, or one or more portions thereof, from the data source in response to execution of the ontological-data data query by the data source. The ontological data may include, such as for a table from the data source, a current rows-count value indicating how many rows are in the table.

Obtaining the constituent-data index (at 4100) may include obtaining sample data, such as a defined number, or count, of rows of data, such as one thousand rows, from one or more tables or columns from the data source. For example, the data access and analysis system, or a component thereof, such as the constituent-data indexing unit may send, transmit, or otherwise make available a sampling-data data query to the data source for execution by the data source, and may obtain the sample data, or one or more portions thereof, from the data source in response to execution of the sampling-data data query by the data source. In some implementations, obtaining sample data may omit, or exclude, row-level security.

Obtaining the constituent-data index (at 4100) may include obtaining the constituent data, to index (indexing data), from one or more tables or columns from the data source. For example, the data access and analysis system, or a component thereof, such as the constituent-data indexing unit may send, transmit, or otherwise make available an indexing-data data query to the data source for execution by the data source, and may obtain the indexing data, or one or more portions thereof, from the data source in response to execution of the indexing-data data query by the data source. For example, obtaining the constituent-data index (at 4100) may include indexing constituent data obtained from a column of a table stored in the data source. In some implementations, obtaining the indexing data may include implementing row-level security.

Obtaining the constituent-data index (at 4100) includes obtaining, such as by generating, indexing support data.

The indexing support data includes data-version values. For example, obtaining the constituent-data index (at 4100) may include defining, or assigning, a data-version value for a table indexed in the constituent-data index. In some implementations, a data-version value may be an integer value or a floating-point value. The data-version values may be generated, defined, determined, or assigned, by the data access and analysis system, or a component thereof, such as the constituent-data indexing unit. The data access and analysis system, or a component thereof, such as the constituent-data indexing unit, may store, such as in memory or on disk, the indexing support data.

The indexing support data includes one or more token-instances tuples. A token-instances tuple includes a token value, a user identifier, a group identifier, and an instances value indicating how many rows in a respective column have the token value.

The indexing support data includes one or more column-cardinality values. A column-cardinality value indicates a cardinality of a column, wherein, in the context of a column or table, cardinality indicates a number or count of unique values.

The indexing support data may include one or more temporal location values indicating a temporal location corresponding to obtaining, such as by generating, or by updating, the constituent-data index, such as on a per-column or per-table basis.

The indexing support data may include the data indicating the tables, columns, or both, to be indexed, or previously indexed.

The indexing support data may include one or more other parameters, which may be defined, or configured, such as manually, parameters for constituent data indexing. In an example, the indexing support data may include per-table indexing frequency thresholds. For example, the indexing support data may include a first indexing frequency threshold of twenty-four hours for a frequently used table and a second indexing frequency threshold of one week, or one hundred sixty-eight hours, for an infrequently used table.

Updating the constituent-data index (at 4200) includes determining whether to sample a column (at 4210), determining whether to update the constituent-data index with respect to the column (at 4220), and obtaining updated indexing support data (at 4230).

Updating the constituent-data index (at 4200) may be performed in accordance with one or more defined schedules, periods, or frequencies. For example, updating the constituent-data index (at 4200) may be performed in accordance with a defined constituent-data index update period, such as on a twenty-four-hour basis. A respective defined schedule, period, or frequency may be defined for the data access and analysis system, for the data source, for a table, for a column, or a combination thereof. In the absence of other defined schedules, periods, or frequencies, updating the constituent-data index (at 4200) may be performed on a per twenty-four-hours basis.

Sampling a column, or table, includes obtaining, such as by generating, a sampling-data data query, sending, transmitting, or otherwise making available, the sampling-data data query to the data source, and receiving, reading, obtaining, or otherwise accessing, sampling results data (sample data) from the data source responsive to execution of the sampling-data data query by the data source, which utilizes resources, such as resources of the data access and analysis system, such as processing resources, memory resources, or both, bandwidth, or communication, resources, resources of the data source, or a combination thereof.

Sampling a column may include generating, an approximate unique count, or unique count, data query, sending, transmitting, or otherwise making available, the approximate unique count, or unique count, data query to the data source, and receiving, reading, obtaining, or otherwise accessing, results data indicating an approximate count, or a count, of unique values in the constituent data stored in the column in the data source, from the data source responsive to execution of the approximate unique count, or unique count, data query by the data source, which utilizes resources, such as resources of the data access and analysis system, such as processing resources, memory resources, or both, bandwidth, or communication, resources, resources of the data source, or a combination thereof.

Determining whether to sample a column (at 4210) includes determining whether sampling is currently contraindicated for the column. For example, determining whether to sample a column (at 4210) may include determining that sampling is contraindicated. In another example, determining whether to sample a column (at 4210) may include determining that sampling is indicated, or other than contraindicated. Aspects of determining whether to sample a column (at 4210) are shown in FIGS. 8, 10, 11, and 12.

In response to determining that sampling is contraindicated, the data access and analysis system, or a component thereof, such as the constituent-data indexing unit, omits sampling the column (at 4212).

In response to determining that sampling is indicated, or other than contraindicated, the data access and analysis system, or a component thereof, such as the constituent-data indexing unit, samples the column (at 4214). Sampling the column includes obtaining sample data, such as a defined number, or count, of rows of data, such as one thousand (1 k) rows, from the column from the data source. For example, the data access and analysis system, or a component thereof, such as the constituent-data indexing unit may send, transmit, or otherwise make available, a sampling-data data query, which may be an automatically generated data query generated by the data access and analysis system, or a component thereof, to the data source for execution by the data source, and may obtain the sample data, or one or more portions thereof, from the data source in response to execution of the sampling-data data query by the data source.

Determining whether to update the constituent-data index with respect to the column (at 4220) includes determining whether updating is currently contraindicated for the column. For example, determining whether to update the constituent-data index with respect to the column (at 4220) may include determining that updating is currently contraindicated for the column. In another example, determining whether to update the constituent-data index with respect to the column (at 4220) may include determining that updating is currently indicated, or other than contraindicated, for the column. Aspects of determining whether to update the constituent-data index with respect to the column (at 4220) are shown in FIGS. 5-7, 9, 13, 15, and 16.

In response to determining that updating is currently contraindicated for the column, the data access and analysis system, or a component thereof, such as the constituent-data indexing unit, omits updating the constituent-data index with respect to column (at 4222).

In response to determining that updating is currently indicated, or other than contraindicated, for the column, the data access and analysis system, or a component thereof, such as the constituent-data indexing unit, updates the constituent-data index with respect to the column (at 4224).

Figure 16:
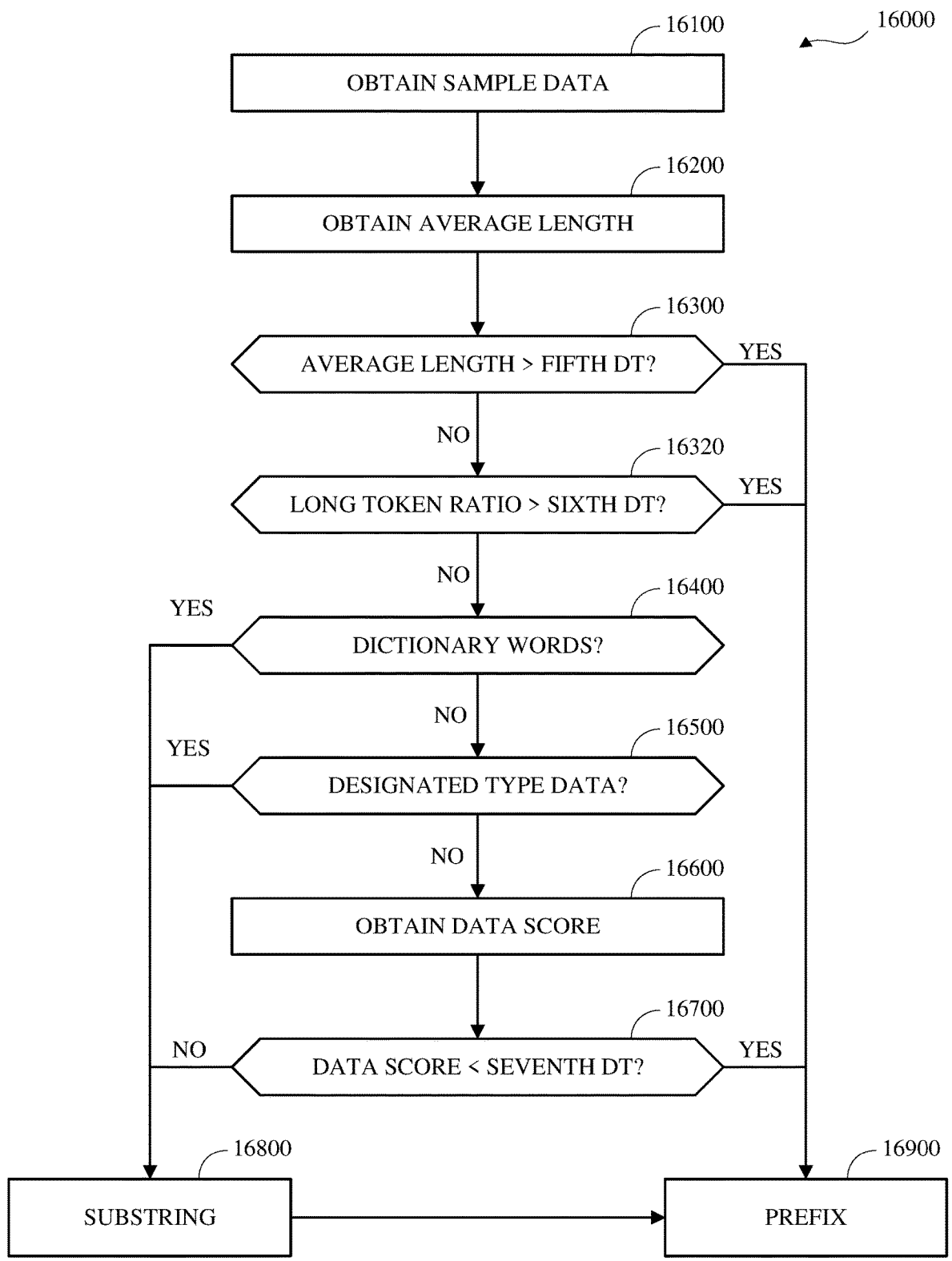
FIG. 16 is a flow diagram of an example of determining which constituent-data index to update for a column.

Updating the constituent-data index with respect to the column includes determining whether to update the constituent-data prefix index, the constituent-data sub string index, the constituent-data suffix index, the constituent-data token index, or a combination thereof. An example of determining whether to update the constituent-data prefix index is shown in FIG. 16. An example of determining whether to update the constituent-data sub string index is shown in FIG. 16. In some implementations, in the absence of a determination to update the constituent-data prefix index, the constituent-data sub string index, or the constituent-data suffix index, updating the constituent-data index with respect to the column includes updating the constituent-data token index.

Updating the constituent-data index with respect to the column includes obtaining indexing data, which is constituent data to be indexed, from the column from the data source. For example, the data access and analysis system, or a component thereof, such as the constituent-data indexing unit may send, transmit, or otherwise make available, an indexing-data data query, which may be an automatically generated data query generated by the data access and analysis system, or a component thereof, to the data source for execution by the data source, and may obtain the indexing data, or one or more portions thereof, from the data source in response to execution of the indexing-data data query by the data source.

Updating the constituent-data index with respect to the column includes indexing the constituent data from the column in the constituent-data index.

Obtaining updated indexing support data (at 4230) includes, obtaining, such as by generating, updated indexing support data, and storing, outputting, recording, or otherwise saving, the updated indexing support data. The updated indexing support data includes per-table data-version values for the tables indexed in the constituent-data index obtained by, during, or as a result of, updating the constituent-data index (at 4200). The updated indexing support data includes token-instances tuples for the constituent data indexed in the constituent-data index obtained by, during, or as a result of, updating the constituent-data index (at 4200). The updated indexing support data includes column-cardinality values for the columns indexed in the constituent-data index obtained by, during, or as a result of, updating the constituent-data index (at 4200).

The technique described herein improves on the resource utilization of other systems, or otherwise minimizes resource utilization, by generating, updating, and using the indexing support data as described herein. Using the indexing support data as described herein utilizes fewer resources than obtaining similar information by querying the data source.

Figure 5:
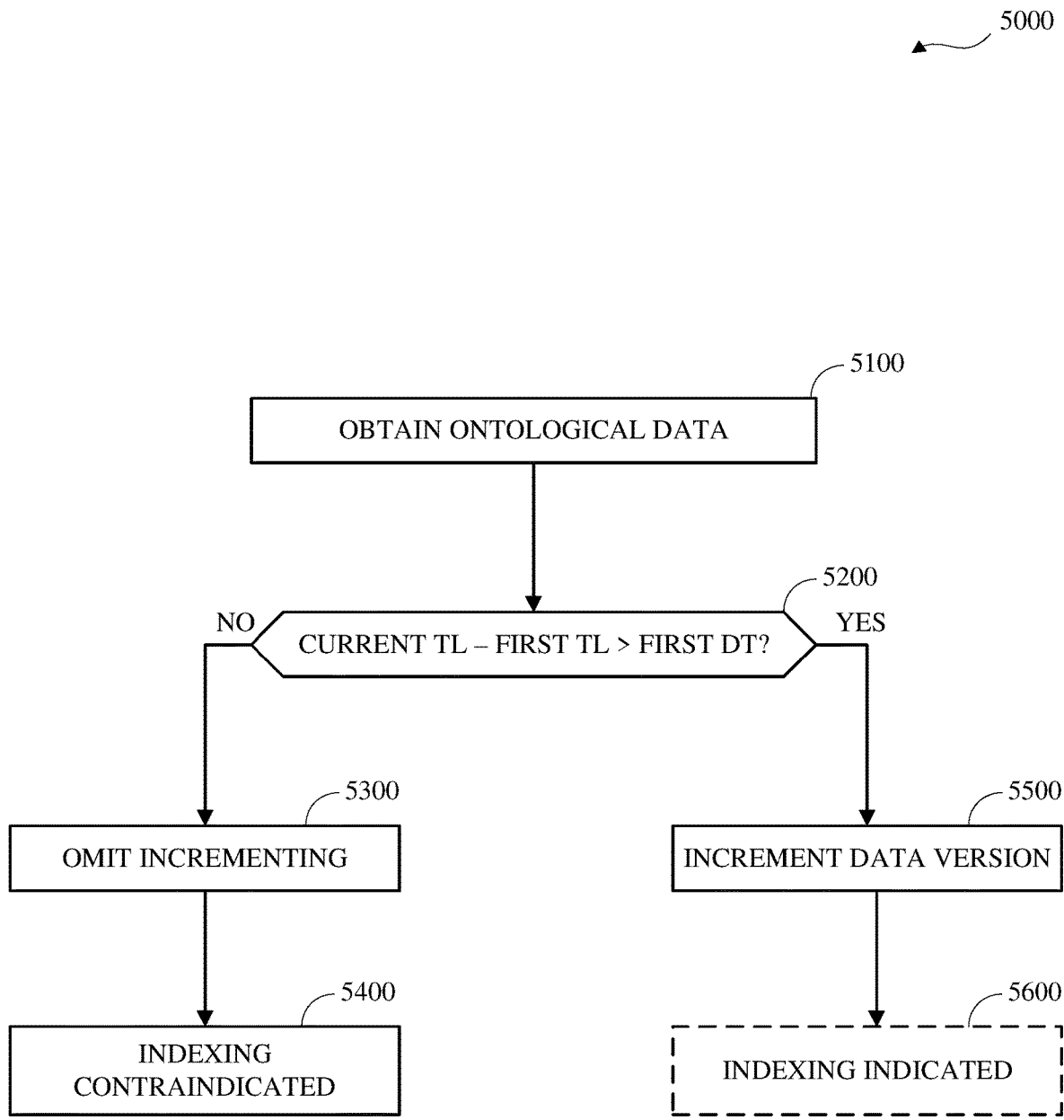
FIG. 5 is a flow diagram of an example of determining whether updating the constituent-data index is currently contraindicated using temporal data for a column.

FIG. 5 is a flow diagram of an example of determining whether updating the constituent-data index is currently contraindicated using temporal data 5000 for a column. Indexing constituent data (as shown at 4000 in FIG. 4) may include the determining whether updating the constituent-data index is currently contraindicated using temporal data 5000 for a column as shown in FIG. 5. The determining whether updating the constituent-data index is currently contraindicated using temporal data 5000 for a column, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding updating the indexing for previously indexed columns in the absence of data indicating that the respective column, or data stored therein, has been updated, changed, or modified since the column was previously indexed. Omitting, excluding, or avoiding updating the indexing for a column, or table, includes omitting, excluding, or avoiding sampling the column, or table, includes omitting, excluding, or avoiding requesting approximate count distinct, or count distinct, data for the column, or table, and includes omitting, excluding, or avoiding obtaining indexing data for the column, or table. To further minimize resource utilization, the technique described herein determines whether to omit, exclude, or avoid updating the indexing for previously indexed columns based on ontological data for the respective column, or table, rather than based on the constituent data stored in the respective column, or table, wherein obtaining and processing the ontological data utilizes fewer resources than obtaining and processing the constituent data.

The determining whether updating the constituent-data index is currently contraindicated using temporal data 5000 for a column includes obtaining ontological data (at 5100). For example, the data access and analysis system, or a component thereof, such as the constituent-data indexing unit, or a component thereof, such as an ontological data tracker, may obtain the ontological data (at 5100).

Obtaining the ontological data (at 5100) includes obtaining the ontological data, or one or more portions thereof, from the data source. For example, the ontological data tracker may obtain, access, or generate, an ontological-data data query that expresses a request for ontological data in accordance with a defined structured query language implemented by, or otherwise compatible with or operable by, the data source. For example, the ontological-data data query may include a request for table schema data. In another example, the ontological-data data query may include a request for table name data, or other identification data, for one or more tables stored in, or otherwise accessible from, the data source. In another example, the ontological-data data query may include a request for a current rows-count value indicating how many rows are in the table. In another example, the ontological-data data query may include a request for temporal location data, such as time-and-date-stamp data, for one or more temporal locations associated with a respective table, such as a temporal location of a recent, such as most recent, change, alteration, or modification of the table, a column of the table, or constituent data stored in the table. For example, the most recent modification may be is an insertion of a column in the table, a deletion of a column from the table, a modification of a column in the table, an insertion of a row in the table, a deletion of a row from the table, or a modification of a value in a row in the table. For example, for a current, or target, table from the data source, the ontological data may include, a first temporal location corresponding to a most recent modification of the table.

Obtaining the ontological data (at 5100) may include omitting, avoiding, or excluding obtaining, or accessing, the constituent data stored in the respective column or table. Obtaining the ontological data (at 5100) may include obtaining the ontological data for the tables, columns, or both, previously indexed in the constituent-data index, such as in accordance with the indexing support data. For example, the ontological-data data query may include data indicating the tables, columns, or both, such that the ontological data is obtained for the indicated tables, columns, or both, and ontological data for other tables is omitted, or excluded, from the ontological data obtained by the data access and analysis system.

Some tables, columns, or both, from the data source may be updated, modified, or altered, frequently, such as relative to the defined constituent-data index update period, such as more than once per twenty-four-hour period. Some tables, columns, or both, from the data source may be updated, modified, or altered, infrequently, such as relative to the defined constituent-data index update period, such as less than once per twenty-four-hour period. Some systems that index constituent data are agnostic to whether a column, or table, was updated, modified, or altered, subsequent to a previous, such as most recent, indexing of the column, or data, which may result in utilization of resources to obtain and process previously indexed constituent data in the absence of constituent data other than the previously indexed constituent data. Indexing constituent data, as described herein, improves over other systems that index constituent data, by omitting, or excluding, indexing for columns, tables, or both, in the absence of constituent data other than the previously indexed constituent data.

The determining whether updating the constituent-data index is currently contraindicated using temporal data 5000 for a column includes determining (at 5200) a temporal difference between the first temporal location (first TL) for the table, or column, from the ontological data (obtained at 5100), and a current temporal location (current TL). Determining whether updating the constituent-data index is currently contraindicated using temporal data 5000 for a column includes determining (at 5200) whether the temporal difference between the first temporal location (first TL) for the table, or column, from the ontological data (obtained at 5100), and the current temporal location (current TL), is greater than a first defined threshold, such as the indexing frequency threshold for the table, such as twenty-four hours.

In some implementations, the data access and analysis system, or a component thereof, such as the constituent-data indexing unit, or a component thereof, such as the ontological data tracker, determines that the temporal difference between the first temporal location (first TL) for the table, or column, from the ontological data (obtained at 5100), and the current temporal location (current TL) is less than or equal to the first defined threshold (24 h), and in response to determining that the temporal difference (current TL–first TL) between the first temporal location and the current temporal location is less than or equal to the first defined threshold, the data access and analysis system, or a component thereof, such as the constituent-data indexing unit, or a component thereof, such as the ontological data tracker, omits, excludes, or avoids, incrementing the data-version value for the table (at 5300), and determines that updating the constituent-data index is currently contraindicated for the table (at 5400), which includes determining that updating the constituent-data index is currently contraindicated for the column. Subsequent aspects of constituent-data indexing may be omitted, or skipped, for the table, the column, or both for the current iteration, or performance, of constituent-data indexing. The constituent-data index may be updated with respect to the table, the column, or both, in accordance with a subsequent iteration, or performance, of constituent-data indexing.

In some implementations, the data access and analysis system, or a component thereof, such as the constituent-data indexing unit, or a component thereof, such as the ontological data tracker, determines that the temporal difference between the first temporal location (first TL) for the table, or column, from the ontological data (obtained at 5100), and the current temporal location (current TL) is greater than the first defined threshold (24 h), and in response to determining that the temporal difference between the first temporal location and the current temporal location is greater than the first defined threshold, the data access and analysis system, or a component thereof, such as the constituent-data indexing unit, or a component thereof, such as the ontological data tracker, increments, such as by adding one (1) or one tenth (0.1), the data-version value for the table (at 5500), and determines that updating the constituent-data index is currently indicated, or other than contraindicated, or otherwise omits, avoids, or excludes determining that updating the constituent-data index is currently contraindicated for the column based on the ontological data, for the table (at 5600), which includes determining hat that updating the constituent-data index is currently indicated, or other than contraindicated, for the column. The updated, or incremented, data-version value for the table is included in the updated indexing support data, or otherwise maintained or stored by the data access and analysis system, or one or more components thereof. The determination that updating the constituent-data index is currently indicated, or other than contraindicated, for the table (at 5600) is shown with a broken line border to indicate that another aspect of determining whether updating the constituent-data index is currently contraindicated may determine that updating the constituent-data index is currently contraindicated for the column, such as subsequent to the determining whether updating the constituent-data index is currently contraindicated using temporal data 5000 for a column shown in FIG. 5.

Figure 6:
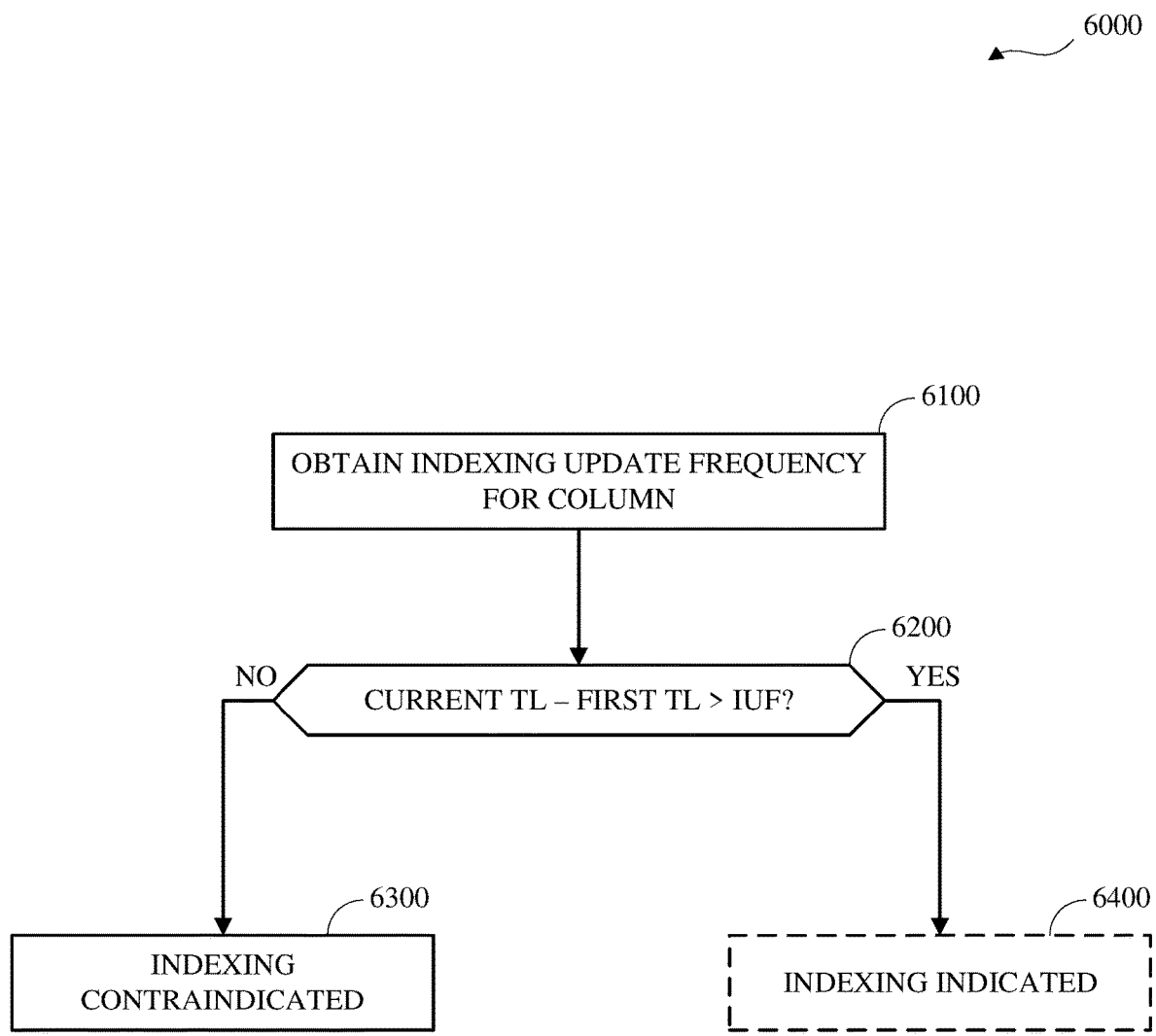
FIG. 6 is a flow diagram of an example of determining whether updating the constituent-data index is currently contraindicated in accordance with column-specific frequency data for a column.

FIG. 6 is a flow diagram of an example of determining whether updating the constituent-data index is currently contraindicated in accordance with column-specific frequency data 6000 for a column. Indexing constituent data (as shown at 4000 in FIG. 4) may include the determining whether updating the constituent-data index is currently contraindicated in accordance with column-specific frequency data 6000 for a column shown in FIG. 6. The determining whether updating the constituent-data index is currently contraindicated in accordance with column-specific frequency data 6000 for a column shown in FIG. 6, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by determining whether to update the indexing on a per-table or per-column basis based on a per-table or per-column indexing update frequency, rather than using a per-data source, per-data domain, or per-system, indexing update frequency. Omitting, excluding, or avoiding updating the indexing for a column, or table, includes omitting, excluding, or avoiding sampling the column, or table, includes omitting, excluding, or avoiding requesting approximate count distinct, or count distinct, data for the column, or table, and includes omitting, excluding, or avoiding obtaining indexing data for the column, or table. For example, the system described herein may reduce the resource utilization of updating the indexing of constituent data relative to other systems that update the indexing of the indexed columns on a daily basis, by updating the indexing of the indexed columns less frequently than on a daily basis in accordance with an update frequency, or period, defined on a per-table or per-column basis.

The determining whether updating the constituent-data index is currently contraindicated in accordance with column-specific frequency data 6000 for a column includes obtaining a column-specific indexing update frequency (at 6100) for the column. For example, the data access and analysis system, or a component thereof, such as the constituent-data indexing unit, or a component thereof, such as an ontological data tracker, may obtain the column-specific indexing update frequency (at 6100).

The determining whether updating the constituent-data index is currently contraindicated in accordance with column-specific frequency data 6000 for a column includes determining (at 6200) a temporal difference between the first temporal location (first TL) for the table, or column, from the ontological data (obtained as shown at 5100 in FIG. 5), and a current temporal location (current TL). In some implementations, the temporal difference may be the temporal difference determined as shown in FIG. 5 (at 5200).

The determining whether updating the constituent-data index is currently contraindicated in accordance with column-specific frequency data 6000 for a column includes determining (at 6200) whether the temporal difference is greater than the column-specific indexing update frequency.

In some implementations, the data access and analysis system, or a component thereof, such as the constituent-data indexing unit, or a component thereof, such as the ontological data tracker, determines that the temporal difference (current TL−first TL) is less than or equal to the column-specific indexing update frequency (IUF) (current TL−first TL<=IUF), and in response to determining that the temporal difference is less than or equal to the column-specific indexing update frequency, the data access and analysis system, or a component thereof, such as the constituent-data indexing unit, or a component thereof, such as the ontological data tracker determines that updating the constituent-data index is currently contraindicated for the column (at 6300). Subsequent aspects of constituent-data indexing may be omitted, or skipped, for the column for the current iteration, or performance, of constituent-data indexing. The constituent-data index may be updated with respect to the column in accordance with a subsequent iteration, or performance, of constituent-data indexing.

In some implementations, the data access and analysis system, or a component thereof, such as the constituent-data indexing unit, or a component thereof, such as the ontological data tracker, determines that the temporal difference (current TL−First TL) is greater than the column-specific indexing update frequency (IUF) (current TL−first TL>IUF), and in response to determining that the temporal difference is greater than the column-specific indexing update frequency (IUF), the data access and analysis system, or a component thereof, such as the constituent-data indexing unit, or a component thereof, such as the ontological data tracker, determines that updating the constituent-data index is currently indicated, or other than contraindicated, or otherwise omits, avoids, or excludes determining that updating the constituent-data index is currently contraindicated for the column based on the column-specific defined update frequency, for the column (at 6400). The determination that updating the constituent-data index is currently indicated, or other than contraindicated, for the column (at 6400) is shown with a broken line border to indicate that another aspect of determining whether updating the constituent-data index is currently contraindicated for the column may determine that updating the constituent-data index is currently contraindicated for the column, such as subsequent to the determining whether updating the constituent-data index is currently contraindicated in accordance with column-specific frequency data 6000 for a column shown in FIG. 6.

Figure 7:
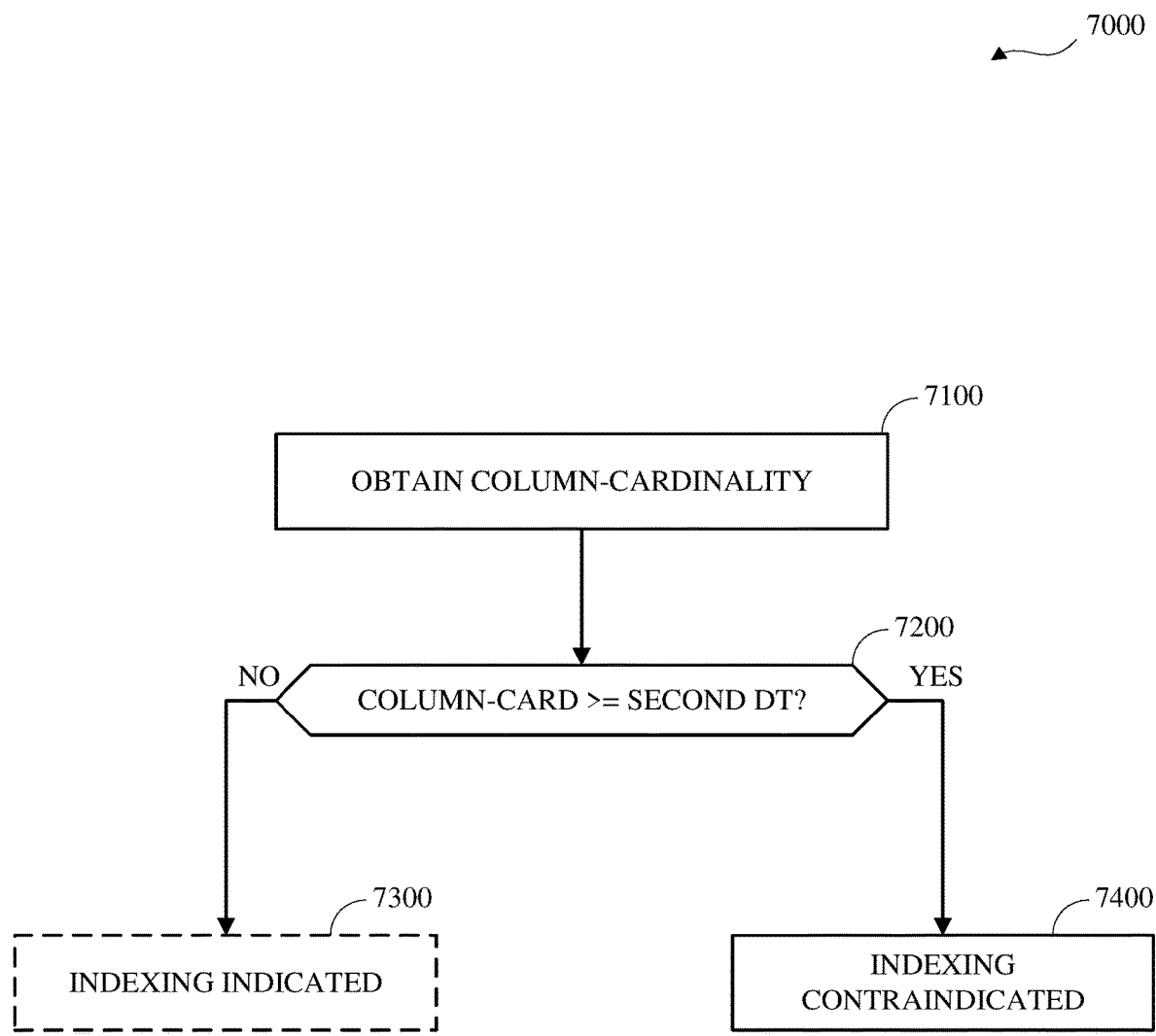
FIG. 7 is a flow diagram of an example of another determining whether updating the constituent-data index is currently contraindicated using column cardinality for a column.

FIG. 7 is a flow diagram of an example of another determining whether updating the constituent-data index is currently contraindicated using column cardinality 7000 for a column. Indexing constituent data (as shown at 4000 in FIG. 4) may include the determining whether updating the constituent-data index is currently contraindicated using column cardinality 7000 for a column shown in FIG. 7. The determining whether updating the constituent-data index is currently contraindicated using column cardinality 7000 for a column shown in FIG. 7, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding updating the indexing for previously indexed columns wherein the previous indexed data includes a relatively large number, or count, of unique values (column cardinality), relative to a defined threshold. Omitting, excluding, or avoiding updating the indexing for a column, or table, includes omitting, excluding, or avoiding sampling the column, or table, includes omitting, excluding, or avoiding requesting approximate count distinct, or count distinct, data for the column, or table, and includes omitting, excluding, or avoiding obtaining indexing data for the column, or table. To further minimize resource utilization, the technique described herein determines whether to omit, exclude, or avoid updating the indexing for previously indexed columns based on indexing support data obtained by the previous indexing, rather than based on obtaining an approximate unique count, or a unique count, for the column from the data source.

The determining whether updating the constituent-data index is currently contraindicated using column cardinality 7000 for a column includes obtaining a column-cardinality value from the indexing support data (at 7100) for the column. For example, the data access and analysis system, or a component thereof, such as the constituent-data indexing unit, or a component thereof, such as an ontological data tracker, may obtain the column-cardinality value from the indexing support data for the column (at 7100).

The determining whether updating the constituent-data index is currently contraindicated using column cardinality 7000 for a column includes determining (at 7200) whether the column-cardinality value (COLUMN-CARD) is greater than or equal to a second defined threshold (Second DT), such as one hundred thousand (100 k) or one million (1M).

In some implementations, the data access and analysis system, or a component thereof, such as the constituent-data indexing unit, or a component thereof, such as the ontological data tracker, determines that the column-cardinality value (COLUMN-CARD) is less than the second defined threshold (Second DT), and in response to determining that the column-cardinality value (COLUMN-CARD) is less than the second defined threshold (Second DT) (COLUMN-CARD<Second DT), the data access and analysis system, or a component thereof, such as the constituent-data indexing unit, or a component thereof, such as the ontological data tracker, determines that updating the constituent-data index is currently indicated, or other than contraindicated, or otherwise omits, avoids, or excludes determining that updating the constituent-data index is currently contraindicated for the column based on the column-cardinality value, for the column (at 7300). The determination that updating the constituent-data index is currently indicated, or other than contraindicated, for the column (at 7300) is shown with a broken line border to indicate that another aspect of determining whether updating the constituent-data index is currently contraindicated for the column may determine that updating the constituent-data index is currently contraindicated for the column, such as subsequent to the determining whether updating the constituent-data index is currently contraindicated using column cardinality 7000 for a column shown in FIG. 7.

In some implementations, the data access and analysis system, or a component thereof, such as the constituent-data indexing unit, or a component thereof, such as the ontological data tracker, determines that the column-cardinality value (COLUMN-CARD) is greater than or equal to the second defined threshold (Second DT) (COLUMN-CARD>=Second DT), and in response to determining that the column-cardinality value (COLUMN-CARD) is greater than or equal to the second defined threshold (Second DT) (COLUMN-CARD>=Second DT), the data access and analysis system, or a component thereof, such as the constituent-data indexing unit, or a component thereof, such as the ontological data tracker, determines that updating the constituent-data index is currently contraindicated for the column (at 7400). Subsequent aspects of constituent-data indexing may be omitted, or skipped, for the column for the current iteration, or performance, of constituent-data indexing. The constituent-data index may be updated with respect to the column in accordance with a subsequent iteration, or performance, of constituent-data indexing.

Figure 8:
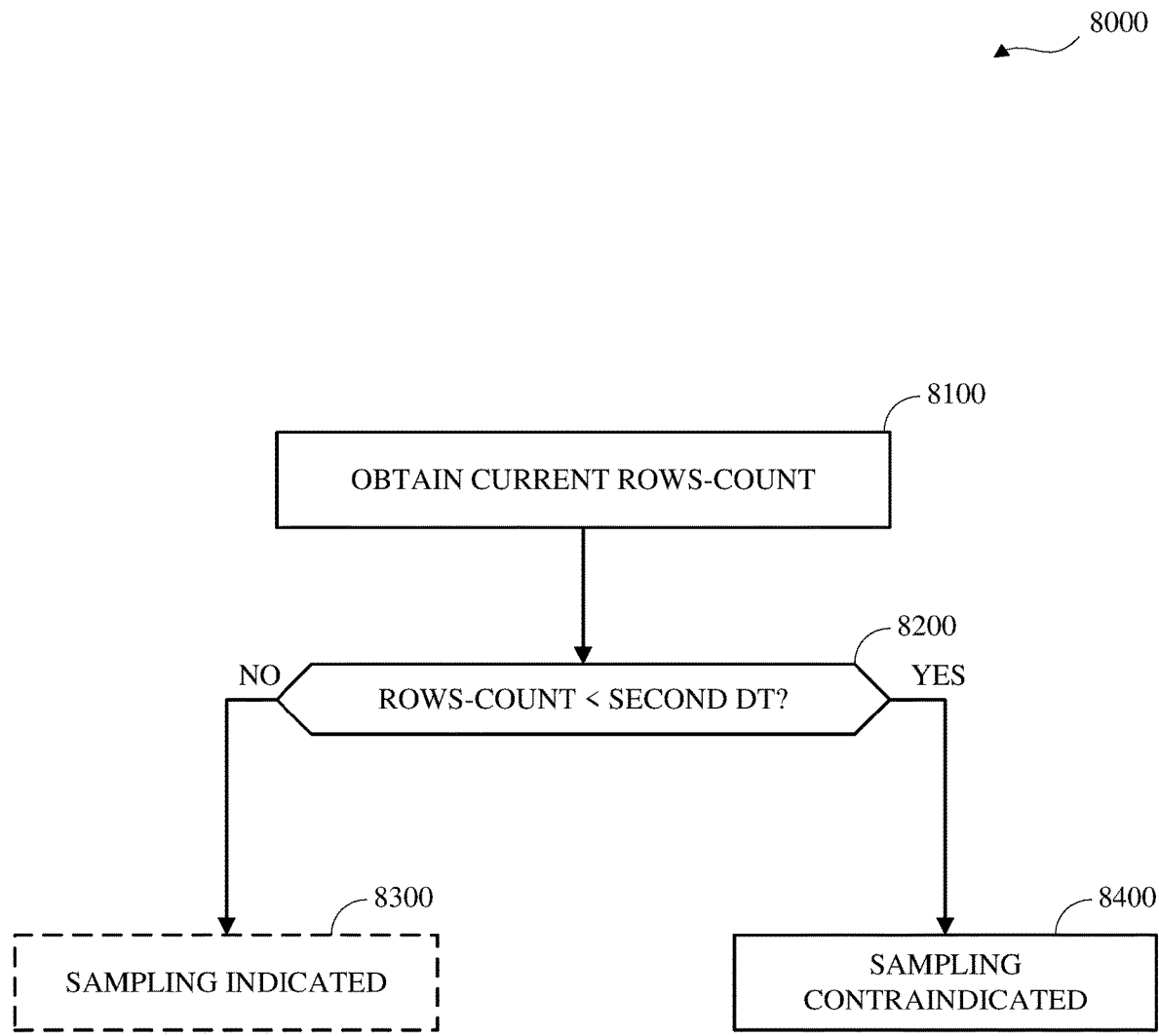
FIG. 8 is a flow diagram of an example of determining whether sampling is currently contraindicated using row count data for a column.

FIG. 8 is a flow diagram of an example of determining whether sampling is currently contraindicated using row count data 8000 for a column. Indexing constituent data (as shown at 4000 in FIG. 4) may include the determining whether sampling is currently contraindicated using row count data 8000 for the column shown in FIG. 8. The determining whether sampling is currently contraindicated using row count data 8000 for the column shown in FIG. 8, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding sampling for previously indexed columns that include a relatively small number, or count, of rows, relative to a defined threshold. Omitting, excluding, or avoiding sampling for a column, or table, includes omitting, excluding, or avoiding requesting approximate count distinct, or count distinct, data for the column, or table. To further minimize resource utilization, the technique described herein determines whether to omit, exclude, or avoid updating the sampling for previously indexed columns based on the ontological data for the respective column, or table, rather than based on the constituent data stored in the respective column, or table, wherein obtaining and processing the ontological data utilizes fewer resources than obtaining and processing the constituent data.

The determining whether sampling is currently contraindicated using row count data 8000 for the column includes obtaining (at 8100) the current rows-count value for the column from the ontological data (obtained as shown at 5100 in FIG. 5). For example, the data access and analysis system, or a component thereof, such as the constituent-data indexing unit, or a component thereof, such as an ontological data tracker, may obtain the current rows-count value for the column from the ontological data (obtained as shown at 5100 in FIG. 5).

The determining whether sampling is currently contraindicated using row count data 8000 for the column includes determining (at 8200) whether the current rows-count value (ROWS-COUNT) is less than the second defined threshold (Second DT), such as one hundred thousand (100 k) or one million (1M).

In some implementations, the data access and analysis system, or a component thereof, such as the constituent-data indexing unit, or a component thereof, such as the ontological data tracker, determines that the current rows-count value is greater than or equal to the second defined threshold (ROWS-COUNT>=Second DT), and in response to determining that the current rows-count value is greater than or equal to the second defined threshold (ROWS-COUNT>=Second DT), the data access and analysis system, or a component thereof, such as the constituent-data indexing unit, or a component thereof, such as the ontological data tracker, determines that sampling is currently indicated, or other than contraindicated, or otherwise omits, avoids, or excludes determining that sampling is currently contraindicated for the column based on the current rows-count value, for the column (at 8300). The determination that sampling is currently indicated, or other than contraindicated, for the column (at 8300) is shown with a broken line border to indicate that another aspect of determining whether sampling is currently contraindicated for the column may determine that sampling is currently contraindicated for the column, such as subsequent to the determining whether sampling is currently contraindicated using row count data 8000 for the column shown in FIG. 8.

In some implementations, the data access and analysis system, or a component thereof, such as the constituent-data indexing unit, or a component thereof, such as the ontological data tracker, determines that the current rows-count value is less than the second defined threshold, and in response to determining that the current rows-count value is less than the second defined threshold (ROWS-COUNT<Second DT), the data access and analysis system, or a component thereof, such as the constituent-data indexing unit, or a component thereof, such as the ontological data tracker, determines that sampling is currently contraindicated for the column (at 8400). Subsequent aspects of constituent-data indexing with respect to sampling may be omitted, or skipped, for the column for the current iteration, or performance, of constituent-data indexing. Subsequent iterations, or performances, of constituent-data indexing may include sampling the column.

Figure 9:
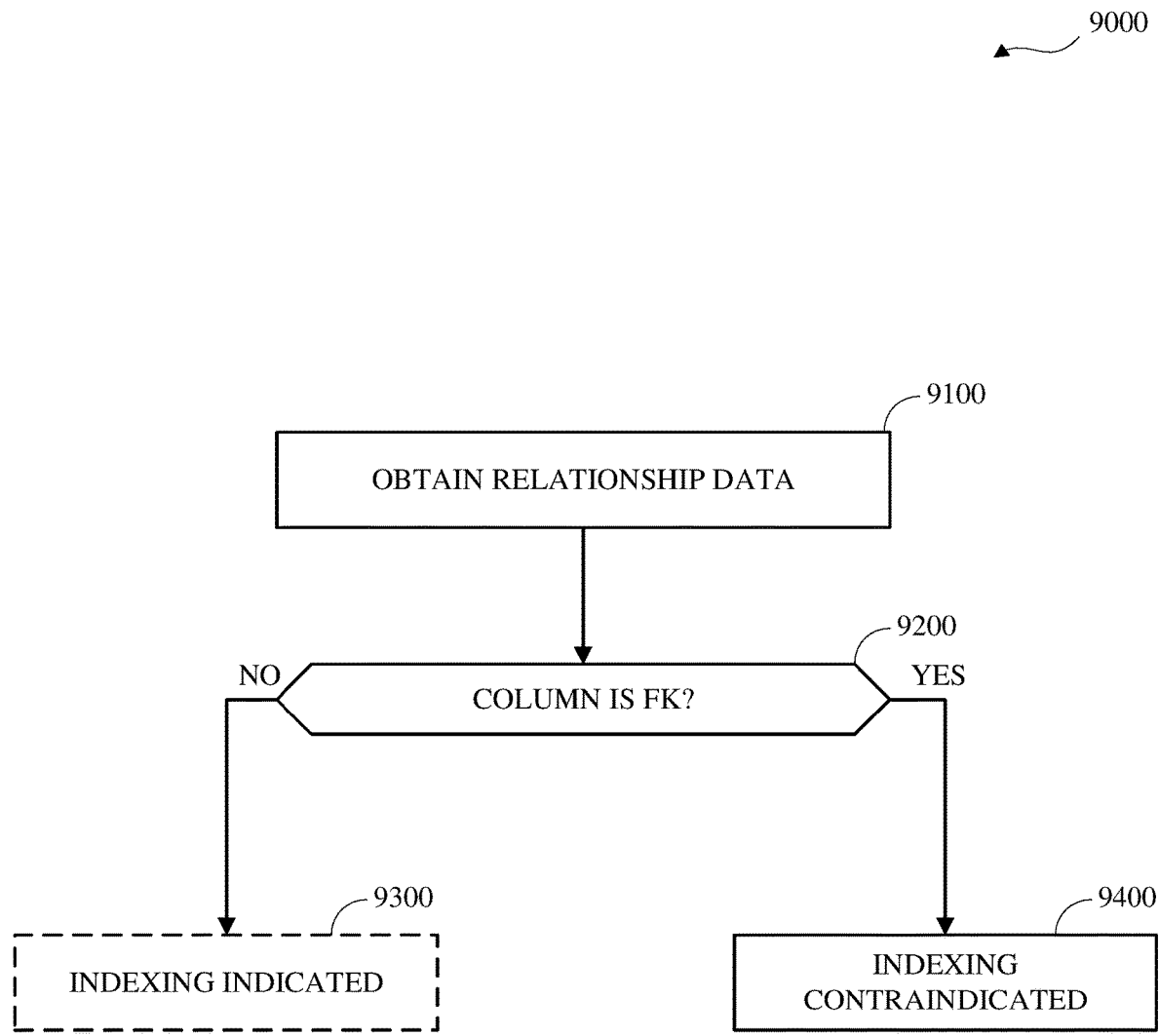
FIG. 9 is a flow diagram of an example of determining whether updating the constituent-data index is currently contraindicated using relationship data for a column.

FIG. 9 is a flow diagram of an example of determining whether updating the constituent-data index is currently contraindicated using relationship data 9000 for a column. Indexing constituent data (as shown at 4000 in FIG. 4) may include the determining whether updating the constituent-data index is currently contraindicated using relationship data 9000 for a column shown in FIG. 9. The determining whether updating the constituent-data index is currently contraindicated using relationship data 9000 for a column shown in FIG. 9, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding updating the indexing for previously indexed columns wherein the column includes foreign key values, wherein the data in the corresponding primary key column, in another table, is indexed. Omitting, excluding, or avoiding updating the indexing for a column, or table, includes omitting, excluding, or avoiding sampling the column, or table, includes omitting, excluding, or avoiding requesting approximate count distinct, or count distinct, data for the column, or table, and includes omitting, excluding, or avoiding obtaining indexing data for the column, or table.

The determining whether updating the constituent-data index is currently contraindicated using relationship data 9000 for a column includes obtaining relationship data (at 9100) for the column. For example, the data access and analysis system, or a component thereof, such as the constituent-data indexing unit, or a component thereof, such as an ontological data tracker, may obtain the relationship data for the column (at 9100). The relationship data for the column may indicate that the column includes foreign key values, wherein another column, in another table, in the data source includes corresponding primary key values. In some implementations, the data access and analysis system, or a component thereof, may obtain the data indicating whether a column is a foreign key column based on database table schema for the database, based on previously identified one-to-one joins, previously automatically identified by the data access and analysis system, or based on both the schema and the previously identified one-to-one joins.

The determining whether updating the constituent-data index is currently contraindicated using relationship data 9000 for a column includes determining (at 9200) whether the column is a foreign key column, or otherwise includes foreign key data wherein another column, in another table, in the data source includes corresponding primary key data.

In some implementations, the data access and analysis system, or a component thereof, such as the constituent-data indexing unit, or a component thereof, such as the ontological data tracker, determines that the column is other than a foreign key column, and in response to determining that the column is other than a foreign key column, the data access and analysis system, or a component thereof, such as the constituent-data indexing unit, or a component thereof, such as the ontological data tracker, determines that updating the constituent-data index is currently indicated, or other than contraindicated, or otherwise omits, avoids, or excludes determining that updating the constituent-data index is currently contraindicated for the column based whether the column is a foreign key column, for the column (at 9300). The determination that updating the constituent-data index is currently indicated, or other than contraindicated, for the column (at 9300) is shown with a broken line border to indicate that another aspect of determining whether updating the constituent-data index is currently contraindicated for the column may determine that updating the constituent-data index is currently contraindicated for the column, such as subsequent to the determining whether updating the constituent-data index is currently contraindicated using relationship data 9000 for a column shown in FIG. 9.

In some implementations, the data access and analysis system, or a component thereof, such as the constituent-data indexing unit, or a component thereof, such as the ontological data tracker, determines that the column is a foreign key column, and in response to determining that the column is a foreign key column, the data access and analysis system, or a component thereof, such as the constituent-data indexing unit, or a component thereof, such as the ontological data tracker, determines that updating the constituent-data index is currently contraindicated for the column (at 9400). Subsequent aspects of constituent-data indexing may be omitted, or skipped, for the column for the current iteration, or performance, of constituent-data indexing.

Figure 10:
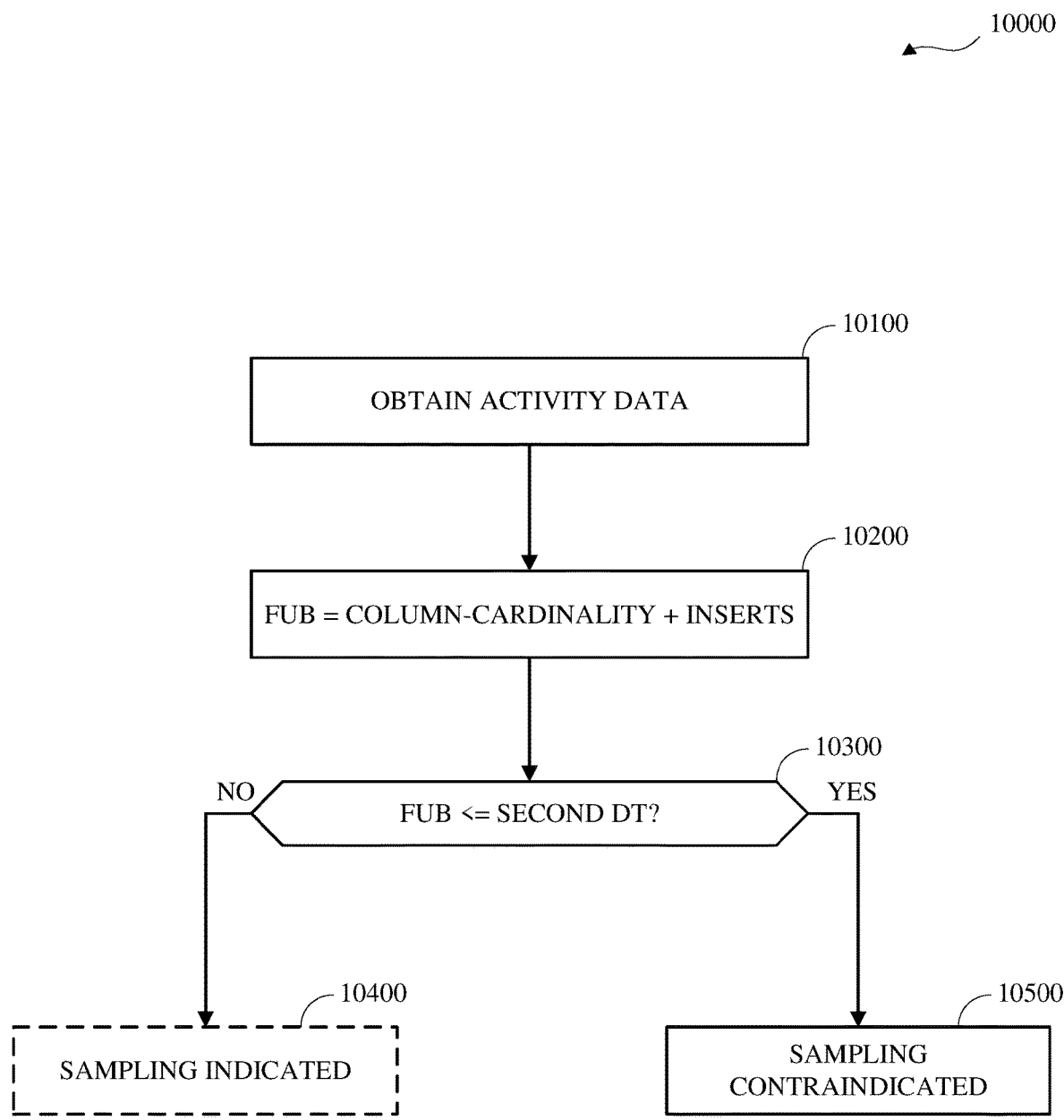
FIG. 10 is a flow diagram of an example of determining whether sampling is currently contraindicated using table upper bound data for a column.

FIG. 10 is a flow diagram of an example of determining whether sampling is currently contraindicated using table upper bound data 10000 for a column. Indexing constituent data (as shown at 4000 in FIG. 4) may include the determining whether sampling is currently contraindicated using table upper bound data 10000 for the column shown in FIG. 10. The determining whether sampling is currently contraindicated using table upper bound data 10000 for the column shown in FIG. 10, or one or more portions thereof, may be implemented by a data access and analysis system, such as the data access and analysis system 3000 shown in FIG. 3, or one or more components thereof.

or otherwise minimizes resource utilization, by omitting, excluding, or avoiding sampling for previously indexed columns based on an upper boundary, or maximum, of rows in the column, or table, determined based on a previous cardinality and activity data indicating inserts into the column. Omitting, excluding, or avoiding sampling for a column, or table, includes omitting, excluding, or avoiding requesting approximate count distinct, or count distinct, data for the column, or table. To further minimize resource utilization, the technique described herein determines whether to omit, exclude, or avoid updating the sampling for previously indexed columns based on activity data for the respective column, or table, rather than based on the constituent data stored in the respective column, or table, wherein obtaining and processing the activity data utilizes fewer resources than obtaining and processing the constituent data.

The determining whether sampling is currently contraindicated using table upper bound data 10000 for the column includes obtaining activity data for the table (at 10100). For example, the data access and analysis system, or a component thereof, such as the constituent-data indexing unit, or a component thereof, such as a data change tracker, may obtain the activity data for the table.

Obtaining the activity data for the table (at 10100) includes obtaining the activity data for the table, or one or more portions thereof, from the data source, such as from a changes stream available from the data source. The activity data may be ontological data representing activity for the table. For example, the data change tracker may obtain, access, or generate, an activity-data data query that expresses a request for activity data for the table in accordance with a defined structured query language implemented by, or otherwise compatible with or operable by, the data source. For example, the activity-data data query may include a request for inserts data representative of zero or more inserts into the table. In another example, the activity-data data query may include a request for deletions data representative of zero or more deletions from the table. The activity-data data query may include temporal data indicating a defined temporal interval, segment, or span, such as a difference between a current temporal location and the temporal location from the indexing support data corresponding to obtaining, such as generating, or updating, the constituent-data index, such as on a per-column or per-table basis.

The activity data for a table includes inserts data, deletions data, or both, for the temporal interval, segment, or span indicated in the request for activity data, such as in the activity-data data query. The inserts data is representative of zero or more inserts into the table for the temporal interval, segment, or span indicated in the request for activity data, such as in the activity-data data query. The inserts data may include, on a per-insertion basis, inserted value data indicating the data inserted into, included in, added to, or stored in, the table. The deletions data is representative of zero or more deletions from the table for the temporal interval, segment, or span indicated in the request for activity data, such as in the activity-data data query. The deletions data may include, on a per-deletion basis, deleted value data indicating the data deleted, or removed, from the table. The activity data may include aggregate data, such as a count, or number, of inserts, a count, or number, of deletions, or both the count, or number, of inserts (how many inserts), and the count, or number, of deletions (how many deletions), indicated in the activity data for the defined temporal interval, segment, or span.

Obtaining the activity data for the table (at 10100) may include omitting, avoiding, or excluding obtaining, or accessing, the constituent data stored in the respective column or table.

The determining whether sampling is currently contraindicated using table upper bound data 10000 for the column includes determining (at 10200) a first upper bound (FUB or table upper bound). The first upper bound is a sum of the column-cardinality value (COLUMN-CARDINALITY or COLUMN-CARD) from the indexing support data (obtained as shown at 4100 in FIG. 4) and the insertions value (INSERTS) indicating how many inserts are indicated in the inserts data for the table (FUB=COLUMN-CARDINALITY+INSERTS).

The determining whether sampling is currently contraindicated using table upper bound data 10000 for the column includes determining (at 10300) whether the first upper bound (FUB) is less than or equal to the second defined threshold (Second DT), such as one hundred thousand (100 k) or one million (1M) (FUB<SECOND DT?).

In some implementations, the data access and analysis system, or a component thereof, such as the constituent-data indexing unit, or a component thereof, such as the data change tracker, determines that the first upper bound (FUB) for the table is greater than the second defined threshold (FUB>Second DT), and in response to determining that the first upper bound (FUB) for the table is greater than to the second defined threshold (FUB>Second DT), the data access and analysis system, or a component thereof, such as the constituent-data indexing unit, or a component thereof, such as the data change tracker, determines that sampling is currently indicated, or other than contraindicated, or otherwise omits, avoids, or excludes determining that sampling is currently contraindicated for the column based on the first upper bound, for the column (at 10400). The determination that sampling is currently indicated, or other than contraindicated, for the column (at 10400) is shown with a broken line border to indicate that another aspect of determining whether sampling is currently contraindicated for the column may determine that sampling is currently contraindicated for the column, such as subsequent to the determining whether sampling is currently contraindicated using table upper bound data 10000 for the column shown in FIG. 10.

In some implementations, the data access and analysis system, or a component thereof, such as the constituent-data indexing unit, or a component thereof, such as the data change tracker, determines that the first upper bound (FUB) for the table is less than or equal to the second defined threshold (FUB<=SECOND DT), and in response to determining that the first upper bound (FUB) for the table is less than or equal to the second defined threshold (FUB<=SECOND DT), the data access and analysis system, or a component thereof, such as the constituent-data indexing unit, or a component thereof, such as the data change tracker, determines that sampling is currently contraindicated for the column (at 10500). Subsequent aspects of constituent-data indexing with respect to sampling may be omitted, or skipped, for the column for the current iteration, or performance, of constituent-data indexing. Subsequent iterations, or performances, of constituent-data indexing may include sampling the column.

Figure 11:
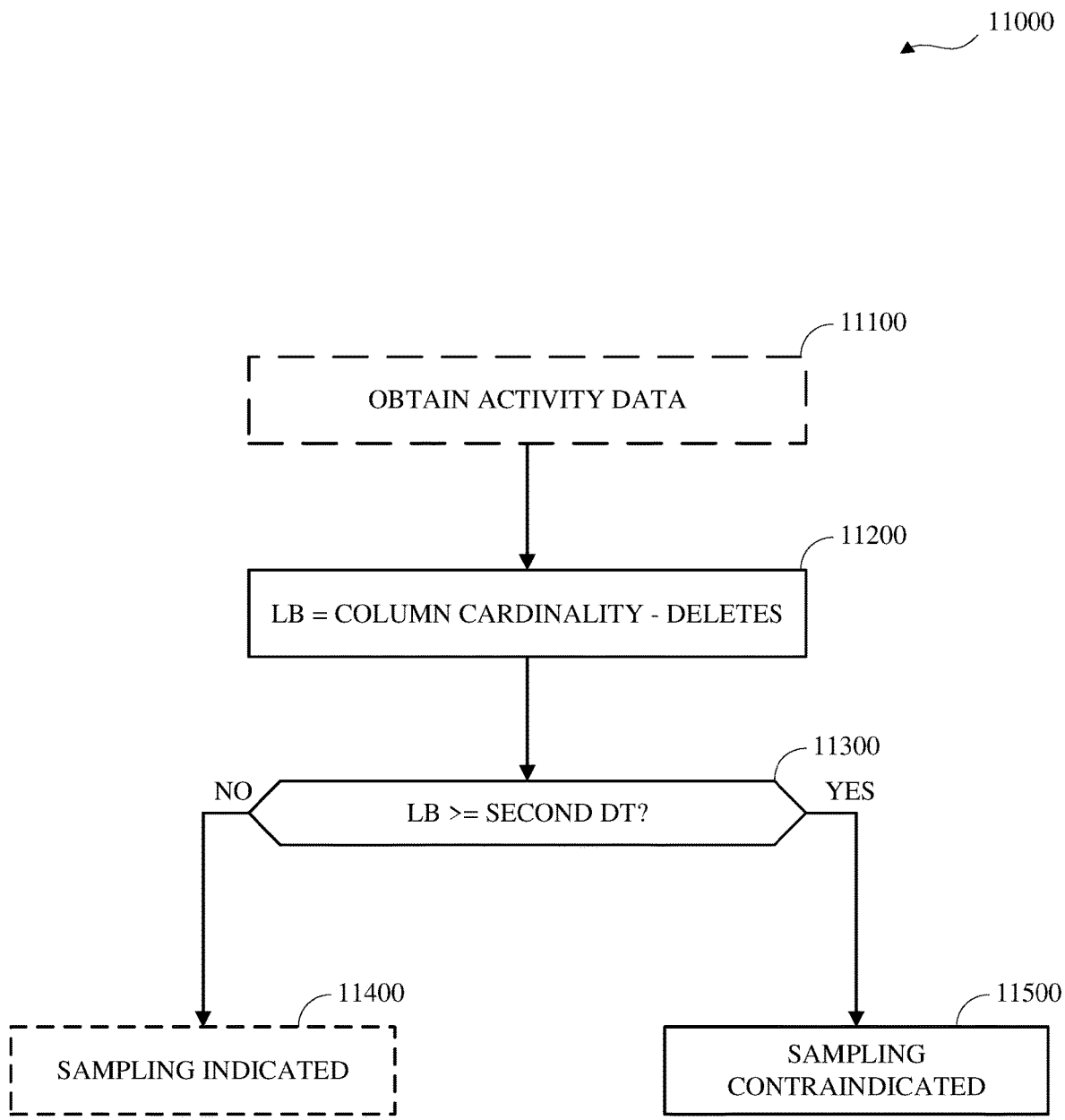
FIG. 11 is a flow diagram of an example of determining whether sampling is currently contraindicated using lower bound data for a column.

FIG. 11 is a flow diagram of an example of determining whether sampling is currently contraindicated using lower bound data 11000 for a column. Indexing constituent data (as shown at 4000 in FIG. 4) may include the determining whether sampling is currently contraindicated using lower bound data 11000 for the column shown in FIG. 11. The determining whether sampling is currently contraindicated using lower bound data 11000 for the column shown in FIG. 11, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding sampling for previously indexed columns based on a lower boundary, or maximum, of rows in the column, or table, determined based on a previous cardinality and activity data indicating deletions from the column. Omitting, excluding, or avoiding sampling for a column, or table, includes omitting, excluding, or avoiding requesting approximate count distinct, or count distinct, data for the column, or table. To further minimize resource utilization, the technique described herein determines whether to omit, exclude, or avoid updating the sampling for previously indexed columns based on activity data for the respective column, or table, rather than based on the constituent data stored in the respective column, or table, wherein obtaining and processing the activity data utilizes fewer resources than obtaining and processing the constituent data.

The determining whether sampling is currently contraindicated using lower bound data 11000 for the column includes obtaining activity data for the table (at 11100). For example, the data access and analysis system, or a component thereof, such as the constituent-data indexing unit, or a component thereof, such as a data change tracker, may obtain the activity data for the table. Obtaining activity data for the table (at 11100) is similar to obtaining activity data for the table as shown in FIG. 10 (at 10100), except as is described herein or as is otherwise clear from context. Obtaining activity data for the table (at 11100) is shown with a broken line border to indicate that obtaining activity data for the table (at 11100) may include accessing activity data previously obtained for the current iteration, such as the activity data obtained as shown in FIG. 10 (at 10100). Obtaining the activity data for the table (at 11100) may include omitting, avoiding, or excluding obtaining, or accessing, the constituent data stored in the respective column or table.

The determining whether sampling is currently contraindicated using lower bound data 11000 for the column includes determining (at 11200) a lower bound (LB). The lower bound is a result of subtracting the deletions value (DELETES), indicating how many deletions are indicated in the deletions data for the table, from the column-cardinality value (COLUMN-CARDINALITY or COLUMN-CARD) from the indexing support data (obtained as shown at 4100 in FIG. 4) (LB=COLUMN-CARDINALITY−DELETES).

The determining whether sampling is currently contraindicated using lower bound data 11000 for the column includes determining (at 11300) whether the lower bound (LB) is greater than or equal to the second defined threshold (Second DT), such as one hundred thousand (100 k) or one million (1M) (LB>=SECOND DT?).

In some implementations, the data access and analysis system, or a component thereof, such as the constituent-data indexing unit, or a component thereof, such as the data change tracker, determines that the lower bound (LB) for the table is less than the second defined threshold (LB<Second DT), and in response to determining that the lower bound (LB) for the table is less than the second defined threshold (LB<Second DT), the data access and analysis system, or a component thereof, such as the constituent-data indexing unit, or a component thereof, such as the data change tracker, determines that sampling is currently indicated, or other than contraindicated, or otherwise omits, avoids, or excludes determining that sampling is currently contraindicated for the column based on the lower bound, for the column (at 11400). The determination that sampling is currently indicated, or other than contraindicated, for the column (at 11400) is shown with a broken line border to indicate that another aspect of determining whether sampling is currently contraindicated for the column may determine that sampling is currently contraindicated for the column, such as subsequent to the determining whether sampling is currently contraindicated using lower bound data 11000 for the column shown in FIG. 11.

In some implementations, the data access and analysis system, or a component thereof, such as the constituent-data indexing unit, or a component thereof, such as the data change tracker, determines that the lower bound (LB) for the table is greater than or equal to the second defined threshold (LB>=Second DT), and in response to determining that the lower bound (LB) for the table is greater than or equal to the second defined threshold (LB>=Second DT), the data access and analysis system, or a component thereof, such as the constituent-data indexing unit, or a component thereof, such as the data change tracker, determines that sampling is currently contraindicated for the column (at 11500). Subsequent aspects of constituent-data indexing with respect to sampling may be omitted, or skipped, for the column for the current iteration, or performance, of constituent-data indexing. Subsequent iterations, or performances, of constituent-data indexing may include sampling the column.

Figure 12:
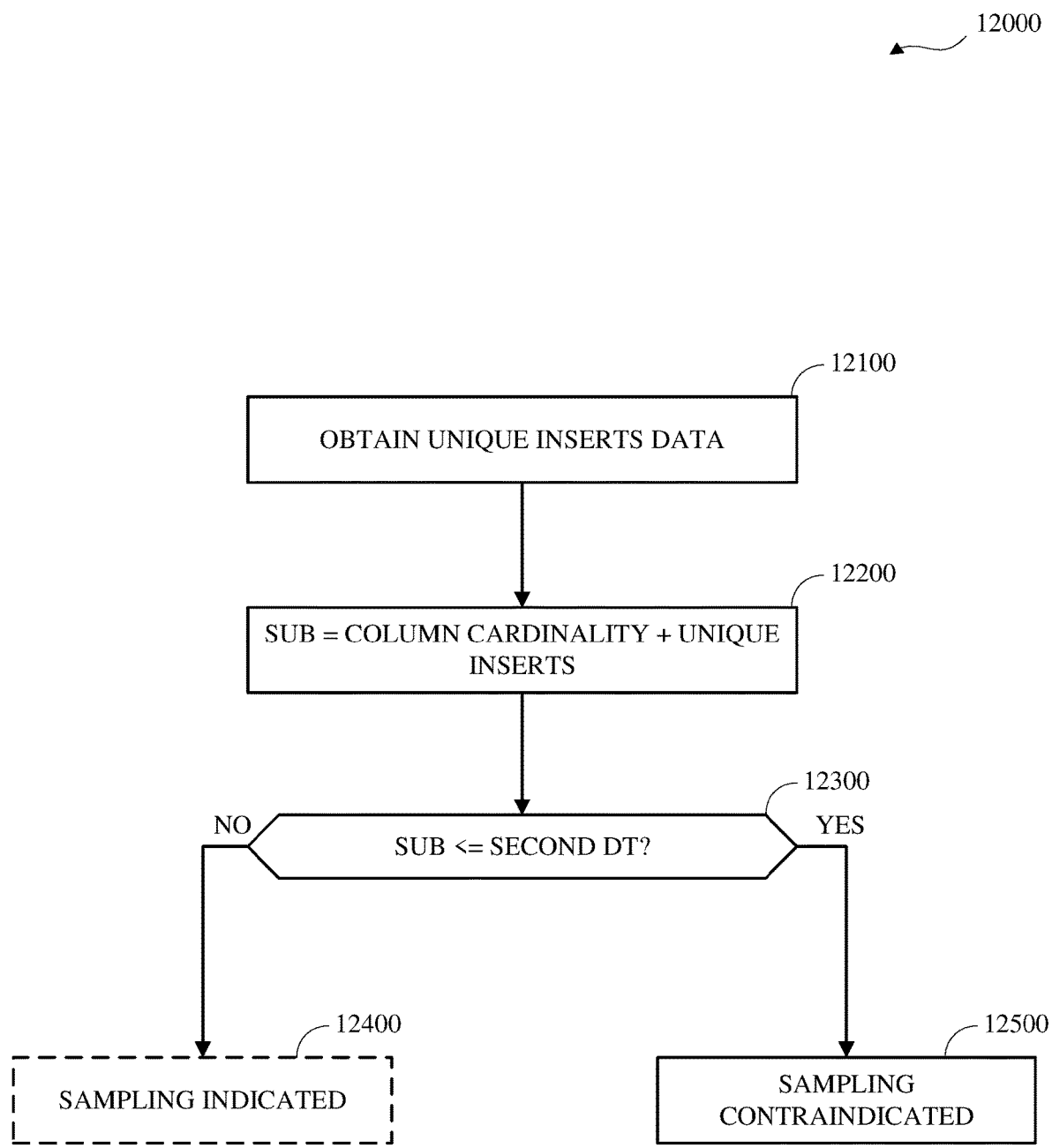
FIG. 12 is a flow diagram of an example of determining whether sampling is currently contraindicated unique upper bound data for a column.

FIG. 12 is a flow diagram of an example of determining whether sampling is currently contraindicated unique upper bound data 12000 for a column. Indexing constituent data (as shown at 4000 in FIG. 4) may include the determining whether sampling is currently contraindicated unique upper bound data 12000 for the column shown in FIG. 12. The determining whether sampling is currently contraindicated unique upper bound data 12000 for the column shown in FIG. 12, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding sampling for previously indexed columns based on an upper boundary, or maximum, for the column cardinality determined based on a previous cardinality and data indicating unique inserts into the column. Omitting, excluding, or avoiding sampling for a column, or table, includes omitting, excluding, or avoiding requesting approximate count distinct, or count distinct, data for the column, or table. To further minimize resource utilization, the technique described herein determines whether to omit, exclude, or avoid updating the sampling for previously indexed columns based on data indicating unique inserts into the column, rather than based on the constituent data stored in the respective column, or table, wherein obtaining and processing the data indicating unique inserts into the column utilizes fewer resources than obtaining and processing the constituent data.

The determining whether sampling is currently contraindicated unique upper bound data 12000 for the column includes obtaining unique inserts data for the column (at 12100). For example, the data access and analysis system, or a component thereof, such as the constituent-data indexing unit, or a component thereof, such as a data change tracker, may obtain the unique inserts data for the column. Obtaining unique inserts data for the column (at 12100) includes obtaining the unique inserts data for the column, or one or more portions thereof, from the data source, such as from a changes stream available from the data source. The unique inserts data for the column may be ontological data representing unique insert activity for the column. For example, the data change tracker may obtain, access, or generate, a unique-inserts data query that expresses a request for unique inserts data for the column in accordance with a defined structured query language implemented by, or otherwise compatible with or operable by, the data source. For example, the unique-inserts data query may include a request for unique inserts data, or a unique-inserts value, representative of zero or more inserts into the column, corresponding to the unique inserts indicated in the activity data obtained as shown in FIG. 10 (at 10100). The unique-inserts data query may include temporal data indicating the defined temporal interval, segment, or span.

Obtaining the unique inserts data for the column (at 10100) may include omitting, avoiding, or excluding obtaining, or accessing, the constituent data stored in the respective column or table.

The determining whether sampling is currently contraindicated unique upper bound data 12000 for the column includes determining (at 12200) a second upper bound (SUB). The second upper bound is a sum of the column-cardinality value (COLUMN-CARDINALITY or COLUMN-CARD) from the indexing support data (obtained as shown at 4100 in FIG. 4) and the unique-inserts value (obtained at 12100) (SUB=COLUMN-CARDINALITY+ UNIQUE INSERTS).

The determining whether sampling is currently contraindicated unique upper bound data 12000 for the column includes determining (at 12300) whether the second upper bound (SUB) is less than or equal to the second defined threshold (Second DT), such as one hundred thousand (100 k) or one million (1M) (SUB<=SECOND DT?).

In some implementations, the data access and analysis system, or a component thereof, such as the constituent-data indexing unit, or a component thereof, such as the data change tracker, determines that the second upper bound (SUB) for the table is greater than the second defined threshold (SUB>Second DT), and in response to determining that the second upper bound (SUB) for the table is greater than the second defined threshold (SUB>Second DT), the data access and analysis system, or a component thereof, such as the constituent-data indexing unit, or a component thereof, such as the data change tracker, determines that sampling is currently indicated, or other than contraindicated, or otherwise omits, avoids, or excludes determining that sampling is currently contraindicated for the column based on the unique inserts data for the column, for the column (at 12400). The determination that sampling is currently indicated, or other than contraindicated, for the column (at 12400) is shown with a broken line border to indicate that another aspect of determining whether sampling is currently contraindicated for the column may determine that sampling is currently contraindicated for the column, such as subsequent to the determining whether sampling is currently contraindicated unique upper bound data 12000 for the column shown in FIG. 12.

In some implementations, the data access and analysis system, or a component thereof, such as the constituent-data indexing unit, or a component thereof, such as the data change tracker, determines that the second upper bound (SUB) for the table is less than or equal to the second defined threshold (SUB<=Second DT), and in response to determining that the second upper bound (SUB) for the table is less than or equal to the second defined threshold (SUB<=Second DT), the data access and analysis system, or a component thereof, such as the constituent-data indexing unit, or a component thereof, such as the data change tracker, determines that sampling is currently contraindicated for the column (at 12500). Subsequent aspects of constituent-data indexing with respect to sampling may be omitted, or skipped, for the column for the current iteration, or performance, of constituent-data indexing. Subsequent iterations, or performances, of constituent-data indexing may include sampling the column.

Figure 13:
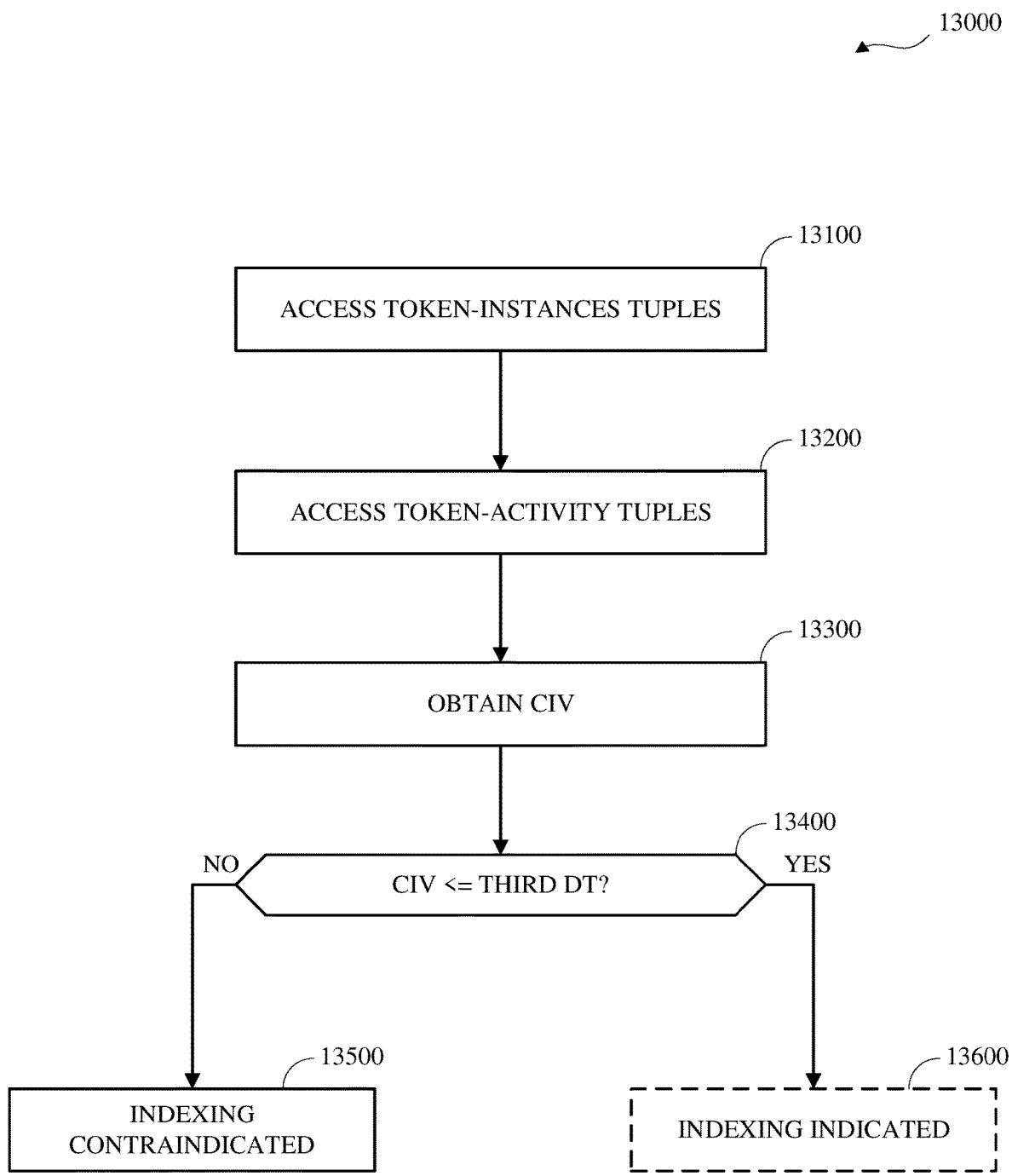
FIG. 13 is a flow diagram of an example of determining whether updating the constituent-data index is currently contraindicated using tuple count data for a column.

FIG. 13 is a flow diagram of an example of determining whether updating the constituent-data index is currently contraindicated using tuple count data 13000 for a column. Indexing constituent data (as shown at 4000 in FIG. 4) may include the determining whether updating the constituent-data index is currently contraindicated using tuple count data 13000 for a column shown in FIG. 13. The determining whether updating the constituent-data index is currently contraindicated using tuple count data 13000 for a column shown in FIG. 13, or one or more portions thereof, may be implemented by a data access and analysis system, such as the data access and analysis system 3000 shown in FIG. 3, or one or more components thereof.

The technique described herein improves on the resource utilization of other systems, or otherwise minimizes resource utilization, by omitting, excluding, or avoiding updating the indexing for tokens, on a user and group basis, that are determined to be absent from the constituent data. Omitting, excluding, or avoiding updating the indexing for a column, or table, includes omitting, excluding, or avoiding sampling the column, or table, includes omitting, excluding, or avoiding requesting approximate count distinct, or count distinct, data for the column, or table, and includes omitting, excluding, or avoiding obtaining indexing data for the column, or table. To further minimize resource utilization, the technique described herein determines whether to omit, exclude, or avoid updating the indexing for previously indexed columns based on based on the indexing support data and the activity data for the column, or table, rather than based on the constituent data stored in the respective column, or table, wherein obtaining and processing the indexing support data and the activity data utilizes fewer resources than obtaining and processing the constituent data.

The determining whether updating the constituent-data index is currently contraindicated using tuple count data 13000 for a column includes accessing, from the indexing support data obtained as shown in FIG. 4 (at 4100), zero or more token-instances tuples for the column (at 13100). For example, the data access and analysis system, or a component thereof, such as the constituent-data indexing unit, or a component thereof, such as the data change tracker, may access the token-instances tuples for the column (at 13100).

The determining whether updating the constituent-data index is currently contraindicated using tuple count data 13000 for a column includes accessing, from the activity data obtained as shown in FIG. 10 (at 10100), zero or more token-activity tuples for the column (at 13200). For example, the data access and analysis system, or a component thereof, such as the constituent-data indexing unit, or a component thereof, such as the data change tracker, may access the token-activity tuples for the column (at 13200).

Figure 14:
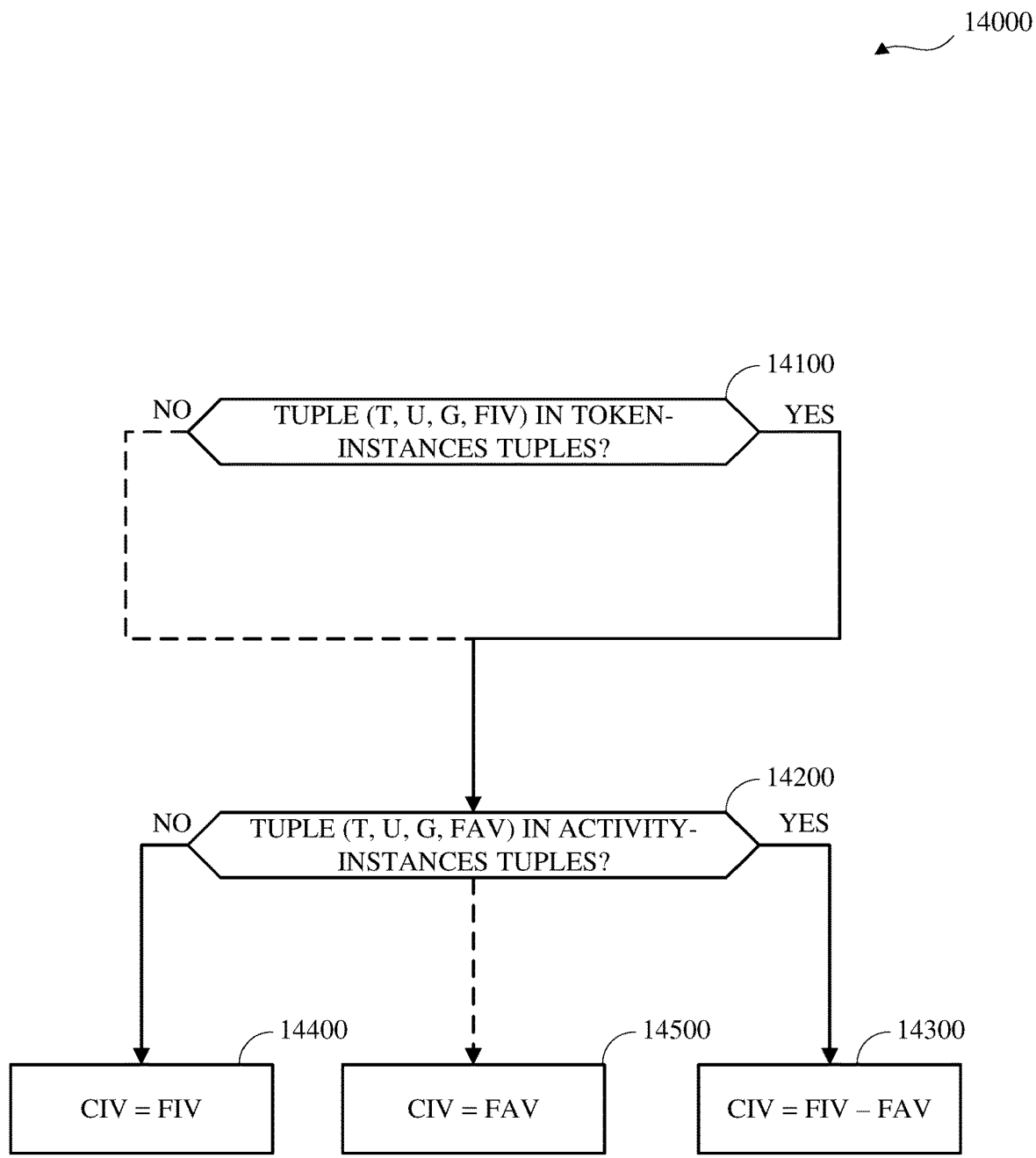
FIG. 14 is a flow diagram of an example of obtaining the current instances value for a column.

The determining whether updating the constituent-data index is currently contraindicated using tuple count data 13000 for a column includes obtaining a current instances value for the column in accordance with the token-instances tuples and the token-activity tuples (at 13300). An example of obtaining the current instances value for the column is shown in FIG. 14.

The determining whether updating the constituent-data index is currently contraindicated using tuple count data 13000 for a column includes determining (at 13400) whether the current instances value (CIV) for the column is equal to or less than a third defined threshold (THIRD DT), such as zero (0), (CIV<=THIRD DT?).

In some implementations, the data access and analysis system, or a component thereof, such as the constituent-data indexing unit, or a component thereof, such as the data change tracker, determines that the current instances value (CIV) for the column is greater than the third defined threshold (THIRD DT) (CIV>THIRD DT), and in response to determining that the current instances value (CIV) for the column is greater than the third defined threshold (THIRD DT) (CIV>THIRD DT), the data access and analysis system, or a component thereof, such as the constituent-data indexing unit, or a component thereof, such as the data change tracker, determines that updating the constituent-data index is currently contraindicated for the column (at 13500). Subsequent aspects of constituent-data indexing may be omitted, or skipped, for the column for the current iteration, or performance, of constituent-data indexing.

In some implementations, the data access and analysis system, or a component thereof, such as the constituent-data indexing unit, or a component thereof, such as the data change tracker, determines that the current instances value (CIV) for the column is equal to or less than the third defined threshold (THIRD DT) (CIV<=THIRD DT), and in response to determining that the current instances value (CIV) for the column is equal to or less than the third defined threshold (THIRD DT) (CIV<=THIRD DT), the data access and analysis system, or a component thereof, such as the constituent-data indexing unit, or a component thereof, such as the data change tracker, determines that updating the constituent-data index is currently indicated (INDEXING INDICATED), or other than contraindicated, or otherwise omits, avoids, or excludes determining that updating the constituent-data index is currently contraindicated for the column based the current instances value, for the column (at 13600). The determination that updating the constituent-data index is currently indicated, or other than contraindicated, for the column (at 13600) is shown with a broken line border to indicate that another aspect of determining whether updating the constituent-data index is currently contraindicated for the column may determine that updating the constituent-data index is currently contraindicated for the column, such as subsequent to the determining whether updating the constituent-data index is currently contraindicated using tuple count data 13000 for a column shown in FIG. 13.

FIG. 14 is a flow diagram of an example of obtaining the current instances value 14000 for a column. Indexing constituent data (as shown at 4000 in FIG. 4) may include obtaining the current instances value 14000 for the column shown in FIG. 14. Obtaining the current instances value 14000 for the column, or one or more portions thereof, may be implemented by a data access and analysis system, such as the data access and analysis system 3000 shown in FIG. 3, or one or more components thereof.

Obtaining the current instances value 14000 for the column includes iterating through, or otherwise processing or evaluating, the token-instances tuples from the indexing-support data obtained as shown in FIG. 4 (at 4100), the token-activity tuples from the activity data obtained as shown in FIG. 10 (at 10100), or both. A token-instances tuple that includes a token identifier, a user identifier, and a group identifier may be identified as corresponding to, or matching, a token-activity tuple that includes the token identifier, the user identifier, and the group identifier. Similarly, a token-activity tuple that includes a token identifier, a user identifier, and a group identifier may be identified as corresponding to, or matching, a token-instances tuple that includes the token identifier, the user identifier, and the group identifier.

For example, the data access and analysis system, or a component thereof, such as the constituent-data indexing unit, or a component thereof, such as the data change tracker, may iterate through the token-instances tuples, wherein iterating through the token-instances tuples includes obtaining a respective token-instances tuple, and, for the respective token-instances tuple, determining (at 14200) whether the token-activity tuples include a corresponding, or matching, token-activity tuple. The data access and analysis system, or a component thereof, such as the constituent-data indexing unit, or a component thereof, such as the data change tracker, may iterate through the token-activity tuples, other than token-activity tuples previously identifies as corresponding to, or matching, a token-instances tuple from the token-instances tuples, wherein iterating through the token-activity tuples includes determining (at 14100) that a corresponding, or matching, token-instances tuple is absent, or unavailable, from the token-instances tuples.

The data access and analysis system, or a component thereof, such as the constituent-data indexing unit, or a component thereof, such as the data change tracker, accesses the token-instances tuples to obtain a previously indexed token-instances tuple, which corresponds with determining (at 14100) that the token-instances tuples include the previously indexed token-instances tuple. The previously indexed token-instances tuple includes a token value, a user identifier, a group identifier, and a first instances value (FIV) indicating how many rows in a corresponding column have the token value, previously indexed in accordance with obtaining the constituent-data index as shown in FIG. 4 (at 4100).

The data access and analysis system, or a component thereof, such as the constituent-data indexing unit, or a component thereof, such as the data change tracker, accesses the token-activity tuples and determines (at 14200) whether the token-activity tuples (obtained as shown at 13100 in FIG. 13) include a corresponding token-activity tuple that includes the first token value, the first user identifier, and the first group identifier, corresponding to the previously indexed token-instances tuple. The token-activity tuple that includes the first token value, the first user identifier, and the first group identifier includes a first activity value (FAV). The first activity value is a result of subtracting the deletions value for the column (obtained as shown at 11200 in FIG. 11) from the insertions value for the column (obtained as shown at 10200 in FIG. 10).

In some implementations, the data access and analysis system, or a component thereof, such as the constituent-data indexing unit, or a component thereof, such as the data change tracker, determines (at 14100) that the token-instances tuples include the previously indexed token-instances tuple and determines (at 14200) that the token-activity tuples include the corresponding token-activity tuple, and, in response, the data access and analysis system, or a component thereof, such as the constituent-data indexing unit, or a component thereof, such as the data change tracker, obtains, or determines, (at 14300), as the current instances value (CIV), a result of subtracting the first activity value (FAV) from the first instances value (FIV) (CIV=FIV−FAV).

In some implementations, the data access and analysis system, or a component thereof, such as the constituent-data indexing unit, or a component thereof, such as the data change tracker, determines (at 14100) that the token-instances tuples include the previously indexed token-instances tuple and determines (at 14200) that the corresponding token-activity tuple is omitted, unavailable, or absent, from the token-activity tuples, and, in response, the data access and analysis system, or a component thereof, such as the constituent-data indexing unit, or a component thereof, such as the data change tracker, obtains, or determines, (at 14400), as the current instances value (CIV), the first instances value (FIV) (CIV=FIV).

In some implementations, the data access and analysis system, or a component thereof, such as the constituent-data indexing unit, or a component thereof, such as the data change tracker, iterates through the token-activity tuples to identify a current token-activity tuple, other than a token-activity tuple previously identified as corresponding to a previously indexed token-instances tuple, which corresponds with determining (at 14200) that the token-activity tuples include the current token-activity tuple, and determining (at 14100) that a corresponding previously indexed current token-activity tuple is absent, or omitted, from the token-instances tuples, and, in response, the data access and analysis system, or a component thereof, such as the constituent-data indexing unit, or a component thereof, such as the data change tracker, obtains, or determines, (at 14300), as the current instances value (CIV), the first activity value (FAV) (CIV=FAV), which is shown with a broken directional line for clarity.

Figure 15:
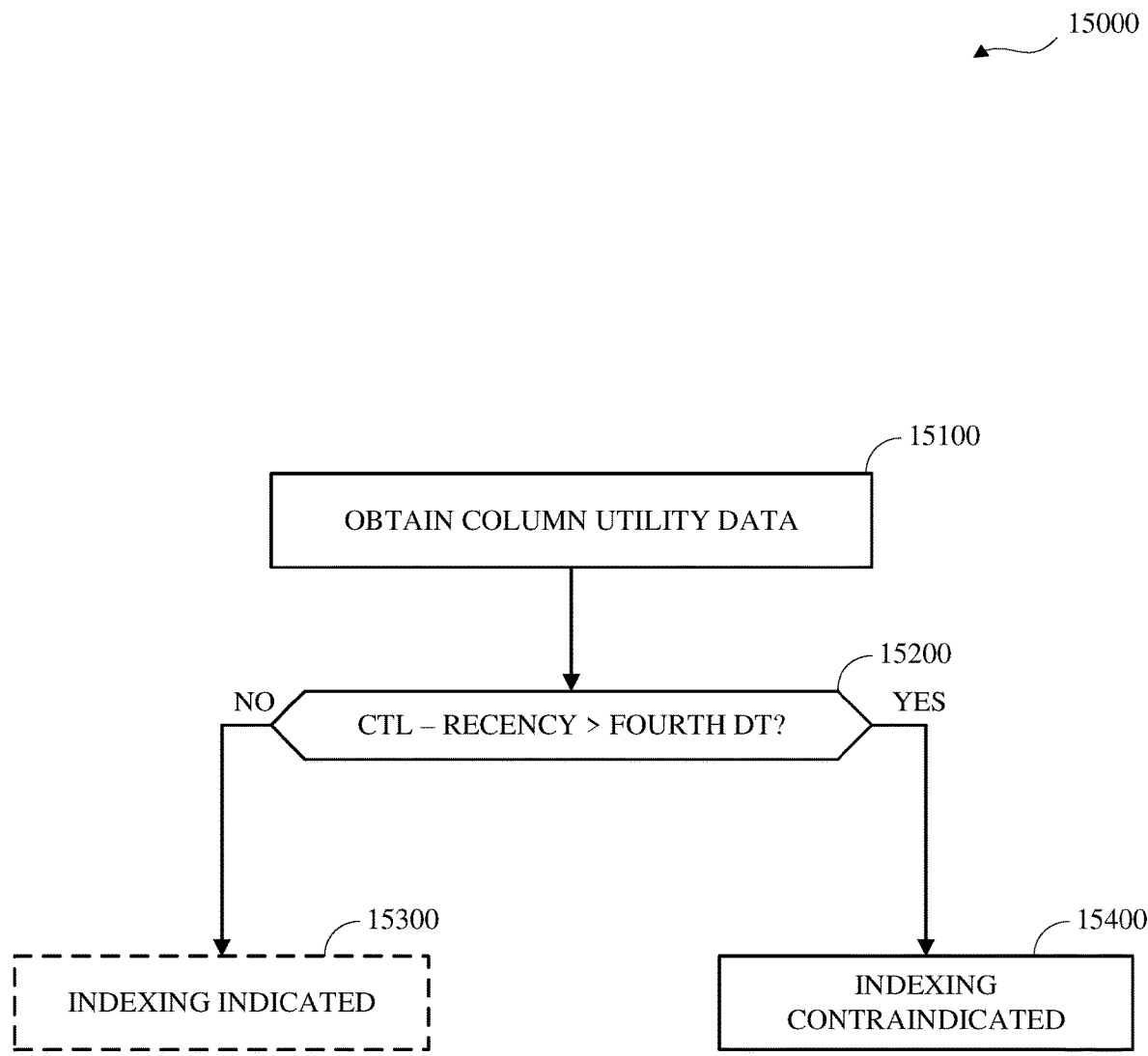
FIG. 15 is a flow diagram of an example of determining whether updating the constituent-data index is currently contraindicated using recency data for a column.

FIG. 15 is a flow diagram of an example of determining whether updating the constituent-data index is currently contraindicated using recency data 15000 for a column. Indexing constituent data (as shown at 4000 in FIG. 4) may include the determining whether updating the constituent-data index is currently contraindicated using recency data 15000 for a column shown in FIG. 15. The determining whether updating the constituent-data index is currently contraindicated using recency data 15000 for a column shown in FIG. 15, or one or more portions thereof, may be implemented by a data access and analysis system, such as the data access and analysis system 3000 shown in FIG. 3, or one or more components thereof or otherwise minimizes resource utilization, by omitting, excluding, or avoiding updating the indexing for previously indexed columns wherein the indexed data for the respective column has relatively, such as below a defined threshold, utility, or recency of use in the data access and analysis system. Omitting, excluding, or avoiding updating the indexing for a column, or table, includes omitting, excluding, or avoiding sampling the column, or table, includes omitting, excluding, or avoiding requesting approximate count distinct, or count distinct, data for the column, or table, and includes omitting, excluding, or avoiding obtaining indexing data for the column, or table.

The determining whether updating the constituent-data index is currently contraindicated using recency data 15000 for a column includes obtaining utility data for the column (at 15100). The data access and analysis system, or a component thereof, such as the constituent-data indexing unit, obtains the utility data for the column (column utility data) from another component of the data access and analysis system, such as a data utility unit of the data access and analysis system, such as the data utility unit 3720 shown in FIG. 3. The column utility data includes recency data indicating a temporal location (recency temporal location) of a recent, such as most recent, access, or use, of the column, or of a token representing the column, in the data access and analysis system.

The determining whether updating the constituent-data index is currently contraindicated using recency data 15000 for a column includes determining (at 15200) whether a difference between the current temporal location (CTL) and the recency temporal location (RECENCY) is greater than a fourth defined threshold (FOURTH DT), such as five days, (CTL−RECENCY>FOURTH DT?).

In some implementations, the data access and analysis system, or a component thereof, such as the constituent-data indexing unit, determines that the difference between the current temporal location (CTL) and the recency temporal location (RECENCY) is less than or equal to a fourth defined threshold (FOURTH DT). In response to determining that the difference between the current temporal location (CTL) and the recency temporal location (RECENCY) is less than or equal to the fourth defined threshold (FOURTH DT), the data access and analysis system, or a component thereof, such as the constituent-data indexing unit, determines that updating the constituent-data index is currently indicated (INDEXING INDICATED), or other than contraindicated, or otherwise omits, avoids, or excludes determining that updating the constituent-data index is currently contraindicated for the column based the recency data for the column (at 15300). The determination that updating the constituent-data index is currently indicated, or other than contraindicated, for the column (at 15300) is shown with a broken line border to indicate that another aspect of determining whether updating the constituent-data index is currently contraindicated for the column may determine that updating the constituent-data index is currently contraindicated for the column, such as subsequent to the determining whether updating the constituent-data index is currently contraindicated using recency data 15000 for a column shown in FIG. 15.

In some implementations, the data access and analysis system, or a component thereof, such as the constituent-data indexing unit, determines that the difference between the current temporal location (CTL) and the recency temporal location (RECENCY) is greater than the fourth defined threshold (FOURTH DT). In response to determining that the difference between the current temporal location (CTL) and the recency temporal location (RECENCY) is greater than the fourth defined threshold (FOURTH DT), the data access and analysis system, or a component thereof, such as the constituent-data indexing unit, determines that updating the constituent-data index is currently contraindicated for the column (at 15400). Subsequent aspects of constituent-data indexing may be omitted, or skipped, for the column for the current iteration, or performance, of constituent-data indexing.

FIG. 16 is a flow diagram of an example of determining which constituent-data index to update 16000 for a column. Indexing constituent data (as shown at 4000 in FIG. 4) may include Determining which constituent-data index to update 16000 for the column shown in FIG. 16. Determining which constituent-data index to update 16000 for the column shown in FIG. 16, or one or more portions thereof, may be implemented by a data access and analysis system, such as the data access and analysis system 3000 shown in FIG. 3, or one or more components thereof.

The data access and analysis system, or a component thereof, such as the constituent-data indexing unit, determines a constituent-data index, such as the constituent-data prefix index, the constituent-data sub string index, the constituent-data suffix index, the constituent-data token index, or a combination thereof, for indexing the constituent data on a per-column basis.

Determining which constituent-data index to update 16000 for the column includes obtaining sample data for the column (at 16100), determining an average length (at 16200), determining whether the average length is greater than a fifth defined threshold (at 16300), determining whether the long token ratio is greater than a sixth defined threshold (at 16320), determining whether the column includes dictionary words (at 16400), determining whether the column includes designated entity type data (at 16500), obtaining a data score (at 16600), determining whether the data score is less than a seventh defined threshold (at 16700), determining that updating the constituent-data index includes updating the constituent-data substring index (at 16800), and determining that updating the constituent-data index includes updating the constituent-data prefix index (at 16900).

Obtaining the sample data for the column (at 16100) includes obtaining the sample data for the column, or one or more portions thereof, from the data source. For example, the data access and analysis system, or a component thereof, such as the constituent-data indexing unit, may obtain, access, or generate, a sampling-data data query that expresses a request for sample data for the column in accordance with a defined structured query language implemented by, or otherwise compatible with or operable by, the data source. The sampling-data data query may include a limit clause indicating a maximum number, or count, of rows, or records, for the sample data. Sampling the column (at 16100) includes obtaining the sample data from the data source in accordance with execution of the sampling-data data query by the data source.

Determining which constituent-data index to update 16000 for the column includes obtaining (at 16200), such as by calculating or determining, the average length for the column using the sample data, such as by determining a length of the respective records, rows, or values included in the sample data, determining a sum of the respective lengths, and dividing the sum of the respective lengths by the number, or count, of rows, records, or values in the sample data.

Determining which constituent-data index to update 16000 for the column includes determining (at 16300) whether the average length for the column (obtained at 16200) is greater than a fifth defined threshold (FIFTH DT), such as one thousand (1000), (AVERAGE LENGTH>FIFTH DT?).

In some implementations, the data access and analysis system, or a component thereof, such as the constituent-data indexing unit, determines (at 16300) that the average length for the column is greater than the fifth defined threshold (FIFTH DT) (AVERAGE LENGTH>FIFTH DT). In response to determining that the average length for the column is greater than the fifth defined threshold (FIFTH DT) (AVERAGE LENGTH>FIFTH DT) (at 16300), the data access and analysis system, or a component thereof, such as the constituent-data indexing unit, determines that updating the constituent-data index includes updating the constituent-data prefix index with respect to the column (at 16900). Determining whether the long token ratio is greater than the sixth defined threshold (at 16320), determining whether the column includes dictionary words (at 16400), determining whether the column includes designated entity type data (at 16500), obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the average length for the column is greater than the fifth defined threshold (FIFTH DT) (AVERAGE LENGTH>FIFTH DT) (at 16300).

In some implementations, the data access and analysis system, or a component thereof, such as the constituent-data indexing unit, determines (at 16300) that the average length for the column is less than or equal to the fifth defined threshold (FIFTH DT) (AVERAGE LENGTH<=FIFTH DT). In response to determining that the average length for the column is less than or equal to the fifth defined threshold (FIFTH DT) (AVERAGE LENGTH<=FIFTH DT) (at 16300), the data access and analysis system, or a component thereof, such as the constituent-data indexing unit, determines whether the long token ratio for the column is greater than the fifth defined (at 16320).

Determining which constituent-data index to update 16000 for the column includes determining (at 16320) whether a long token ratio for the column is greater than a sixth defined threshold (SIXTH DT), such as two tenths (0.2), (LONG TOKEN RATIO>SIXTH DT?).

The data access and analysis system, or a component thereof, determines (at 16320) the long token ratio for a respective column based on the corresponding sample data. The sample data may indicate, as determined by the data access and analysis system, or the component thereof, that the long token ratio for the column is greater than the sixth defined threshold. The long token ratio is the ratio of respective tokens, or values, from a row, or record, from the sample data from the column having a length greater than a defined length, such as two hundred (200), to the cardinality of the column.

In some implementations, the data access and analysis system, or a component thereof, such as the constituent-data indexing unit, determines (at 16320) that the long token ratio for the column is greater than the sixth defined threshold (SIXTH DT) (LONG TOKEN RATIO>SIXTH DT). In response to determining that the long token ratio for the column is greater than the sixth defined threshold (SIXTH DT) (LONG TOKEN RATIO>SIXTH DT) (at 16320), the data access and analysis system, or a component thereof, such as the constituent-data indexing unit, determines that updating the constituent-data index includes updating the constituent-data prefix index with respect to the column (at 16900). Determining whether the column includes dictionary words (at 16400), determining whether the column includes designated entity type data (at 16500), obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the long token ratio for the column is greater than the sixth defined threshold (SIXTH DT) (LONG TOKEN RATIO>SIXTH DT) (at 16320).

In some implementations, the data access and analysis system, or a component thereof, such as the constituent-data indexing unit, determines (at 16320) that the long token ratio for the column is less than or equal to the sixth defined threshold (SIXTH DT) (LONG TOKEN RATIO<=SIXTH DT). In response to determining that the long token ratio for the column is less than or equal to the sixth defined threshold (SIXTH DT) (LONG TOKEN RATIO<=SIXTH DT) (at 16320), the data access and analysis system, or a component thereof, such as the constituent-data indexing unit, determines whether the column includes dictionary words (at 16400).

The data access and analysis system, or a component thereof, such as the constituent-data indexing unit, determines whether the sample data indicates that the column is a dictionary words column that includes dictionary words (at 16400). For example, the data access and analysis system, or a component thereof, such as the constituent-data indexing unit, may compare respective column values with a defined dictionary, which may be stored in the data access and analysis system.

In some implementations, the data access and analysis system, or a component thereof, such as the constituent-data indexing unit, determines (at 16400) that the column is a dictionary words column that includes dictionary words. In response to determining that the column is a dictionary words column that includes dictionary words (at 16400), the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900). Determining whether the column includes designated type data (at 16500), obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the column is a dictionary words column that includes dictionary words (at 16400).

In some implementations, the data access and analysis system, or a component thereof, such as the constituent-data indexing unit, determines (at 16400) that the column is other than a dictionary words column. In response to determining that the column is other than a dictionary words column (at 16400), the data access and analysis system, or a component thereof, such as the constituent-data indexing unit, determines whether the column includes designated type data (at 16500).

The data access and analysis system, or a component thereof, such as the constituent-data indexing unit, determines whether the sample data indicates that the column includes data of one or more designated types (at 16500). The data access and analysis system, or a component thereof, such as the constituent-data indexing unit, determines whether the sample data indicates that the column includes data of one or more designated types (at 16500), based on one or more defined, or designated, types of data, such as geolocation data, such as zip code data, geographic coordinate data, or geolocation name data, financial data, and entity data, such as organization data or person data.

To determine whether the column includes zip code data, the data access and analysis system, or a component thereof, such as the constituent-data indexing unit, performs a defined zip code matching evaluation, such as using a regular expression, on the sample data (obtained at 16100). In some implementations, the data access and analysis system, or a component thereof, such as the constituent-data indexing unit, determines that the sample data indicates that the column includes zip code data (at 16500), and the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900). Obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the sample data indicates that the column includes zip code data (at 16500).

To determine whether the column includes geographic coordinate data, such as longitude data, latitude data, or a combination thereof, the data access and analysis system, or a component thereof, such as the constituent-data indexing unit, performs a defined geographic coordinate matching evaluation, such as using a regular expression, on the sample data (obtained at 16100). In some implementations, the data access and analysis system, or a component thereof, such as the constituent-data indexing unit, determines that the sample data indicates that the column includes geographic coordinate data (at 16500), and the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900). Obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the sample data indicates that the column includes geographic coordinate data (at 16500).

To determine whether the column includes geolocation name data, the data access and analysis system, or a component thereof, such as the constituent-data indexing unit, determines whether the sample data (obtained at 16100) includes one or more values from a defined set, or list, of geolocation names. In some implementations, the data access and analysis system, or a component thereof, such as the constituent-data indexing unit, determines that the sample data indicates that the column includes geolocation name data (at 16500), and the data access and analysis system, or a component thereof, such as the constituent-data indexing unit, determines that updating the constituent-data index includes updating the constituent-data sub string index with respect to the column (at 16800) and updating the constituent-data prefix index with respect to the column (at 16900). Obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the sample data indicates that the column includes geolocation name data (at 16500).

To determine whether the column includes financial data, such as data indicating an amount of money, the data access and analysis system, or a component thereof, such as the constituent-data indexing unit, performs a defined financial data matching evaluation, such as using one or more defined patterns, such as a pattern including a currency symbol, such as the dollar sign ($), followed by a floating point or decimal value, such as 0.0, on the sample data (obtained at 16100). In some implementations, the data access and analysis system, or a component thereof, such as the constituent-data indexing unit, determines that the sample data indicates that the column includes financial data (at 16500), and the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900). Obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the sample data indicates that the column includes financial data (at 16500).

To determine whether the column includes organization data, the data access and analysis system, or a component thereof, such as the constituent-data indexing unit, determines whether the sample data (obtained at 16100) includes one or more values from a defined set, or list, of organization names, or other organization identifiers. In some implementations, the data access and analysis system, or a component thereof, such as the constituent-data indexing unit, determines that the sample data indicates that the column includes organization data (at 16500), and the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900). Obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the sample data indicates that the column includes organization data (at 16500).

To determine whether the column includes person data, the data access and analysis system, or a component thereof, such as the constituent-data indexing unit, determines whether the sample data (obtained at 16100) includes one or more values from a defined set, or list, of person names, or other person identifiers, such as user identifiers. In some implementations, the data access and analysis system, or a component thereof, such as the constituent-data indexing unit, determines that the sample data indicates that the column includes person data (at 16500), and the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900). Obtaining the data score (at 16600), determining whether the data score is less than the seventh defined threshold (at 16700), and determining that updating the constituent-data index includes updating the constituent-data substring index (at 16800), may be omitted, skipped, avoided, or excluded, such as in response to determining that the sample data indicates that the column includes person data (at 16500).

The data access and analysis system, or a component thereof, such as the constituent-data indexing unit, obtains a data score (at 16600) for the column, such as based on the sample data (obtained at 16100). The data score (obtained at 16600) for the column represents the usefulness of the data stored in the column to the data access and analysis system, such as for performing one or more operations, functions, or processes of the data access and analysis system, such as for generating a resolved request.

The data access and analysis system, or a component thereof, such as the constituent-data indexing unit, obtains the data score (at 16600) for the column using a defined, trained, model. The data score model penalizes columns with high verbosity, such as columns including error messages. The data score model penalizes columns with many numeric characters, such as columns that include universally unique identifier (UUID) data, or globally unique identifier (GUID) data, or other numeric, or alphanumeric, identifier data, such as numeric identifier data that is unique with in a defined data domain, such as primary key values. The data score model uses defined, such as trained, weights. For example, obtaining the data score from the data score model, such as based on a ratio of numeric characters (a) and a verbosity metric (b), may be expressed as the following:

$$\text{data score(column)} = 1/(1 + e^{-(2.25 - 7.30*a - 0.19*b)}).$$

The data access and analysis system, or a component thereof, such as the constituent-data indexing unit, determines whether the data score (obtained at 16100) is less than a seventh defined threshold (at 16700), such as 0.5.

In some implementations, the data access and analysis system, or a component thereof, such as the constituent-data indexing unit, determines (at 16700) that the data score (obtained at 16100) is less than the seventh defined threshold. In response to determining that the data score (obtained at 16100) is less than the seventh defined threshold (at 16700), the data access and analysis system, or a component thereof, such as the constituent-data indexing unit, determines that updating the constituent-data index includes updating the constituent-data prefix index with respect to the column (at 16900), wherein updating the constituent-data substring index with respect to the column (at 16800) may be omitted, skipped, avoided, or excluded.

In some implementations, the data access and analysis system, or a component thereof, such as the constituent-data indexing unit, determines (at 16700) that the data score (obtained at 16100) is greater than or equal to the seventh defined threshold. In response to determining that the data score (obtained at 16100) is greater than or equal to the seventh defined threshold (at 16700), the data access and analysis system, or a component thereof, such as the constituent-data indexing unit, determines that updating the constituent-data index includes updating the constituent-data substring index with respect to the column (at 16800) and updating the constituent-data prefix index with respect to the column (at 16900).

Although not shown separately herein, in some implementations, determining which constituent-data index to update 16000 for a column may include obtaining configuration data expressly indicating which constituent-data index to update, and determining which constituent-data index to update 16000 may be otherwise omitted.

Figure 17:
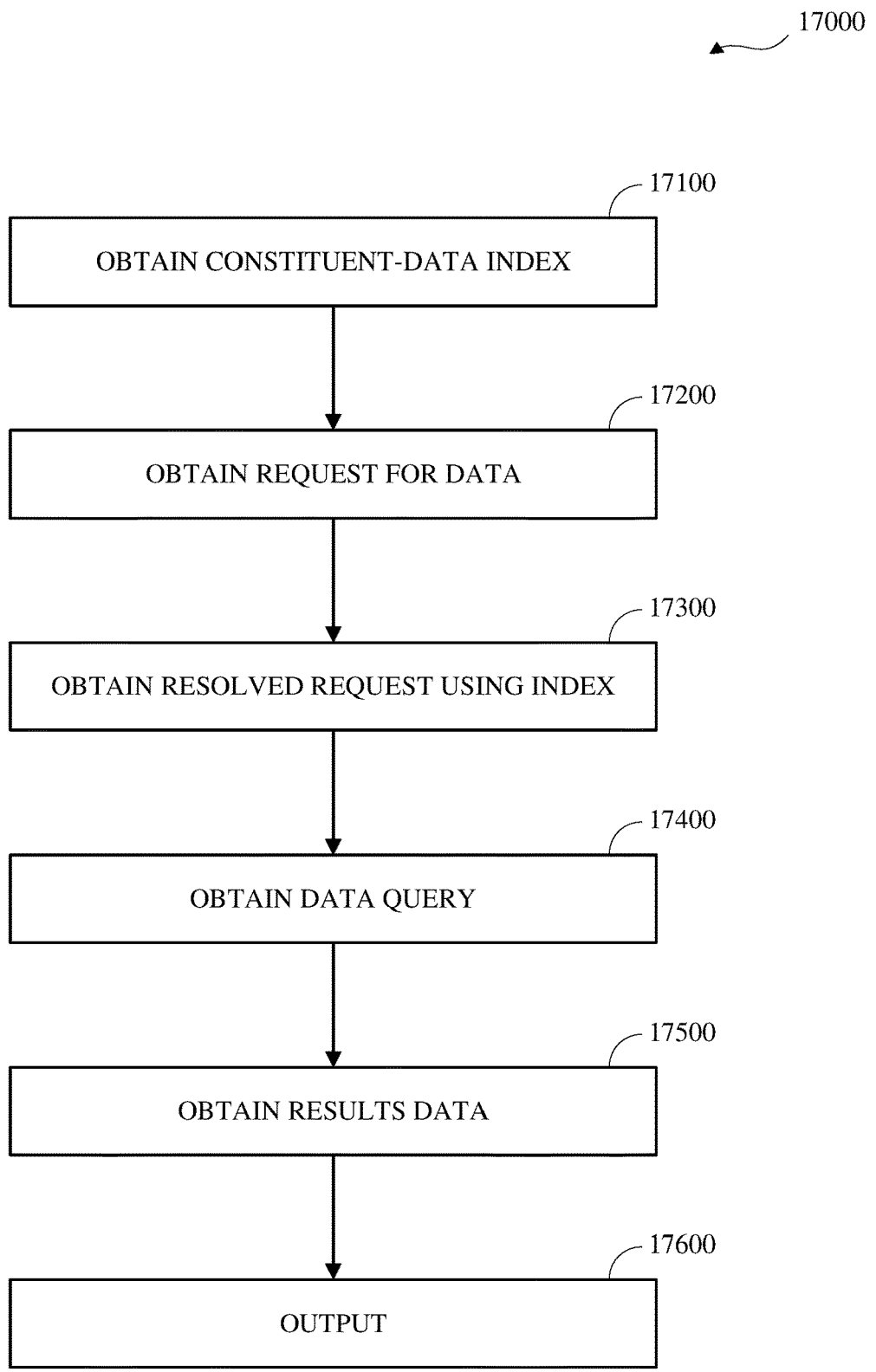
FIG. 17 is a flow diagram of an example of obtaining data from a data access and analysis system using a constituent-data index.

FIG. 17 is a flow diagram of an example of obtaining data from a data access and analysis system using a constituent-data index 17000. Obtaining data from a data access and analysis system using a constituent-data index 17000, or one or more portions thereof, may be implemented by a data access and analysis system, such as the data access and analysis system 3000 shown in FIG. 3, or one or more components thereof.

Obtaining data from a data access and analysis system using a constituent-data index 17000 includes obtaining the constituent-data index (at 17100), obtaining a request for data (at 17200), obtaining a resolved request using the constituent-data index (at 17300), obtaining a data query (at 17400), obtaining results data (at 17500), and outputting a representation of the results data (at 17600).

Obtaining the constituent-data index (at 17100) includes updating the constituent-data index as shown in FIG. 4.

Obtaining the request for data (at 17200) includes obtaining data expressing usage intent. The data access and analysis system, or one or more components thereof, such as a system access interface unit of the data access and analysis system, such as the system access interface unit 3900 shown in FIG. 3, receives data, such as user input data, including the data expressing usage intent, which includes the request for data, which may be string data. The system access interface unit may send, or otherwise make available, the data expressing usage intent, or a portion thereof, to a relational search unit of the low-latency data access and analysis system, such as the relational search unit 3700 shown in FIG. 3.

Obtaining, such as by generating, the resolved request using the constituent-data index (at 17300) includes the data access and analysis system, or one or more components thereof, such as a system access interface unit of the data access and analysis system, such as the system access interface unit 3900 shown in FIG. 3, such as the relational search unit, receiving, or otherwise accessing, the data expressing usage intent. The relational search unit processes, parses, identifies semantics, tokenizes, or a combination thereof, the request for data to generate the resolved request, which includes identifying an ordered sequence of tokens based on the data expressing usage intent. Obtaining the ordered sequence of tokens includes traversing the constituent-data index to obtain a previously indexed constituent-data token corresponding to the string data (request string) of the request for data, or a portion thereof.

Obtaining the data query (at 17400) includes automatically generating the data query in accordance with the resolved request and a defined structured query language compatible with or implemented by the data source. For example, the relational search unit may send, or otherwise make available, the resolved request to a semantic interface of the data access and analysis system, such as the semantic interface unit 3600 shown in FIG. 3. The semantic interface may receive, or otherwise access, the resolved request data. The semantic interface unit may process or transform the received resolved request to generate the data query such that the data query is in accordance with the defined structured query language compatible with or implemented by the data source.

Obtaining results data (at 17500) includes sending, transmitting, or otherwise making available, the data query to the data source. Obtaining results data (at 17500) includes receiving, reading, obtaining, or otherwise accessing, results data responsive to the request for data from the data source, wherein the data source generated the results data, or one or more portions thereof, by executing the data query.

Obtaining a representation of the results data (at 17600) includes sending, transmitting, or otherwise making available, data for presenting a representation of the results data, or a portion thereof, via a user interface.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random-access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine," "identify," "obtain," and "form" or any variations thereof, includes selecting, ascertaining, computing, looking up, receiving, determining, establishing, obtaining, or otherwise identifying or determining in any manner whatsoever using one or more of the devices and methods shown and described herein.

As used herein, the term "computing device" includes any unit, or combination of units, capable of performing any method, or any portion or portions thereof, disclosed herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Attributes may comprise any data characteristic, category, content, etc. that in one example may be non-quantifiable or non-numeric. Measures may comprise quantifiable numeric values such as sizes, amounts, degrees, etc. For example, a first column containing the names of states may be considered an attribute column and a second column containing the numbers of orders received for the different states may be considered a measure column.

Aspects of the present embodiments are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a computer, such as a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   obtaining, by an indexing unit of a data access and analysis system, a constituent-data index that includes previously indexed constituent data from a data source accessible by the data access and analysis system, wherein the previously indexed constituent data includes data obtained from a column of a table stored in the data source;
   updating the constituent-data index by:
      determining whether sampling is currently contraindicated for the column;
      in response to determining that sampling is currently contraindicated for the column, omitting sampling the column;
      in response to determining that sampling is currently other than contraindicated for the column, sampling the column;
      determining whether updating the constituent-data index is currently contraindicated for the column;
      in response to determining that updating the constituent-data index is currently contraindicated for the column, omitting updating the constituent-data index with respect to the column; and
      in response to determining that updating is currently other than contraindicated for the column, updating the constituent-data index with respect to the column;
   obtaining, by the data access and analysis system, user input data including a request for data from the data access and analysis system;
   obtaining, by data access and analysis system, resolved request data representing the request for data, wherein obtaining the resolved request includes obtaining a token representing a portion of the request for data by traversing the constituent-data index;
   obtaining, by the data access and analysis system, a data query in accordance with the resolved request data;
   obtaining, by the data access and analysis system, results data responsive to the request for data generated by execution of the data query by the data source; and
   outputting the results data.

2. The method of claim 1, wherein:
   updating the constituent-data index includes updating the constituent-data index in accordance with a defined constituent-data index update period.

3. The method of claim 1, wherein:
   obtaining the constituent-data index includes:
      obtaining indexing support data, wherein the indexing support data includes:
         data-version values including a data-version value for the table;
         token-instances tuples including a token-instances tuple for the column, wherein a respective token-instances tuple includes a respective token value, a respective user identifier, a respective group identifier, and a respective instances value indicating how many rows in a respective column have the token value; and
         column-cardinality values including a column-cardinality value for the column, wherein a respective column-cardinality value indicates a respective cardinality of unique values in a respective column.

4. The method of claim 3, wherein:
   determining whether updating the constituent-data index is currently contraindicated for the column includes:
      obtaining, by an ontological data tracker of the data access and analysis system, from the data source in accordance with execution of an ontological-data data query by the data source, ontological data for the table, wherein the ontological data includes:
         a current rows-count value indicating how many rows are in the table; and
         a first temporal location corresponding to a most recent modification of the table, wherein the most recent modification is an insertion of a column in the table, a deletion of a column from the table, a modification of a column in the table, an insertion of a row in the table, a deletion of a row from the table, or a modification of a value in a row in the table;
      in response to determining that a temporal difference between the first temporal location and a current temporal location is less than or equal to a first defined threshold:
         omitting incrementing the data-version value for the table; and
         determining that updating the constituent-data index is currently contraindicated for the column; and
      in response to determining that the temporal difference is greater than the first defined threshold:
         incrementing the data-version value for the table; and
         omitting determining that updating the constituent-data index is currently contraindicated for the column based on the temporal difference.

5. The method of claim 4, wherein:
   determining whether updating the constituent-data index is currently contraindicated for the column includes:
      obtaining a column-specific defined update frequency defined for the column;
      in response to determining that the temporal difference is greater than the column-specific defined update frequency, determining that updating the constituent-data index is currently other than contraindicated for the column; and
      in response to determining that the temporal difference is less than or equal to column-specific defined update frequency, omitting determining that updating the constituent-data index is currently contraindicated for the column based on the column-specific defined update frequency.

6. The method of claim 4, wherein:
   determining whether updating the constituent-data index is currently contraindicated for the column includes:
      in response to determining that the column-cardinality value from the indexing support data is greater than or equal to a second defined threshold, determining that updating the constituent-data index is currently contraindicated for the column; and in response to determining that the column-cardinality value from the indexing support data is less than the second defined threshold, omitting determining that updating the constituent-data index is currently contraindicated for the column based on the column-cardinality value.

7. The method of claim 6, wherein:
determining whether sampling is currently contraindicated for the column includes:
  in response to determining that the current rows-count value is less than the second defined threshold, determining that sampling is currently contraindicated for the column; and
  in response to determining that the current rows-count value is greater than or equal to the second defined threshold, omitting determining that sampling is currently contraindicated for the column based on the current rows-count value.

8. The method of claim 4, wherein:
determining whether updating the constituent-data index is currently contraindicated for the column includes:
  obtaining column relationship data for the column;
  in response to determining that the column relationship data for the column indicates that the column is a foreign key column, determining that updating the constituent-data index is currently contraindicated for the column; and
  in response to determining that the column relationship data for the column indicates that the column is other than a foreign key column, omitting determining that updating the constituent-data index is currently contraindicated for the column based on whether the column is a foreign key column.

9. The method of claim 4, wherein:
updating the constituent-data index includes:
  obtaining, by a data change tracker of the data access and analysis system, from the data source in accordance with execution of an activity-data data query by the data source, activity data for the table, wherein the activity data includes:
    inserts data representative of zero or more inserts into the table; and
    deletions data representative of zero or more deletions from the table.

10. The method of claim 9, wherein:
determining whether sampling is currently contraindicated for the column includes:
  in response to determining that a first upper bound is less than or equal to the second defined threshold, determining that sampling is currently contraindicated for the column, wherein the first upper bound is a sum of the column-cardinality value from the indexing support data and a value indicating how many inserts are indicated in the inserts data for the table; and
  in response to determining that the first upper bound is greater than the second defined threshold, omitting determining that sampling is currently contraindicated for the column based on the first upper bound.

11. The method of claim 9, wherein:
determining whether sampling is currently contraindicated for the column includes:
  in response to determining that a lower bound is greater than or equal to the second defined threshold, determining that sampling is currently contraindicated for the column, wherein the lower bound is a result of subtracting a deletions value indicating how many deletions are indicated in the deletions data for the table from the column-cardinality value from the indexing support data; and
  in response to determining that the lower bound for the column is less than the second defined threshold, omitting determining that sampling is currently contraindicated for the column based on the lower bound.

12. The method of claim 9, wherein:
determining whether sampling is currently contraindicated for the column includes:
  obtaining, from the data source in accordance with execution of a unique-inserts data query by the data source, a unique-inserts value indicating how many unique inserts for the column are indicated in the inserts data for the table;
  in response to determining that a second upper bound is less than or equal to the second defined threshold, determining that sampling is currently contraindicated for the column, wherein the second upper bound is a sum of the column-cardinality value from the indexing support data and the unique-inserts value; and
  in response to determining that the second upper bound is greater than the second defined threshold, omitting determining that sampling is currently contraindicated for the column based on the second upper bound.

13. The method of claim 4, wherein:
determining whether updating the constituent-data index is currently contraindicated for the column includes:
  accessing, from the indexing support data, zero or more token-instances tuples for the column;
  accessing, from the activity data, zero or more token-activity tuples, wherein a respective token-activity tuple includes a respective token value, a respective user identifier, a respective group identifier, and a respective activity value indicating a result of subtracting the corresponding deletions value from the corresponding inserts value;
  obtaining a current instances value for the column in accordance with the token-instances tuples and the token-activity tuples;
  in response to determining that the current instances value is equal to or less than a third defined threshold, omitting determining that updating the constituent-data index is currently contraindicated for the column based on the current instances value; and
  in response to determining that the current instances value is greater than the third defined threshold, determining that updating the constituent-data index is currently contraindicated for the column.

14. The method of claim 13, wherein:
obtaining the current instances value includes:
  in response to determining that the token-instances tuples include a token-instances tuple that includes a first token value, a first user identifier, and a first group identifier:
    in response to determining that the token-activity tuples include a token-activity tuple that includes the first token value, the first user identifier, the first group identifier, and a first activity value, obtaining, as a current instances value, a result of subtracting the first activity value from a first instances value from the token-instances tuple; and in response to determining that the token-activity
tuple that includes the first token value, the first
user identifier, and the first group identifier, is
absent from the token-activity tuples, obtaining, as
the current instances value, the first instances
value; and in response to determining that the token-activity tuples
include the token-activity tuple that includes the first
token value, the first user identifier, the first group
identifier, and the first activity value, and in response
to determining that the token-instances tuple that
includes the first token value, the first user identifier,
and the first group identifier, is absent from the
token-instances tuples, obtaining, as the current
instances value, the first activity value.

15. The method of claim 4, wherein:
determining whether updating the constituent-data index
is currently contraindicated for the column includes:
obtaining utility data for the column from a data utility
unit of the data access and analysis system;
in response to determining that a difference between a
recency temporal location from the usage data and
the current temporal location is greater than a fourth
defined threshold, determining that updating the constituent-data index is currently contraindicated for
the column; and
in response to determining that the difference between
the recency temporal location from the usage data
and the current temporal location is less than or equal
to the fourth defined threshold, omitting determining
that updating the constituent-data index is currently
contraindicated for the column based on the utility
data for the column.

16. The method of claim 4, wherein:
sampling the column includes:
obtaining, from the data source in accordance with
execution of a sampling-data data query by the data
source, sample data from the column.

17. The method of claim 16, wherein:
updating the constituent-data index for the column
includes:
obtaining, using the sample data, an average length for
the column;
determining whether the average length is greater than
a fifth defined threshold;
in response to determining that the average length is
greater than the fifth defined threshold, determining
that updating the constituent-data index for the column includes updating a prefix index of the constituent-data index;
obtaining, using the sample data, a long token ratio for
the column;
determining whether the long token ratio is greater than
a sixth defined threshold;
in response to determining that the long token ratio is
greater than the sixth defined threshold, determining
that updating the constituent-data index for the column includes updating a prefix index of the constituent-data index;
determining whether the sample data indicates that the
column is a dictionary words column;
in response to determining that the sample data indicates that the column is the dictionary words column,
determining that updating the constituent-data index
for the column includes updating a substring index of
the constituent-data index and updating the prefix
index of the constituent-data index;

determining whether the sample data indicates that the
column includes data of one or more designated
types;
in response to determining that the sample data indicates that the column includes data of one or more
designated types, determining that updating the constituent-data index for the column includes updating
a substring index of the constituent-data index and
updating the prefix index of the constituent-data
index; and
in response to determining that the average length is
less than or equal to the fifth defined threshold, the
long token ratio is less than or equal to the sixth
defined threshold, the sample data indicates that the
column is other than the dictionary words column,
and the sample data indicates that the column is other
than data of the one or more designated types,
updating the constituent-data index for the column
includes:
obtaining a data score for the column using the
sample data and a defined scoring model;
determining whether the data score for the column is
greater than a seventh defined threshold;
in response to determining that the data score for the
column is greater than the seventh defined threshold, determining that updating the constituent-data
index for the column includes updating the prefix
index of the constituent-data index; and
in response to determining that the data score for the
column is less than or equal to the seventh defined
threshold, determining that updating the constituent-data index for the column includes updating
the substring index of the constituent-data index
and updating the prefix index of the constituent-data index.

18. The method of claim 1, wherein:
updating the constituent-data index with respect to the
column includes:
obtaining, from the data source in accordance with
execution of an indexing-data data query by the data
source, indexing data from the column; and
indexing the indexing data in the constituent-data
index.

19. An apparatus comprising:
a non-transitory computer readable medium; and
a processor that executes instructions stored on the non-transitory computer readable medium to:
obtain, by an indexing unit of a data access and analysis
system, a constituent-data index that includes previously indexed constituent data from a data source
accessible by the data access and analysis system,
wherein the previously indexed constituent data
includes data obtained from a column of a table
stored in the data source;
update the constituent-data index, wherein, to update
the constituent-data index the processor executes the
instructions to:
determine whether sampling is currently contraindicated for the column;
in response to determining that sampling is currently
contraindicated for the column, omit sampling the
column;
in response to determining that sampling is currently
other than contraindicated for the column, sample
the column;
determine whether updating the constituent-data
index is currently contraindicated for the column;

in response to determining that updating the constituent-data index is currently contraindicated for the column, omit updating the constituent-data index with respect to the column; and in response to determining that updating is currently other than contraindicated for the column, update the constituent-data index with respect to the column;

obtain, by the data access and analysis system, user input data including a request for data from the data access and analysis system;

obtain, by data access and analysis system, resolved request data representing the request for data, wherein to obtain the resolved request the processor executes the instructions to obtain a token representing a portion of the request for data by traversing the constituent-data index;

obtain, by the data access and analysis system, a data query in accordance with the resolved request data;

obtain, by the data access and analysis system, results data responsive to the request for data generated by execution of the data query by the data source; and output the results data.

20. A non-transitory computer-readable storage medium, comprising executable instructions that, when executed by a processor, facilitate performance of operations, comprising:

obtaining, by an indexing unit of a data access and analysis system, a constituent-data index that includes previously indexed constituent data from a data source accessible by the data access and analysis system, wherein the previously indexed constituent data includes data obtained from a column of a table stored in the data source;

updating the constituent-data index by:

determining whether sampling is currently contraindicated for the column;

in response to determining that sampling is currently contraindicated for the column, omitting sampling the column;

in response to determining that sampling is currently other than contraindicated for the column, sampling the column;

determining whether updating the constituent-data index is currently contraindicated for the column;

in response to determining that updating the constituent-data index is currently contraindicated for the column, omitting updating the constituent-data index with respect to the column; and in response to determining that updating is currently other than contraindicated for the column, updating the constituent-data index with respect to the column;

obtaining, by the data access and analysis system, user input data including a request for data from the data access and analysis system;

obtaining, by data access and analysis system, resolved request data representing the request for data, wherein obtaining the resolved request includes obtaining a token representing a portion of the request for data by traversing the constituent-data index;

obtaining, by the data access and analysis system, a data query in accordance with the resolved request data;

obtaining, by the data access and analysis system, results data responsive to the request for data generated by execution of the data query by the data source; and outputting the results data.

* * * * *